(12) United States Patent
Rouot

(10) Patent No.: US 8,311,870 B1
(45) Date of Patent: Nov. 13, 2012

(54) COMPUTER-IMPLEMENTED METHOD AND COMPUTER PROGRAM TO ASSIST IN MANAGING SUPPLIER CAPACITY

(75) Inventor: Etienne Rouot, Tournefeuille (FR)

(73) Assignee: Airbus SAS, Blagnac (FR)

( * ) Notice: Subject to any disclaimer, the term of this patent is extended or adjusted under 35 U.S.C. 154(b) by 414 days.

(21) Appl. No.: 12/541,523

(22) Filed: Aug. 14, 2009

Related U.S. Application Data

(60) Provisional application No. 61/091,321, filed on Aug. 22, 2008.

(51) Int. Cl.
*G06Q 10/00* (2012.01)
(52) U.S. Cl. ................................ 705/7.25; 705/7.23
(58) Field of Classification Search ............... 705/7.25
See application file for complete search history.

(56) References Cited

U.S. PATENT DOCUMENTS

| 7,089,196 B2* | 8/2006 | Hayes | 705/22 |
| 2006/0026072 A1* | 2/2006 | Suguro | 705/16 |

FOREIGN PATENT DOCUMENTS
WO    WO 2007028418 A2 *  3/2007

OTHER PUBLICATIONS

Choudhury, Bhaswar; Agarwal, Yogesh K.; Singh, K. N.; Bandyopadhyay, D. K.; "Value of Information in a Capacitated Supply Chain". May 2008. Infor. vol. 46, No. 2. pp. 117-127.*
Ray, Saibal.; "Lead Time Management in Supply Chains". 2001.*
Steele, Daniel C.; Papke-Shields, Karen E.; "Capacity Slack: Strategic Alternative to Lead Time". Fourth Quarter 1993. Production and Inventory Management Journal. vol. 34, No. 4.*
Ozkul, Ahmet S.; "The Impact of Batching on Supply Chain Costs in a Schedule Sharing Environment". Aug. 2003.*

* cited by examiner

*Primary Examiner* — Peter Choi

(57) ABSTRACT

A computer-implemented method to assist in managing supplier capacity to supply a supplied unit to at least a first user of the supplied unit by at least one supplier, for a series of periods, based on data as of a reference date, the series of periods being in the future relative to the reference date, comprising calculating a supplier capacity contingency ratio for each period, the supplier capacity contingency ratio for each period being a ratio between, a difference between the supplier future load for that period and the supplier reference-date available capacity for that period, and the supplier available capacity for that period. A computer-readable information storage device containing computer-executable instructions to carry out this method.

20 Claims, 47 Drawing Sheets

FIG. 5A

| Production Line ID | Production Line | Products or Process produced | ABC Rating | Contact person within Production Line | Position in the Company | e-mail address |
|---|---|---|---|---|---|---|
| Cabin System Supplier_Tokyo; Japan_Water Products | Water Products | Water System | B | John Smith | Operations manager | john.smith@mail.com |
| Cabin System Supplier_Tokyo; Japan_Compactors Assembly | Compactors Assem | Compactor | A | John Smith | Operations manager | john.smith@mail.com |
| Cabin System Supplier_Tokyo; Japan_Vacuum Products | Vacuum Products | Vacuum System | A | John Smith | Operations manager | john.smith@mail.com |
| Cabin System Supplier_Tokyo; Japan_Seating 1 Production Line | Seating 1 Production | Seating 1 | A | John Smith | Operations manager | john.smith@mail.com |
| Cabin System Supplier_Tokyo; Japan_Seating 2 Production Line | Seating 2 Production | Seating 2 | A | John Smith | Operations manager | john.smith@mail.com |
| AluSupplier_Velizy; France_Sheet PL 1 | Sheet PL 1 | Sheet 1 | | Bob John | Production Manager | bob.john@mail.com |
| AluSupplier_Velizy; France_Plate PL 1 | Plate PL 1 | Plate 1 | | Bob John | Production Manager | bob.john@mail.com |
| AluSupplier_Velizy; France_Sheet PL 2 | Sheet PL 2 | Sheet 2 | | Bob John | Production Manager | bob.john@mail.com |
| AluSupplier_Velizy; France_Plate PL 2 | Plate PL 2 | Plate 2 | | Bob John | Production Manager | bob.john@mail.com |
| LandingSyst Supplier_Rome - Italy_Landing Products 1 | Landing Products 1 | Landing Gear 1 | | Tim Roberts | Scheduling manager | tim.roberts@mail.com |
| LandingSyst Supplier_Rome - Italy_Brakes PL 1 | Brakes PL 1 | Brakes 1 | | Tim Roberts | Scheduling manager | tim.roberts@mail.com |
| LandingSyst Supplier_Rome - Italy_Wheels PL | Wheels PL | Wheels | | Tim Roberts | Scheduling manager | tim.roberts@mail.com |
| LandingSyst Supplier_Rome - Italy_Control Products 1 | Control Products 1 | Flight controls 1 | | Tim Roberts | Scheduling manager | tim.roberts@mail.com |
| PaintSupplier_New York / USA_Red Mixing | Red Mixing | Red Paint | | Paul Martin | Production Manager | paul.martin@supplier4.fr |
| PaintSupplier_New York / USA_Blue Mixing | Blue Mixing | Blue Paint | | Paul Martin | Production Manager | paul.martin@supplier4.fr |
| PaintSupplier_New York / USA_Green Mixing | Green Mixing | Green Paint | | Paul Martin | Production Manager | paul.martin@supplier4.fr |
| ResinSupplier_Bucharest; Romania_AAA Mixing | AAA Mixing | Resin AAA | | Antonio Paul | Planning manager | antonio.paul@mail.com |
| ResinSupplier_Bucharest; Romania_BBB Mixing | BBB Mixing | Resin BBB | | Antonio Paul | Planning manager | antonio.paul@mail.com |
| ResinSupplier_Bucharest; Romania_CCC Mixing | CCC Mixing | Resin CCC | | Antonio Paul | Planning manager | antonio.paul@mail.com |
| ResinSupplier_Bucharest; Romania_DDD Mixing | DDD Mixing | Resin DDD | | Antonio Paul | Planning manager | antonio.paul@mail.com |
| ResinSupplier_Bucharest; Romania_ABC Mixing | ABC Mixing | Resin ABC | | Antonio Paul | Planning manager | antonio.paul@mail.com |
| Fastener Supplier_Tarbes; France_Screw PL 1 | Screw PL 1 | Screw 1 | | Paul Smith | Operations manager | paul.smith@supplier6.com |
| Fastener Supplier_Tarbes; France_Bolt PL 1 | Bolt PL 1 | Bolt 1 | | Paul Smith | Operations manager | paul.smith@supplier6.com |
| Fastener Supplier_Tarbes; France_Screw PL 2 | Screw PL 2 | Screw 2 | | Paul Smith | Operations manager | paul.smith@supplier6.com |
| Fastener Supplier_Tarbes; France_Bolt PL 2 | Bolt PL 2 | Bolt 2 | | Paul Smith | Operations manager | paul.smith@supplier6.com |
| Fastener Supplier_Tarbes; France_Bolt PL 3 | Bolt PL 3 | Bolt 3 | | Paul Smith | Operations manager | paul.smith@supplier6.com |
| CastSupplier_Bruxelles, Belgique_Stiffener Production Line | Stiffener Production | Stiffener | | Nigel John | Production Manager | |

FIG. 5B

| Production Line ID | Production Line | Products or Process produced | ABC Rating | Contact person within Production Line | Position in the Company | e-mail address |
|---|---|---|---|---|---|---|
| CastSupplier_Bruxelles_Belgique_Box Production Line | Box Production Line | Box | | Nigel John | Production Manager | |
| CastSupplier_Bruxelles_Belgique_XYZ Production Line | XYZ Production Line | Pylon Part XYZ | | Nigel John | Production Manager | |
| CastSupplier_Bruxelles_Belgique_WVT Production Line | WVT Production Line | Pylon Part WVT | | Nigel John | Production Manager | |
| CoreSupplier_Berlin (Allemagne)_Metallic PL | Metallic PL | Metallic Honeycomb | | Jean Dupond | Manufacturing Director | jean.dupond@box.fr |
| CoreSupplier_Berlin (Allemagne)_Kevlar PL | Kevlar PL | Kevlar Honeycomb | | Jean Dupond | Manufacturing Director | jean.dupond@box.fr |
| CoreSupplier_Berlin (Allemagne)_GlassFiber PL | GlassFiber PL | Glass Fiber Honeycomb | | Jean Dupond | Manufacturing Director | jean.dupond@box.fr |
| Equipment & Systems_Chicago (USA)_TBU Production Line | TBU Production Line | Computer TBU | | Marc Dupont | Electrical Engineer | marc.dupont@mail.fr |
| Equipment & Systems_Chicago (USA)_SIT Production Line | SIT Production Line | Computer SIT | | Marc Dupont | Electrical Engineer | marc.dupont@mail.fr |
| Equipment & Systems_Chicago (USA)_RAZ Production Line | RAZ Production Line | Computer RAZ | | Marc Dupont | Electrical Engineer | marc.dupont@mail.fr |
| Equipment & Systems_Chicago (USA)_OHN Production Line | OHN Production Line | Computer OHN | | Marc Dupont | Electrical Engineer | marc.dupont@mail.fr |
| Equipment & Systems_Chicago (USA)_FRW Production Line | FRW Production Line | Computer FRW | | Marc Dupont | Electrical Engineer | marc.dupont@mail.fr |
| Equipment & Systems_Chicago (USA)_A2A Production Line | A2A Production Line | Computer A2A | | Marc Dupont | Electrical Engineer | marc.dupont@mail.fr |
| DetailParts Supplier_Tunis; Tunisia_Production_Line 1 | Production Line 1 | Part 1 | | Steve Roberts | Programme Manager | steve.roberts@supplier10.c |
| DetailParts Supplier_Tunis; Tunisia_Production_Line 2 | Production Line 2 | Part 2 | | Steve Roberts | Programme Manager | steve.roberts@supplier10.c |
| DetailParts Supplier_Tunis; Tunisia_Production_Line 3 | Production Line 3 | Part 3 | | Steve Roberts | Programme Manager | steve.roberts@supplier10.c |
| DetailParts Supplier_Tunis; Tunisia_Production_Line 4 | Production Line 4 | Part 4 | | Steve Roberts | Programme Manager | steve.roberts@supplier10.c |
| DetailParts Supplier_Tunis; Tunisia_Production_Line 5 | Production Line 5 | Part 5 | | Steve Roberts | Programme Manager | steve.roberts@supplier10.c |
| DetailParts Supplier_Tunis; Tunisia_Production_Line 6 | Production Line 6 | Part 6 | | Steve Roberts | Programme Manager | steve.roberts@supplier10.c |
| EleSupplier_Paris; France_Overbraiding 20 | Overbraiding 20 | Electrical Harnesses type 20 | | Pierre PERRIN | Airbus Programs Manager | pierre.perrin@mail.fr |
| EleSupplier_Paris; France_Overbraiding 30 | Overbraiding 30 | Electrical Harnesses type 30 | | Pierre PERRIN | Airbus Programs Manager | pierre.perrin@mail.fr |
| EleSupplier_Paris; France_Testing 1 | Testing 1 | Electrical test 1 | | Pierre PERRIN | Airbus Programs Manager | pierre.perrin@mail.fr |
| EleSupplier_Paris; France_Marking 1 | Marking 1 | Laser Marking 1 | | Pierre PERRIN | Airbus Programs Manager | pierre.perrin@mail.fr |
| CarbonSupplier_Montreal; Canada_Unidirectional Products | Unidirectional Products | Carbon Fabric 1 | | Michel Martin | Director Manufacturing | michel.martin@courrier.fr |
| CarbonSupplier_Montreal; Canada_Bidirectional Products | Bidirectional Products | Carbon Fabric 2 | | Michel Martin | Director Manufacturing | michel.martin@courrier.fr |
| CarbonSupplier_Montreal; Canada_Multiaxial PL 1 | Multiaxial PL 1 | Carbon Fabric 3 | | Michel Martin | Director Manufacturing | michel.martin@courrier.fr |
| CarbonSupplier_Montreal; Canada_Multiaxial PL 2 | Multiaxial PL 2 | Carbon Fabric 4 | | Michel Martin | Director Manufacturing | michel.martin@courrier.fr |
| CarbonSupplier_Montreal; Canada_Carbon Prepreg - Line 1 | Carbon Prepreg - Li | Prepreg 1 | | Michel Martin | Director Manufacturing | michel.martin@courrier.fr |
| DetailParts Supplier_Tunis; Tunisia_Production_Line 7 | Production Line 7 | Part 7 | | Steve Roberts | Programme Manager | steve.roberts@supplier10.c |
| DetailParts Supplier_Tunis; Tunisia_Production_Line 8 | Production Line 8 | Part 8 | | Steve Roberts | Programme Manager | steve.roberts@supplier10.c |
| EleSupplier_Paris; France_Overbraiding 10 | Overbraiding 10 | Electrical Harnesses type 10 | | Pierre PERRIN | Airbus Programs Manager | pierre.perrin@mail.fr |

FIG. 5C

| Back-up e-mail address | Supplier Name | Supplier Location | Foundation ID | Assessment date | Assessment owner | Department | Unit used for Resource Planning | Current Load (per month) |
|---|---|---|---|---|---|---|---|---|
| | Cabin System Supplier | Tokyo; Japan | 181583 | 01/06/2007 | Tom Brown | TRPQ, TSPQ | metres | 5028 |
| | Cabin System Supplier | Tokyo; Japan | 181583 | 01/06/2007 | Tom Brown | PCAQ | Hours | 866 |
| | Cabin System Supplier | Tokyo; Japan | 181583 | 01/06/2007 | Tom Brown | PCAQ | Hours | 828 |
| | Cabin System Supplier | Tokyo; Japan | 181583 | 01/06/2007 | Tom Brown | PCAQ | Hours | 616 |
| | Cabin System Supplier | Tokyo; Japan | 181583 | 01/06/2007 | Tom Brown | PCAQ | Hours | 210 |
| bob.john2@mail.com | AluSupplier | Velizy; France | 263607 | 01/06/2007 | Thomas Lepoutre | PCUQ | qty of burn in | 3.8 |
| bob.john2@mail.com | AluSupplier | Velizy; France | 263607 | 01/06/2007 | Thomas Lepoutre | PCUQ | hours | 700 |
| bob.john2@mail.com | AluSupplier | Velizy; France | 263607 | 01/06/2007 | Thomas Lepoutre | PCUQ | hours | 794 |
| bob.john2@mail.com | AluSupplier | Velizy; France | 263607 | 01/06/2007 | Thomas Lepoutre | PCUQ | hours | 513 |
| tim.roberts2@mail.com | LandingSyst Supplier | Roma - Italy | 270858 | 01/08/2007 | Maria Sanchez | PMDQ | tons | 3423 |
| tim.roberts2@mail.com | LandingSyst Supplier | Roma - Italy | 270858 | 01/08/2007 | Maria Sanchez | PMDQ | hours | 2049 |
| tim.roberts2@mail.com | LandingSyst Supplier | Roma - Italy | 270858 | 01/08/2007 | Maria Sanchez | PMDQ | hours | 5304 |
| tim.roberts2@mail.com | LandingSyst Supplier | Roma - Italy | 270858 | 01/08/2007 | Maria Sanchez | PMDQ | tons | 606 |
| paul.martin2@supplier4.fr | PaintSupplier | New York; / USA | 149682 | 01/08/2007 | Susan Murray | PCDQ | Hours | 825 |
| paul.martin2@supplier4.fr | PaintSupplier | New York; / USA | 149682 | 01/08/2007 | Susan Murray | PCDQ | Hours | 166.9 |
| paul.martin2@supplier4.fr | PaintSupplier | New York; / USA | 149682 | 01/08/2007 | Susan Murray | PCDQ | Hours | 141 |
| antonio.paul2@mail.com | ResinSupplier | Bucharest; Romania | 270858 | 01/08/2007 | Claudia Graaf | PCUQ | hours | 1159 |
| antonio.paul2@mail.com | ResinSupplier | Bucharest; Romania | 270858 | 01/08/2007 | Claudia Graaf | PCUQ | hours | 7140 |
| antonio.paul2@mail.com | ResinSupplier | Bucharest; Romania | 270858 | 01/08/2007 | Claudia Graaf | PCUQ | pcs | 391 |
| antonio.paul2@mail.com | ResinSupplier | Bucharest; Romania | 270858 | 01/08/2007 | Claudia Graaf | PCUQ | pcs | 1869 |
| antonio.paul2@mail.com | ResinSupplier | Bucharest; Romania | 270858 | 01/08/2007 | Claudia Graaf | PCUQ | pcs | 277 |
| | Fastener Supplier | Tartres; France | 198587 | 01/09/2007 | Emily Watson | PCUQ | pcs | 1478 |
| | Fastener Supplier | Tartres; France | 198587 | 01/09/2007 | Emily Watson | PCUQ | lbs | 58634 |
| | Fastener Supplier | Tartres; France | 198587 | 01/10/2007 | Emily Watson | TNPQ, TYPQ | Hours | 1486 |
| | Fastener Supplier | Tartres; France | 198587 | 01/10/2007 | Emily Watson | TYPQ | A/C sets | 33.4 |
| | Fastener Supplier | Tartres; France | 198587 | 01/11/2007 | Emily Watson | TNPQ, TPPQ, TYPQ | Hours | 396.5 |
| | CastSupplier | Bruxelles, Belgique | | | Stefan Altmann | TNPQ | Shipset | 37.1 |
| | CastSupplier | Bruxelles, Belgique | | 01/11/2007 | Stefan Altmann | TNPQ, TSPQ, TWPQ | hours | 6481 |
| | CastSupplier | Bruxelles, Belgique | | 01/11/2007 | Stefan Altmann | TNPQ, TSPQ, TWPQ | hours | 857 |

FIG. 5D

| Back-up e-mail address | Supplier Name | Supplier Location | Foundation ID | Assessment date | Assessment owner | Department | Unit used for Resource Planning | Current Load (per month) |
|---|---|---|---|---|---|---|---|---|
| | CastSupplier | Bruxelles; Belgique | | 01/11/2007 | Stefan Altmann | TNPQ, TSPQ, TWPQ | hours | 6766 |
| | CoreSupplier | Berlin (Alemagne) | 123456 | 01/11/2007 | Xavier Lamblot | TNPQ, TSPQ, TWPQ | hours | 630 |
| | CoreSupplier | Berlin (Alemagne) | 123456 | 01/11/2007 | Xavier Lamblot | TNPQ, TSPQ, TWPQ | hours | 370 |
| | CoreSupplier | Berlin (Alemagne) | 123456 | 01/11/2007 | Xavier Lamblot | TNPQ, TSPQ, TWPQ | hours | 1582 |
| marc.dupont2@mail.fr | Equipment & Systems | Chicago (USA) | | 01/11/2007 | Aline Robin | PCUQ | hours | 91 |
| marc.dupont2@mail.fr | Equipment & Systems | Chicago (USA) | | 01/09/2007 | Aline Robin | PCUQ | tour | 4230 |
| marc.dupont2@mail.fr | Equipment & Systems | Chicago (USA) | | 01/09/2007 | Aline Robin | PCUQ | hours | 1556 |
| marc.dupont2@mail.fr | Equipment & Systems | Chicago (USA) | | 01/09/2007 | Aline Robin | PCUQ | cycles | 2 |
| marc.dupont2@mail.fr | Equipment & Systems | Chicago (USA) | | 01/09/2007 | Aline Robin | PCUQ | hours | 274 |
| marc.dupont2@mail.fr | Equipment & Systems | Chicago (USA) | | 01/09/2007 | Aline Robin | PCUQ | hours | 1241 |
| steve.roberts2@supplier10 | DetailParts Supplier | Tunis; Tunisia | 503496 | 01/10/2007 | | PCAQ | detectors | 2708 |
| steve.roberts2@supplier10 | DetailParts Supplier | Tunis; Tunisia | 503496 | 01/10/2007 | | TLPQ | shipsets | 7.8 |
| steve.roberts2@supplier10 | DetailParts Supplier | Tunis; Tunisia | 503496 | 01/10/2007 | | TLPQ | shipsets | 32.5 |
| steve.roberts2@supplier10 | DetailParts Supplier | Tunis; Tunisia | 503496 | 01/12/2007 | | TLPQ | Base 100 | 100 |
| steve.roberts2@supplier10 | DetailParts Supplier | Tunis; Tunisia | 503496 | 01/10/2007 | | TLPQ | shipsets | 32.5 |
| steve.roberts2@supplier10 | DetailParts Supplier | Tunis; Tunisia | 503496 | 01/10/2007 | | TLPQ | shipsets | 7.8 |
| pierre.perrin2@mail.fr | ElecSupplier | Paris; France | | 01/10/2007 | | TLPQ | people | 478 |
| pierre.perrin2@mail.fr | ElecSupplier | Paris; France | | 01/10/2007 | | TLPQ | Hours | 356 |
| pierre.perrin2@mail.fr | ElecSupplier | Paris; France | | 01/10/2007 | | TLPQ | hours | 1044 |
| pierre.perrin2@mail.fr | ElecSupplier | Paris; France | | 01/10/2007 | | TLPQ | Aircraft | 32 |
| | CarbonSupplier | Montreal; Canada | 193291 | 01/11/2007 | | PCDQ | Hours | 17023 |
| | CarbonSupplier | Montreal; Canada | 193291 | 01/12/2007 | | PCAQ | unit | 95 |
| | CarbonSupplier | Montreal; Canada | 193291 | 01/11/2007 | | PCAQ | Hours | 1981 |
| | CarbonSupplier | Montreal; Canada | 193291 | 01/11/2007 | | PCAQ | Hours | 1448 |
| | CarbonSupplier | Montreal; Canada | 193291 | 01/11/2007 | | PCDQ | Shipset | 3 |
| steve.roberts2@supplier10 | DetailParts Supplier | Tunis; Tunisia | 503496 | 01/11/2007 | | | hours | 1856 |
| steve.roberts2@supplier10 | DetailParts Supplier | Tunis; Tunisia | 503496 | 01/11/2007 | | | hours | 668 |
| pierre.perrin2@mail.fr | ElecSupplier | Paris; France | 260718 | 01/08/2007 | | PCUQ | Hours | 46 |

FIG. 5E

| SA Load | A321 Load | LR Load | LR Basic Load | LR Strech Load | A380 Load | A400M Load | A350 Load | ATR Load |
|---|---|---|---|---|---|---|---|---|
| 3250 | | 1011 | | | 767 | | | |
| 73 | | 18 | | | 26 | 2 | | |
| 426 | | 88 | | | 102 | 7 | | |
| 369 | | 77 | | | 43 | 6 | | |
| 92 | | 21 | | | | 2 | | |
| | | | | 0.7 | | | | |
| 61 | | | 2.9 | 31 | 29 | | | |
| 123 | | | 178 | 30 | 48 | | | |
| 60 | | | 145 | 23 | 4 | | | |
| | | | 111 | | | | | |
| 304 | | 93 | | | 38 | 5 | | |
| 204 | | 63 | | | 25 | 3 | | |
| 601 | | 185 | | | 74 | 9 | | |
| 85 | | 26 | | | 10.5 | 1.7 | | |
| | | 225 | | | | | | |
| 96 | | 81 | | | 11.5 | | | |
| | | 38 | | | 3.4 | | | |
| | | 27 | | | 541 | | | |
| | | 24.7 | | | 26.7 | | | |
| | | 74.1 | | | 96.7 | | | |
| | | 24.7 | | | | | | |
| | | 49.4 | | 88 | 70 | | | |
| | | 2767 | 617 | | 3150 | 28 | | |
| 32.9 | | | | | 39 | | | |
| 26.25 | | | 40.3333333 | 30.25 | 43 | | | |
| 32 | | | | | | | | |
| 1160 | | 47 | | | 700 | 153 | | |

FIG. 5F

| SA Load | A321 Load | LR Load | LR Basic Load | LR Strech Load | A380 Load | A400M Load | A350 Load | ATR Load |
|---|---|---|---|---|---|---|---|---|
| 147 | | 2 | | | | | | |
| 1790 | | 61 | | | | | | |
| 152 | | 2 | | | | | | |
| 168 | | 7 | | | | | | |
| 540 | | 20 | | | | | | |
| | | | | | 166 | 164 | | |
| | | | | | 630 | 347 | | |
| | | | | | 70 | 50 | | |
| | | | | | 56 | 30 | | |
| | | | | | 180 | 72 | | |
| | | | | 9 | | | | |
| | | | | | 51 | | | |
| | | 127 | | | 25 | | | |
| | | | | | 116 | | | |
| 1 | | | | | | | | |
| | | | | | 139 | | | |
| 222 | | 138 | | | 257 | | | |
| | | 7.8 | | | 5 | | | |
| 32.5 | | | | | | | | |
| 69.8 | | 14.6 | | | 2.5 | 0.5 | | |
| 32.5 | | | | | | | | |
| | | 7.8 | | | | | | |
| 91 | | 25 | | | 32 | 25 | | |
| 280 | | | | | | | | |
| 344 | | 10 | | | 86 | 10 | | |
| 32 | | | | | | | | |
| 130 | | 117 | | | 85 | 8 | | |
| 61 | | 20 | | | 2 | | | |
| | | 145 | | | 18 | 5 | | |
| | | 115 | | | 8 | 2 | | |
| | | | | | 1 | | | |
| 1405 | | 363 | | | 14 | 37 | | |
| 325 | | 83 | | | 3 | 8 | | |
| | | | | | 46 | | | |

FIG. 5G

| Other Customers Load | Code for multi-source | Current Available Capacity | Current Max Capacity | Actions to trigger Surge Capacity | Internal Production Lead Time | LT from Shipping to Station 40 | Red threshold (% Cont) | Amber threshold (% Cont) |
|---|---|---|---|---|---|---|---|---|
| | | 5400 | 5832 | Work on holidays (maximu | 1 | 6 | 0.00 | 0.05 |
| 747 | | 1199 | 1439 | Overtime | | | 0.00 | 0.05 |
| 205 | | 866 | 1169 | Overtime | 2 | | 0.00 | 0.05 |
| 121 | | 758 | 1023 | Overtime + change shift pa | 2 | 1 | 0.00 | 0.05 |
| 95 | | 207 | 275 | Overtime and MRO shift work | | | 0.00 | 0.05 |
| 0.2 | | 7.3 | 7.3 | | 1 | 2 | 0.00 | 0.05 |
| 401 | | 705 | 879 | 1 Operator transferred to a | 1 | 2 | 0.00 | 0.05 |
| 448 | | 804 | 859 | | 1 | 1 | 0.00 | 0.05 |
| 315 | | 513 | 543 | local subcontracting for the | 1 | 1 | 0.00 | 0.05 |
| 2983 | | 3937.5 | 3979.5 | NCA0s ext.supply (42 tons) | 2 | 12 | 0.00 | 0.05 |
| 1754 | | 2583.333333 | 3013.333333 | ESR furnaces at Paris | 2 | 12 | 0.00 | 0.05 |
| 4435 | | 5908 | 5908 | | 2 | 12 | 0.00 | 0.05 |
| 482.8 | | 773.3333333 | 773.3333333 | | 2 | 12 | 0.00 | 0.05 |
| 600 | | 1139 | 1548 | Work 2 hours overtime Mo | 1 | 3 | 0.00 | 0.05 |
| 74.4 | | 451 | 632 | Work 2 hours overtime Mo | 1 | 5 | 0.00 | 0.05 |
| 45 | | 150 | 210 | Work 2 hours overtime Mo | 1 | 3 | 0.00 | 0.05 |
| 1117.6 | | 1100 | 1264 | Working overtime 2h more | 2 | 5 | 0.00 | 0.05 |
| 6572 | | 8840 | 10349 | Working overtime 2 hours/ | 6 | 2 | 0.00 | 0.05 |
| 339.6 | | 342 | 423 | Overtime and Shift Expans | 2 | 3 | 0.00 | 0.05 |
| 1698.2 | | 1601 | 1851 | Cross Training and Overtin | 1 | 3 | 0.00 | 0.05 |
| 252.3 | | 329 | 448 | Overtime/Shift expansion | 3 | 3 | 0.00 | 0.05 |
| 1358.6 | | 1259 | 1428 | Cross Training and Overtin | 2 | 3 | 0.00 | 0.05 |
| 52777 | | 52822 | 59661 | Effective CVD Furnace Loa | 6 | 3 | 0.00 | 0.05 |
| 714 | | 1865 | 2419.459459 | 3 shifts (8h instead of 5h) on Friday + 3 shifts (8h) on S | 2 | 2 | 0.00 | 0.05 |
| 0.5 | | 36 | 37 | Overtime | 1 | | 0.00 | 0.05 |
| 256.6666667 | | 409.5 | 720 | Overtime: 21->24h + Saturday & Sunday + 5 weeks hc | | 4 | 0.00 | 0.05 |
| 5.1 | | 39.2 | 54.9 | Shift 2*8 & overtime 7 days | 1 | | 0.00 | 0.05 |
| 4421 | | 6720 | 7520 | Overtime; weekend work | 2 | 1 | 0.00 | 0.05 |

FIG. 5H

| Other Customers Load | Code for multi-source | Current Available Capacity | Current Max Capacity | Actions to trigger Surge Capacity | Internal Production Lead Time | LT from Shipping to Station 40 | Red threshold (% Cont) | Amber threshold (%Cont) |
|---|---|---|---|---|---|---|---|---|
| 378 | | 840 | 920 | | 2 | 1 | 0.00 | 0.05 |
| 3938 | | 7224 | 7520 | Overtime; weekend work. | 1 | 3 | 0.00 | 0.05 |
| 356 | | 672 | 757 | Shift work on DYE machine | 1 | 3 | 0.00 | 0.05 |
| 119 | | 504 | 564 | Overtime. Flexible working | 1 | 2 | 0.00 | 0.05 |
| 780 | | 1640 | 1700 | Shift work; overtime | 2 | 1 | 0.00 | 0.05 |
| 31 | | 200 | 328 | Over time | 2 | 10 | 0.00 | 0.05 |
| 4078 | | 4700 | 5630 | Overtime | 8 | 1 | 0.00 | 0.05 |
| 1440 | | 1440 | 1584 | overtime actually done | 1 | 2 | 0.00 | 0.05 |
| 1 | | 12 | 12 | | 3 | 2 | 0.00 | 0.05 |
| 135 | | 800 | 1072 | overtime on Saturday Sund | 3 | 2 | 0.00 | 0.05 |
| 984 | | 1296.521739 | 1815.8 | overtime | 3 | 1 | 0.00 | 0.05 |
| 2343 | | 2512 | 2912 | Increased overtime | 1 | 3 | 0.00 | 0.05 |
| | | 8.5 | 10.7 | 10 hours overtime per wee | 2 | | 0.00 | 0.05 |
| | | 34.5 | 41 | 10 hours overtime per wee | 2 | 2 | 0.00 | 0.05 |
| 12.6 | | 123 | 131 | One machine on 3 shift | 1 | | 0.00 | 0.05 |
| | | 36.2 | 45.6 | 10 hours overtime per wee | 2 | 5 | 0.00 | 0.05 |
| | | 8.5 | 10 | 10 hours overtime per wee | 3 | | 0.00 | 0.05 |
| 305 | | 478 | 525.8 | Overtime (from 36 to 40 Hours per week) | | 5 | 0.00 | 0.05 |
| 76 | | 380 | 420 | Overtime (from 35 to 40 Hours per week) | | 2 | 0.00 | 0.05 |
| 594 | | 1044 | 1221.48 | over time from 35 to 42 hours/week sustaineable for 10 | | 4 | 0.00 | 0.05 |
| | | 34 | 35 | OVER TIME | 2 | 6 | 0.00 | 0.05 |
| 16683 | | 14980 | 17073 | Ask more from exsiting ve | 1 | 3 | 0.00 | 0.05 |
| 12 | | 97 | 119 | EXTRA HOURS AND ADD | 1 | 1 | 0.00 | 0.05 |
| 1813 | | 2138 | 2299 | Overtime | 1 | 4 | 0.00 | 0.05 |
| 1323 | | 1581 | 1705 | Overtime | 1 | 4 | 0.00 | 0.05 |
| 2 | | 3 | 4 | Overtime / weekend workin | 1 | 3 | 0.00 | 0.05 |
| 37 | | 1968 | 2230.4 | add 2people from other are | 1 | 3 | 0.00 | 0.05 |
| 249 | | 766 | 850 | extra hours on Saturday 1s | 1 | 3 | 0.00 | 0.05 |
| | | 283 | 283 | Overtime | 2 | 2 | 0.00 | 0.05 |

FIG. 5I

| Type of shift pattern | Contracted Rates | Capacity Critical Supplier #1 | Capacity Critical Supplier #2 | Capacity Critical Supplier #3 | Capacity Critical Supplier #4 | General Comments | Reason why no Advanced Load Option | M+1 |
|---|---|---|---|---|---|---|---|---|
| 3 shifts: 7 days a week (stops 15d for maintenance/cal | | Critical 1 | | | | | LR: no deliveries for A330 - Only Airbus | |
| 2 shifts pattern | | | | | | | STUFF for A380 & 400M | 754 |
| single shifts pattern | | Critical 2 | Critical 16 | Critical S2 | | | STUFF for A380 & 400M | 205 |
| Two shifts pattern | | Critical 3 | Critical 17 | Critical S2 | | | STUFF for A380 & 400M | 122 |
| 12 hors /day | | | | | | | Stuff 400M | 96 |
| | | | | | | | | 0.2 |
| | 1 | | | | | | | 401 |
| | 1 | | | | | | | 448 |
| | 1 | | | | | | | 315 |
| 15.5 shifts/week | N/A | N/A | | | | | | 3031 |
| 21 shifts / week | N/A | Critical 4 | | | | | | 1798 |
| 21 shifts/ week | N/A | Critical 5 | | | | | | 4447.5 |
| 18 shifts/ week | N/A | Critical 6 | | | | | | 478 |
| 8 person working 1 shift 8 h 7.5 shipsets/month LR (20% | Critical 7 | | | | | Lead Time Offset to Airbus | Information is confidential r | 600 |
| 3 persons working 1 shift 8 h 7.5 shipsets/month LR & 0. | Critical 8 | | | | | LR demands are from Client | Information is confidential r | 74.4 |
| 1 person working 1 shift 8 h Currently 32 shipsets/month | Critical 9 | | | | | Currently not at 32 shipsets | Information is confidential r | 45 |
| 2 shifts 5 days/week 8 people 1st shift 3 people 2nd s | Critical 10 | | Critical S1 | | | Production lead time doesn't include purchased materi | | 1149 |
| 3 shifts working 7 days/week 72 people 1st shift 22 2n | Critical 11 | | Critical S2 | Critical 17 | Critical 18 | 2nd & 3rd shifts partial only. Piston & Cylinder cells are | | 5608 |
| | 39580 | n/a | | | | | | 295 |
| | 39580 | n/a | | | | | Hub Processes max 30 days STF all aluminum produc | | 2684 |
| | 39580 | n/a | Critical 12 | | | | A360 TT outsource thru period | | 314 |
| current is 24/5 past history | n/a | | | | | | | | 2399 |
| | 39653 | n/a | | | | | Continuous Furnace Operation | | 47329 |
| 3 shifts (8h) 4 days + 3 | | | | | | | First approach | 714 |
| 2 shifts (8h) 4 days; 2 shifts | n/a | Critical 13 | | | | | Rates based on 11 months Production line dedicated t | | 0.5 |
| 3 shifts (7h) on 5 days - 5 weeks per year for holidays (and maintenance) | | | | | | Strong impact of global express BR710 programme in | | 256.6666667 |
| 2 shifts on 5 days + 5 curring nightly - 5 weeks per yea | Critical 14 | | | | | Rates based on 11.5 months per year. 1.5 months of safety stock to secure potenti | | 4421 |
| 1 shift or 2 shifts; 5 days per week | | | | | | | Retrofit are included in other bad. Winkles rejections | | 378 |
| 1 shift 5 days | SA 40 | | | | | | | |

FIG. 5J

| Type of shift pattern | Contracted Rates | Capacity Critical Supplier #1 | Capacity Critical Supplier #2 | Capacity Critical Supplier #3 | Capacity Critical Supplier #4 | General Comments | Reason why no Advanced Load Option | M+1 |
|---|---|---|---|---|---|---|---|---|
| 1 or 2 shifts / 5 days / (65% SA 40. | | Critical15 | | | | Retrofit are included in other load (workload very low). | | 3938 |
| FL 3 shifts/5 days; DYE 1 s SA 40 | | | | | | currently 2 machines | | 356 |
| 1 shift; flexible hours | SA 40 | | | | | | | 119 |
| 2 shifts 5 days. WK 46 3 sh SA 40 | | | | | | Paint shop has been major bottle neck for last 6 month | | 780 |
| 1X shift 8 Hours | 4.5 | | | | | | Limited to Bombardier | 31 |
| 1 shift | | Critical17 | | | | none | | 4078 |
| 1 shift | | Critical18 | | | | 9 people 3 trained on Airbus products. If rate increase | | 1440 |
| 2 shifts | | 1 | | | | 52 parts for 1 shipset and 96 parts per cycle | | 1 |
| 2 shifts | | 1 | | | | Set up is fixed whatever is nb shipset | | 135 |
| 2 shifts | | 1 | | | | 65% Returned unit yield OK for 4 monthsSet up is fixe | | 984 |
| (2) 4x10 hr shifts | None | Critical18 | Critical S3 | Critical S4 | Critical S5 | The second shift is at 50% of full staff. | | 2343 |
| 1 shift 5 days | Rate 7 Basic + Rate 6 Stre | Critical19 | | | | Unit = shipsets per month dLR dedicated line | | |
| 1 shift 5 days | 40 | Critical20 | | | | Unit = shipsets per month rSA dedicated line | | |
| 2 shift 5 days (37 Hours per week - 8 machines) | | | | | | Unit = shipsets per month on 11 months per year prod | | 12.3 |
| 1 shift 5 days | 40 | | | | | Unit = shipsets per month rSA dedicated line | | |
| 1 shift 5 days | Rate 7 Basic + Rate 6 Stre | Critical19 | Critical15 | | | Flexibility Hours = from 32 LR dedicated line | | |
| 1 Shift (7.2 Hours) - 5 Days | | | | | | | | 305 |
| 3 Shifts (7 Hours) - 5 Days | | Critical5 | | | | Normal Shifts = 6 people; Night shifts = Only 2 people; | | 76 |
| 3 Shift (7 Hours) | | | | | | 3 machines-Spot making n SA Only | | 546 |
| 1 Shift (7 Hours) - 5 Days | | | | | | Caution : people managed A320 Only | | |
| Majority is 20 Hr/day on 5 d | NA | Critical21 | Critical S4 | Critical4 | | Overtime already in place | | 16683 |
| 1x8 | | Critical22 | Critical S5 | Critical5 | Critical20 | | | 13 |
| One 8 hour shift | | | | | | | | 1530 |
| One 8 hour shift | | | | | | | | 1179 |
| 1 shift 8h | n.a. | | Critical S6 | | | | Increase to 2 shifts possibl Not applicable only Airbus | 2 |
| 1*8 | | Critical23 | | | | spare activity roughly at 2% as an average | | 37 |
| 3*8 | | Critical24 | Critical S7 | | | | | |
| Day & night shift Mon-Thur Day shift Fri | | Critical25 | | | | | | 249 |

FIG. 5K

| M+2 | M+3 | M+4 | M+5 | M+6 | M+7 | M+8 | M+9 | M+10 |
|---|---|---|---|---|---|---|---|---|
| 760 | 767 | 774 | 781 | 788 | 795 | 802 | 809 | 816 |
| 205 | 205 | 205 | 205 | 110 | 110 | 110 | 110 | 110 |
| 122 | 122 | 122 | 122 | 128 | 128 | 128 | 128 | 128 |
| 97 | 98 | 99 | 100 | 101 | 102 | 103 | 104 | 105 |
| 0.2 | 0.2 | 0.2 | 1.6 | 1.6 | 2 | 2 | 2 | 1.6 |
| 401 | 401 | 401 | 401 | 401 | 401 | 401 | 401 | 401 |
| 448 | 448 | 448 | 448 | 448 | 448 | 448 | 448 | 448 |
| 315 | 315 | 315 | 315 | 315 | 315 | 315 | 315 | 315 |
| 3079 | 3127 | 3175 | 3223 | 3271 | 3319 | 3367 | 3415 | 3463 |
| 1842 | 1886 | 1930 | 1974 | 1842 | 1886 | 1930 | 1974 | 2018 |
| 4460 | 4472.5 | 4485 | 4497.5 | 4510 | 4523 | 4535 | 4548 | 4560 |
| 481 | 484 | 487 | 490 | 493 | 496 | 499 | 502 | 505 |
| 600 | 600 | 600 | 600 | 600 | 600 | 600 | 600 | 600 |
| 74.4 | 74.4 | 74.4 | 74.4 | 74.4 | 74 | 74 | 74 | 74.4 |
| 45 | 45 | 45 | 45 | 45 | 45 | 45 | 45 | 45 |
| 1151 | 921 | 1085 | 984 | 983 | 1265 | 941 | 988 | 985 |
| 5996 | 6984 | 5349 | 6134 | 7403 | 7331 | 8743 | 7479 | 8665 |
| 496 | 273 | 364 | 271 | 317 | 357 | 366 | 157 | 398 |
| 1970 | 1123 | 1542 | 1366 | 1927 | 1937 | 965 | 1730 | 1809 |
| 282 | 173 | 241 | 232 | 286 | 173 | 244 | 313 | 219 |
| 1474 | 850 | 1178 | 1115 | 1610 | 1580 | 599 | 1573 | 1411 |
| 70802 | 20571 | 48842 | 44571 | 31034 | 47149 | 58862 | 80129 | 61862 |
| 714 | 430 | 445 | 460 | 475 | 490 | 505 | 520 | 535 |
| 0.5 | 0.5 | 0.5 | 0.5 | 0.5 | 0.5 | 1 | 1 | 0.5 |
| 265 | 275 | 285 | 285 | 300 | 317 | 315 | 310 | 305 |
| ial breakdowns on the Pinette press. | | | 5.1 | 5.1 | 5 | 5 | 5 | 5.1 |
| 4330 | 4330 | 3500 | 3500 | 3500 | 3500 | 3500 | 3500 | 3500 |
| 378 | 378 | 378 | 378 | 378 | 378 | 378 | 378 | 378 |
| 3938 | 3938 | 3298 | 3298 | 3298 | 3298 | 3298 | 3298 | 3298 |

FIG. 5I

| | M+2 | M+3 | M+4 | M+5 | M+6 | M+7 | M+8 | M+9 | M+10 |
|---|---|---|---|---|---|---|---|---|---|
| | 400 | 400 | 400 | 400 | 400 | 400 | 400 | 400 | 400 |
| | 119 | 119 | 119 | 119 | 119 | 119 | 119 | 119 | 119 |
| | 780 | 780 | 620 | 620 | 620 | 620 | 620 | 620 | 620 |
| | 31 | 31 | 31 | 31 | 31 | 31 | 31 | 31 | 31 |
| | 4078 | 4078 | 4078 | 4078 | 4078 | 4078 | 4078 | 4078 | 4078 |
| | 1440 | 1440 | 1440 | 1440 | 1440 | 1440 | 1440 | 1440 | 1440 |
| | 1 | 1 | 1 | 1 | 1 | 1 | 1 | 1 | 1 |
| | 135 | 135 | 135 | 135 | 135 | 135 | 135 | 135 | 135 |
| | 984 | 984 | 984 | 1151 | 1151 | 1151 | 1151 | 1151 | 1151 |
| | 2343 | 2343 | 2482 | 2482 | 2482 | 2482 | 2482 | 2482 | 2482 |
| | 15.1 | 15.5 | 15.8 | 16.2 | 16.2 | 16.2 | | | |
| | | | | | | | 11 | 11 | 16.2 |
| | 296 | 311 | 291 | 277 | 255 | 253 | 238 | 228 | 215 |
| | 76 | 76 | 76 | 76 | 76 | 76 | 76 | 76 | 76 |
| | 546 | 546 | 457 | 457 | 457 | 429 | 429 | 429 | 394 |
| | 16683 | 16683 | 16683 | 16350 | 16022 | 15542 | 15542 | 15542 | 15542 |
| | 13 | 13 | 13 | 13 | 13 | 13 | 13 | 13 | 13 |
| | 1556 | 1537 | 1544 | 1583 | 1604 | 1613 | 1622 | 1631 | 1640 |
| | 1202 | 1205 | 1219 | 1225 | 1254 | 1262 | 1270 | 1278 | 1286 |
| | 1 | 2 | 2 | 3 | 2 | 1 | 1 | 1 | 2 |
| | 41.44 | 41.44 | 41.44 | 41.44 | 41.44 | 41 | 41 | 41 | 41.44 |
| | 278.88 | 278.88 | 278.88 | 278.88 | 278.88 | 279 | 279 | 279 | 278.88 |
| | 90 | 90 | 90 | 90 | 90 | 90 | 90 | 180 | 180 |

FIG. 5M

| | M+11 | M+12 | M+15 | M+18 | M+21 | M+24 | M+27 | M+30 | M+33 |
|---|---|---|---|---|---|---|---|---|---|
| | 823 | 830 | 837 | 858 | 879 | 900 | 914 | 914 | 914 |
| | 110 | 110 | 120 | 120 | 140 | 140 | 140 | 140 | 140 |
| | 128 | 128 | 134 | 134 | 140 | 140 | 140 | 140 | 140 |
| | 106 | 107 | 108 | 111 | 114 | 117 | 119 | 119 | 119 |
| | 3.2 | 3.2 | 3.2 | 3.2 | 3.2 | 3.2 | 3.2 | 3.2 | 3.2 |
| | 401 | 401 | 401 | 401 | 401 | 401 | 401 | 401 | 401 |
| | 448 | 448 | 448 | 448 | 448 | 448 | 448 | 448 | 448 |
| | 315 | 315 | 315 | 315 | 315 | 315 | 315 | 315 | 315 |
| | 3511 | 3559 | 3559 | 3640 | 3721 | 3802 | 3856 | 3856 | 3856 |
| | 2062 | 2106 | 2125 | 2182 | 2239 | 2296 | 2334 | 2334 | 2334 |
| | 4572.5 | 4585 | 4597.5 | 4635 | 4672.5 | 4710 | 4735 | 4735 | 4735 |
| | 508 | 511 | 514 | 523 | 532 | 541 | 547 | 547 | 547 |
| | 600 | 600 | 600 | 600 | 600 | 600 | 600 | 600 | 600 |
| | 74.4 | 74.4 | 74.4 | 74.4 | 74.4 | 74.4 | 74.4 | 74.4 | 74.4 |
| | 45 | 45 | 45 | 45 | 45 | 45 | 45 | 45 | 45 |
| | 1136 | 859 | 1009 | 866 | 808 | 961 | 1097 | 1097 | 1097 |
| | 7338 | 8808 | 8419 | 9330 | 8687 | 7315 | 9475 | 9475 | 9475 |
| | 317 | 353 | 351 | 339 | 339 | 339 | 339 | 339 | 339 |
| | 1481 | 1701 | 1721 | 1697 | 1697 | 1697 | 1697 | 1697 | 1697 |
| | 261 | 286 | 199 | 252 | 252 | 252 | 252 | 252 | 252 |
| | 1164 | 1348 | 1370 | 1358 | 1358 | 1358 | 1358 | 1358 | 1358 |
| | 61017 | 60432 | 62043 | 52717 | 52717 | 52717 | 52717 | 52717 | 52717 |
| | 550 | 565 | 580 | 629 | 629 | 629 | 629 | 629 | 629 |
| | 0.5 | 0.5 | 0.5 | 0.5 | 0.5 | 0.5 | 0.5 | 0.5 | 0.5 |
| | 300 | 295 | 290 | 280 | 278 | 278 | 285 | 285 | 285 |
| | 5.1 | 5.1 | 5.1 | 5.1 | 5.1 | 5.1 | 5.1 | 5.1 | 5.1 |
| | 3500 | 3500 | 3500 | 3500 | 3500 | 3500 | 3500 | 3500 | 3500 |
| | 378 | 378 | 378 | 378 | 378 | 378 | 378 | 378 | 378 |

FIG. 5N

| | M+11 | M+12 | M+15 | M+18 | M+21 | M+24 | M+27 | M+30 | M+33 |
|---|---|---|---|---|---|---|---|---|---|
| | 3298 | 3298 | 3298 | 3298 | 3298 | 3298 | 3298 | 3298 | 3298 |
| | 400 | 400 | 400 | 400 | 400 | 400 | 400 | 400 | 400 |
| | 119 | 119 | 119 | 119 | 119 | 119 | 119 | 119 | 119 |
| | 620 | 620 | 620 | 620 | 620 | 620 | 620 | 620 | 620 |
| | 31 | 31 | 31 | 31 | 31 | 31 | 31 | 31 | 31 |
| | 4078 | 4078 | 4078 | 4078 | 3921 | 3921 | 3921 | 3921 | 3921 |
| | 1440 | 1440 | 1440 | 1440 | 1440 | 1440 | 1440 | 1440 | 1440 |
| | 1 | 1 | 1 | 1 | 1 | 1 | 1 | 1 | 1 |
| | 135 | 135 | 135 | 135 | 135 | 135 | 135 | 135 | 135 |
| | 1151 | 1151 | 1151 | 1151 | 1151 | 1151 | 1151 | 1151 | 1151 |
| | 2482 | 2482 | 2482 | 2482 | 2628 | 2628 | 2628 | 2628 | 2628 |
| | | | | | | | | | |
| | 16.2 | 16.2 | 16.2 | 16.9 | 20.6 | 26.1 | 26.1 | 26.1 | 26.1 |
| | | | | | | | | | |
| | 194 | 156 | 148 | 154 | 123 | 120 | 120 | 120 | 120 |
| | 76 | 76 | 76 | 76 | 96 | 96 | 86 | 86 | 86 |
| | 394 | 394 | 226 | 336 | 336 | 336 | 336 | 336 | 336 |
| | 15542 | 15542 | 15542 | 15542 | 15542 | 15542 | 15542 | 15542 | 15542 |
| | 13 | 13 | 14 | 14 | 14 | 14 | 14 | 14 | 14 |
| | 1649 | 1658 | 1667 | 1694 | 1721 | 1748 | 1766 | 1766 | 1766 |
| | 1294 | 1302 | 1310 | 1334 | 1358 | 1382 | 1398 | 1398 | 1398 |
| | 2 | 2 | 1 | 1 | 1 | 1 | 2 | 2 | 2 |
| | 41.44 | 41.44 | 41.44 | 45.584 | 45.584 | 45.584 | 45.584 | 45.584 | 45.584 |
| | 278.88 | 278.88 | 278.88 | 306.768 | 306.768 | 306.768 | 306.768 | 306.768 | 306.768 |
| | 180 | 180 | 180 | 270 | 270 | 360 | 360 | 360 | 360 |

FIG. 50

| M+36 | Reason why no Advanced Capa Option | Constraint #1 | Action #1 | New expected Capacity #1 | Time #1 | Start date #1 | Capex #1 | Constraint #2 |
|---|---|---|---|---|---|---|---|---|
| | | Molding Lines | Switch the current Develop | 7650 | 1 | 01/10/2007 | | Molding Lines |
| 914 | | Manpower | Add additional shift on two | 1499 | 6 | | | |
| 140 | | Manpower | Efficiency increase to 70% | 933 | 1 | 01/09/2007 | | Manpower |
| 140 | | Manpower | Efficiency increase to 70% | 816 | 1 | 01/09/2007 | | Manpower |
| 119 | | manpower | Recruit and train additional | 340 | 9 | | | |
| 3.2 | | Machine | Increase of the capacity of | 14.6 | 6 | | | |
| 401 | | Manpower | 1 Operator transferred to a | 823 | 1 | | | Manpower |
| 448 | | Manpower | Extra Hours | 859 | 1 | | | Manpower |
| 315 | | Manpower | Extra hours | 543 | 1 | | | Manpower |
| 3656 | | ARC furnace capacity | 16 shifts WE with 8 operat | 4145.833333 | 4 | 01/09/2007 | | ARC furnace capacity |
| 2934 | | ESR furnace capacity | Available time increased to | 2708.333333 | 4 | 01/09/2007 | | ESR furnace capacity |
| 4735 | | VAR Furnace capacity | Imply 46.5week/year | 5991.333333 | 4 | 01/09/2007 | | VAR Furnace capacity |
| 547 | | VIM furnace capacity | 21 shfts/week | 823.3333333 | 16 | 01/09/2007 | | VIM furnace capacity |
| 600 | | | | | | | | |
| 74.4 | | | | | | | | |
| 45 | | Manpower | 1 person will be added goi | 300 | 1 | 01/11/2007 | | |
| 1097 | | | Increase overtime for 8 peo | 1230 | 5 | 01/10/2007 | | Machine |
| 9475 | | Manpower | 3 open requisitions in GE a | 9201 | 6 | 01/10/2007 | | Manpower |
| 339 | | Labor | HOSLean Implementation | 376.2 | 6 | 01/10/2007 | | |
| 1697 | | Penetrant Inspection | add labor resource | 1952.93 | 5 | 01/10/2007 | | Post Processing |
| 252 | | | | | | | | |
| 1358 | | Machining | Add new Wheel Machine C | 1422.67 | 5 | 01/10/2007 | | Machining |
| 52717 | | CVD | Two New CVD's added (C\ | 57679.1954 | 24 | 01/11/2005 | | CVD |
| 629 | | Autoclaves | Investment in a 5th autocla | 2931 | 18 | 01/09/2007 | | |
| 0.5 | | APF Assembly jigs | Invest in 1 additional set of | 39 | 8 | | | Manpower |
| 285 | | 5 axis machine | Increase opening time to 2 | 561.6 | 1 | 01/10/2007 | | 5 axis machine |
| 5.1 | | Molding tools | Existing tools (have done a | 40 | 3 | 01/01/2008 | 200k€ (ROM) | Manpower |
| 3500 | | Manpower | Training 10 fitters | 8400 | 5 | 01/12/2007 | | ICY Measurement |
| 378 | | Manpower | Training 1 more inspector | 1008 | 4 | | | concessions |

FIG. 5P

| M+36 | Reason why no Advanced Capa Option | Constraint #1 | Action #1 | New expected Capacity #1 | Time #1 | Start date #1 | Capex #1 | Constraint #2 |
|---|---|---|---|---|---|---|---|---|
| 3298 | | Tooling (SA, MLGF) | New tooling set ordered fro | 7320 | 6 | 01/06/2007 | 150000 | Manpower |
| 400 | | NC-machine | New NC-machine acquisiti | 1176 | 4 | 01/11/2007 | | Manpower |
| 119 | | Manpower | Training 1 more operator. | 664 | 4 | 01/12/2007 | | flexibility |
| 620 | | SA MLGF priming | SA MLGF surface material | 1725 | 2 | 01/11/2007 | | Quality of parts |
| 31 | | staffing | hire 1 additional shift = 1 e | 400 | 1 | 01/06/2008 | | |
| 3921 | | | | | | | | |
| 1440 | | human ressource | hiring or moving and train 1 | 1600 | 2 | 01/10/2007 | | human ressource |
| 1 | | | | | | | | |
| 135 | | | | | | | | |
| 1151 | | out sourcing | sub contracting of load | 1447 | | 01/09/2007 | | machine |
| 2628 | | Primary Assembly | Convert from Batch to Star | 2635 | 3 | 01/01/2008 | | ATP Test Cell |
| | | Manpower | Rate from 8.5 to 9.3 by hiri | 9.3 | 3 | 01/04/2008 | | Mechanicals jigs |
| | | Manpower | Rate from 34.5 to 38.7 by r | 38.7 | 2 | 01/01/2008 | | Manpower |
| 26.1 | | Machine | New printing machine from | 138 | 10 | 01/02/2008 | | Machine |
| | | Manpower | Rate 36.2 to 39 - Efficiency | 39 | 10 | 01/02/2008 | | Manpower |
| | | Manpower | Rate from 8.5 to 9.3 by hiri | 9.3 | 6 | 01/04/2008 | | Manpower |
| 120 | | People | Hire temporary people (50 | 528 | 9 | 01/08/2009 | | |
| 86 | | Test Equipment | Transfer Eurocopter worldc | 416 | 4 | 01/10/2007 | | Test Equipment |
| 336 | | laser machine | WE shift implementation (1 | 1140 | 1 | | | laser machine |
| | | 120 VU-80VU - Caisses N | Buy Production / Transport | 37 | 6 | | | 120 VU-80VU - Caisses N |
| 15542 | | Man hours | recruiting of 5 machinists | 17883 | 1 | 01/11/2007 | | |
| 14 | | MAN + TOOL | HIRE THREE PEOPLE PL | 110 | 1 | 01/12/2007 | 120 | MAN + TOOL |
| 1766 | | Manpower | Hire 3 more assembler/test | 2340 | 3 | 01/02/2008 | | Assembly lead-time |
| 1398 | | Manpower | Hire 3 more assembler/test | 1780 | 3 | 01/02/2008 | | Test equipment |
| 2 | | Lack of workers | To hire additional workers , | 4 | 3 | 01/06/2007 | n.a. | Quality |
| 45.584 | | human ressources | add 1 operator in the line | 2099.2 | 3 | | | human ressources |
| 306.768 | | human ressource | with 1 operator added in fir | 825.84375 | 3 | | | human ressource |
| 360 | | Manpower | Overtime 4hrs Sat & Sun a | 314 | 1 | | | Manpower |

FIG. 5Q

| Action #2 | New expected Capacity #2 | Time #2 | Start date #2 | Capex #2 | Constraint #3 | Action #3 | New expected Capacity #3 | Time #3 |
|---|---|---|---|---|---|---|---|---|
| Set-up a fourth line close to | 10200 | 9 | | | | | | |
| Recruit and train 1 person | 1049 | 12 | | | | | | |
| Recruit and train 1 person | 932 | 12 | | | | | | |
| Extra hours | 879 | 1 | | | Manpower | Hire and train 1 operator | 935 | 6 |
| Outsourcing of the assemb | 979 | 6 | | | | | | |
| local subcontracting for the | 573 | 4 | | | | | | |
| Fiabilisation+productivity+c | 4375 | 4 | 01/09/2007 | | ARC furnace capacity | 16 shifts WE with 22 opera | 4875 | 16 |
| OEE 67% | 2787.5 | 4 | 01/09/2007 | | ESR furnace capacity | OEE 70% | 2912.5 | 16 |
| OEE 82% | 6141.333333 | 4 | 01/09/2007 | | VAR Furnece capacity | Subcontracting WYZ Italy | 8433 | 4 |
| New VIM furnace | 2490 | 30 | | | | | | |
| Purchase new millturn mac | 1471 | 6 | 01/11/2007 | | | | | |
| Working overtime till 12% a | 9528 | | 01/05/2008 | | | | | |
| HOS Lean Deployment | 1991.9866 | 6 | 01/10/2007 | | | | | |
| HOS Lean Deployment | 1493.8035 | 6 | 01/10/2007 | | | | | |
| CFPI Implementation/impro | 6344.69 | 12 | 01/06/2007 | | | | | |
| Hire 2 additional operators | 42 | 2 | | | | | | |
| Purchase 2nd 5 axis mach | 819 | 12 | 01/05/2007 | | 5 axis machine | Productivity improvement t | 982.8 | 12 |
| Increase workforce from 12 | 425 | 4 | 01/06/2008 | | Manpower | Increase workforce from 15 | 50.7 | 4 |
| FARO arm qualification to t | 8500 | 2 | | | | | | |

FIG. 5R

| Action #2 | New expected Capacity #2 | Time #2 | Start date #2 | Capex #2 | Constraint #3 | Action #3 | New expected Capacity #3 | Time #3 |
|---|---|---|---|---|---|---|---|---|
| Quality improvement projec | 1050 | 2 | | | | | | |
| Training 10 new lamination | 8600 | 5 | 01/12/2007 | | Lectra Cutter | More shifts required for pre | 9300 | 6 |
| NC-Machine operators req | 1326 | 2 | | | | | | |
| working in 2 shifts if require | 700 | 2 | 01/02/2008 | | x-ray capacity | Sub contract x-ray inspecti | 750 | 1 |
| Decreasing defects on part | 1850 | 3 | 01/12/2007 | | Manpower | Change from 2 shifts to 3 s | 2000 | 4 |
| | | | | | | | | |
| Hiring moving and train 1 a | 1760 | 2 | 01/12/2009 | | | | | |
| | | | | | | | | |
| Gear Hobbing and Shaping | 1966 | 8 | 01/11/2007 | yes | | | | |
| Add an additional test over | 3140 | 3 | 01/03/2008 | | ATP Test Cell | Add an additional test over | 3788 | 3 |
| Rate from 9.3 to 14 with fou | 10.4 | 4 | | | Manpower | Rate from 10.4 to 12 by hir | 12 | 3 |
| Rate from 38.7 to 43 by hir | 42.9 | 2 | | | Manpower | Rate from 42.9 to 47.2 by h | 47.2 | 2 |
| New printing machine (from | 154 | 10 | | | Machine | New printing machine (from | 169 | 10 |
| Rate 39 to 42 - Efficiency i | 42 | 6 | 01/12/2008 | | Manpower | Rate 42 to 43.5 by hiring a | 43.5 | 2 |
| Rate from 9.3 to 10.2 by hi | 10.2 | 6 | 01/10/2008 | | Integration jigs | Rate from 10.2 to 11 by 2n | 11 | 6 |
| | | | | | | | | |
| Transfer LR workload ('13 t | 429 | 9 | 01/06/2008 | | Test Equipment | Buy a new Test Bay (4000 | 559 | 12 |
| WE shift implementation (2 | 1332 | 1 | | | | | | |
| Buy Production / Transport | 40 | 6 | | | 120VU - Doors Routing Ste | 2 additional stations (10 m | 42 | 6 |
| | | | | | | | | |
| HIRE THREE PEOPLE PL | 123 | 3 | 01/07/2008 | 110 | MAN + TOOL | HIRE 2 AND HALF PEOPL | 134 | 3 |
| Lean and six sigma kaizen | 2410 | 4 | 01/01/2008 | | | | | |
| Purchase new fixtures and | 1880 | 5 | 01/01/2008 | | | | | |
| To decrease scrap rate | 5 | 2 | 01/10/2007 | n.a. | shift | To establish additional shif | 6 | 6 |
| add 1 operator in the line | 2230.4 | 3 | | | human ressources | add 1 operator in the line | 2361.6 | 3 |
| with 1 operator added in se | 885.6875 | 3 | | | human ressource | with 1 operator added in th | 933.5625 | 3 |
| Extra shift (158 hrs) | 472 | 2 | | | Test Rig | Utilise second test rig (curr | 944 | 9 |

FIG. 5S

| Start date #3 | Capex #3 | Constraint #4 | Action #4 | New expected Capacity # | Time #4 | Start date #4 | Capex #4 | Constraint #5 |
|---|---|---|---|---|---|---|---|---|
| 01/09/2007 | | ARC furnace capacity | Fiabilisation | 4916.666667 | 16 | 01/09/2007 | | ARC furnace capacity |
| 01/09/2007 | | ESR furnace capacity | New ESR furnace | 3425 | 24 | | | |
| 01/09/2007 | | VAR Furnace capacity | OEE 85% | 6658 | 16 | 01/09/2007 | | VAR Furnace capacity |
| | | | | | | | | |
| | | | | | | | | |
| | | | | | | | | |
| | | | | | | | | |
| 01/09/2007 | | 5 axis machine | Increase opening time to 2 | 1346 | 1 | | | |

FIG. 5T

| Start date #3 | Capex #3 | Constraint #4 | Action #4 | New expected Capacity #4 | Time #4 | Start date #4 | Capex #4 | Constraint #5 |
|---|---|---|---|---|---|---|---|---|
| 01/01/2008 | | | | | | | | |
| | | | | | | | | |
| 01/11/2007 | | | | | | | | |
| | | | | | | | | |
| | | | | | | | | |
| 01/05/2008 | | Manpower | Increase second shift staff | 5024 | 6 | 01/10/2008 | | |
| | | | | | | | | |
| | | Manpower | Rate 43.5 to 45 by hiring a | 45 | 2 | | | |
| | | Integration jigs | Rate from 11 to 12 by either | 12 | 12 | | | Area |
| | | | | | | | | |
| | | | | | | | | |
| | | | | | | | | |
| 01/02/2009 | 100 | human ressources | add 1 operator in the line | 2492.8 | 3 | | | |
| 01/01/2008 | n.a. | Test Rig | Utilise manual test circuits | 1304 | 9 | | | |

FIG. 5U

| Action #5 | New expected Capacity #5 | Time #5 | Start date #5 | Capex #5 |
|---|---|---|---|---|
| | | | | |
| | | | | |
| | | | | |
| | | | | |
| | | | | |
| | | | | |
| External supply Firminy | 5500 | 28 | 07/09/2008 | |
| New VAR furnace | 7199.666667 | 28 | 07/07/2008 | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| Rate 45 to 46.5 by hiring a | 46.5 | 8 | | |
| | | | | |
| | | | | |
| | | | | |
| | | | | |
| | | | | |

FIG. 6A

Programme Rate Data

| Year | Month | Prog. XY241<br>Airbus Single Aisle<br>Programme | Prog. XY241-321<br>Airbus A321<br>Programme | Prog. RW425<br>Airbus Long<br>Range Programme | Prog. RW425-B<br>Airbus A330/340<br>Basic Programme | Prog. RW425-S<br>Airbus A340-<br>500/600<br>Programme | Prog. 9J-3R3-B<br>Airbus A380<br>Programme | Prog. MM98P<br>Airbus A400M<br>Programme | Blank<br>Airbus A350<br>Programme | Prog. OPI496<br>Airbus ATR<br>Programme |
|---|---|---|---|---|---|---|---|---|---|---|
| 2006 | Jan-06 | 8.00 | 0.50 | 20.00 | 10.00 | 10.00 | 0.20 | 10.00 | 2.00 | 6.00 |
| 2006 | Feb-06 | 8.00 | 0.50 | 20.00 | 10.00 | 10.00 | 0.20 | 10.00 | 2.00 | 6.00 |
| 2006 | Mar-06 | 10.00 | 0.50 | 20.00 | 10.00 | 10.00 | 0.20 | 10.00 | 2.00 | 6.00 |
| 2006 | Apr-06 | 10.00 | 0.50 | 20.00 | 10.00 | 10.00 | 0.20 | 11.00 | 2.00 | 6.00 |
| 2006 | May-06 | 10.00 | 0.50 | 20.00 | 10.00 | 10.00 | 0.20 | 11.00 | 2.00 | 6.00 |
| 2006 | Jun-06 | 10.00 | 0.50 | 20.00 | 10.00 | 10.00 | 0.20 | 11.00 | 2.00 | 6.00 |
| 2006 | Jul-06 | 10.00 | 0.50 | 20.50 | 10.50 | 10.00 | 0.30 | 11.00 | 3.00 | 6.00 |
| 2006 | Aug-06 | 10.00 | 0.50 | 20.50 | 10.50 | 10.00 | 0.30 | 11.00 | 3.00 | 6.00 |
| 2006 | Sep-06 | 10.00 | 0.50 | 20.50 | 10.50 | 10.00 | 0.30 | 11.00 | 3.00 | 6.00 |
| 2006 | Oct-06 | 10.00 | 0.50 | 20.50 | 10.50 | 10.00 | 0.30 | 12.00 | 3.00 | 6.00 |
| 2006 | Nov-06 | 10.00 | 0.50 | 20.50 | 10.50 | 10.00 | 0.40 | 12.00 | 3.20 | 6.00 |
| 2006 | Dec-06 | 10.00 | 0.50 | 20.50 | 10.50 | 10.00 | 0.40 | 12.00 | 3.20 | 8.00 |
| 2007 | Jan-07 | 10.50 | 1.00 | 21.00 | 10.50 | 10.50 | 0.40 | 12.00 | 3.20 | 8.00 |
| 2007 | Feb-07 | 10.50 | 1.00 | 21.00 | 10.50 | 10.50 | 0.40 | 12.00 | 3.30 | 8.00 |
| 2007 | Mar-07 | 10.50 | 1.00 | 21.00 | 10.50 | 10.50 | 0.40 | 12.00 | 3.30 | 8.00 |
| 2007 | Apr-07 | 10.50 | 1.00 | 21.00 | 10.50 | 10.50 | 0.43 | 13.00 | 3.30 | 8.00 |
| 2007 | May-07 | 10.50 | 1.00 | 21.20 | 10.70 | 10.50 | 0.45 | 13.00 | 3.30 | 8.00 |
| 2007 | Jun-07 | 10.50 | 2.00 | 21.20 | 10.70 | 10.50 | 0.46 | 13.00 | 3.40 | 8.00 |
| 2007 | Jul-07 | 10.50 | 2.00 | 21.20 | 10.70 | 10.50 | 0.48 | 14.00 | 3.40 | 8.00 |

FIG. 6B

| Year | Month | Prog. XYZ41<br>Airbus Single Aisle Programme | Prog. XYZ41-321<br>Airbus A321 Programme | Prog. RW425<br>Airbus Long Range Programme | Prog. RW425-B<br>Airbus A330/340 Basic Programme | Prog. RW425-S<br>Airbus A340-500/600 Programme | Prog. 9J-3R3-B<br>Airbus A380 Programme | Prog. MM98P<br>Airbus A400M Programme | Blank<br>Airbus A350 Programme | Prog. OPI496<br>Airbus ATR Programme |
|---|---|---|---|---|---|---|---|---|---|---|
| 2007 | Aug-07 | 11.00 | 2.00 | 21.20 | 10.70 | 10.50 | 0.49 | 14.00 | 3.40 | 8.00 |
| 2007 | Sep-07 | 11.00 | 2.00 | 21.20 | 10.70 | 10.50 | 0.51 | 14.00 | 3.50 | 8.00 |
| 2007 | Oct-07 | 11.00 | 2.00 | 21.20 | 10.70 | 10.50 | 0.52 | 15.00 | 3.50 | 8.00 |
| 2007 | Nov-07 | 11.00 | 2.00 | 21.20 | 10.70 | 10.50 | 0.54 | 15.00 | 3.50 | 8.00 |
| 2007 | Dec-07 | 11.50 | 2.00 | 21.20 | 10.70 | 10.50 | 0.55 | 15.00 | 3.60 | 8.00 |
| 2008 | Jan-08 | 11.50 | 3.00 | 21.80 | 10.80 | 11.00 | 0.57 | 16.00 | 3.60 | 10.00 |
| 2008 | Feb-08 | 11.50 | 3.00 | 21.80 | 10.80 | 11.00 | 0.58 | 16.00 | 3.60 | 10.00 |
| 2008 | Mar-08 | 11.50 | 3.00 | 21.80 | 10.80 | 11.00 | 0.60 | 16.00 | 3.70 | 10.00 |
| 2008 | Apr-08 | 13.00 | 3.00 | 21.80 | 10.80 | 11.00 | 0.62 | 16.00 | 3.70 | 10.00 |
| 2008 | May-08 | 13.00 | 3.00 | 21.80 | 10.80 | 11.00 | 0.63 | 16.00 | 3.80 | 10.00 |
| 2008 | Jun-08 | 13.00 | 3.00 | 21.80 | 10.80 | 11.00 | 0.65 | 16.00 | 3.80 | 10.00 |
| 2008 | Jul-08 | 13.00 | 3.00 | 22.30 | 10.80 | 11.50 | 0.66 | 17.00 | 4.00 | 10.00 |
| 2008 | Aug-08 | 13.00 | 3.00 | 22.30 | 10.80 | 11.50 | 0.68 | 17.00 | 4.00 | 10.00 |
| 2008 | Sep-08 | 13.00 | 3.00 | 22.30 | 10.80 | 11.50 | 0.69 | 18.00 | 4.00 | 10.00 |
| 2008 | Oct-08 | 13.00 | 3.00 | 22.30 | 10.80 | 11.50 | 0.71 | 18.00 | 4.20 | 10.00 |
| 2008 | Nov-08 | 13.00 | 3.00 | 22.50 | 10.80 | 11.50 | 0.72 | 18.00 | 4.20 | 10.00 |
| 2008 | Dec-08 | 13.00 | 3.00 | 22.50 | 11.00 | 11.50 | 0.74 | 19.00 | 4.20 | 10.00 |
| 2009 | Jan-09 | 13.00 | 4.00 | 22.50 | 11.00 | 11.50 | 0.75 | 19.00 | 4.20 | 12.00 |
| 2009 | Feb-09 | 13.00 | 4.00 | 22.50 | 11.00 | 11.50 | 0.77 | 19.00 | 4.40 | 12.00 |
| 2009 | Mar-09 | 14.00 | 4.00 | 22.50 | 11.00 | 11.50 | 0.78 | 19.00 | 4.40 | 12.00 |
| 2009 | Apr-09 | 14.00 | 4.00 | 22.70 | 11.00 | 11.70 | 0.80 | 19.00 | 4.40 | 12.00 |
| 2009 | May-09 | 14.00 | 4.00 | 22.70 | 11.00 | 11.70 | 0.81 | 20.00 | 4.40 | 12.00 |

FIG. 6C

| | | | | | | | | |
|---|---|---|---|---|---|---|---|---|
| 2009 | Jun-09 | 14.00 | 4.00 | 22.70 | 11.00 | 11.70 | 0.83 | 20.00 | 4.50 | 12.00 |
| 2009 | Jul-09 | 14.00 | 4.00 | 22.70 | 11.00 | 11.70 | 0.84 | 20.00 | 4.50 | 12.00 |
| 2009 | Aug-09 | 14.00 | 4.00 | 22.70 | 11.00 | 11.70 | 0.86 | 21.00 | 4.50 | 12.00 |
| 2009 | Sep-09 | 14.50 | 4.00 | 23.00 | 11.00 | 12.00 | 0.87 | 21.00 | 4.50 | 12.00 |
| 2009 | Oct-09 | 14.50 | 4.00 | 23.00 | 11.00 | 12.00 | 0.89 | 21.00 | 4.80 | 12.00 |
| 2009 | Nov-09 | 14.50 | 4.00 | 23.00 | 11.00 | 12.00 | 0.90 | 22.00 | 4.80 | 12.00 |
| 2009 | Dec-09 | 14.50 | 4.00 | 23.00 | 11.00 | 12.00 | 0.92 | 22.00 | 4.80 | 12.00 |
| 2010 | Jan-10 | 14.50 | 5.00 | 23.00 | 11.00 | 12.00 | 0.93 | 22.00 | 5.00 | 14.00 |
| 2010 | Feb-10 | 15.00 | 5.00 | 23.00 | 11.00 | 12.00 | 0.95 | 22.00 | 5.00 | 14.00 |
| 2010 | Mar-10 | 15.00 | 5.00 | 23.00 | 11.00 | 12.00 | 0.96 | 22.00 | 5.00 | 14.00 |
| 2010 | Apr-10 | 15.00 | 5.00 | 23.50 | 11.30 | 12.20 | 0.98 | 23.00 | 5.10 | 14.00 |
| 2010 | May-10 | 15.00 | 5.00 | 23.50 | 11.30 | 12.20 | 0.99 | 23.00 | 5.10 | 14.00 |
| 2010 | Jun-10 | 15.00 | 5.00 | 23.50 | 11.30 | 12.20 | 1.01 | 23.00 | 5.10 | 14.00 |
| 2010 | Jul-10 | 15.00 | 5.00 | 23.50 | 11.30 | 12.20 | 1.02 | 23.00 | 5.20 | 14.00 |
| 2010 | Aug-10 | 15.00 | 5.00 | 23.50 | 11.30 | 12.20 | 1.04 | 23.00 | 5.20 | 14.00 |
| 2010 | Sep-10 | 15.00 | 5.00 | 23.50 | 11.30 | 12.20 | 1.05 | 25.00 | 5.40 | 14.00 |
| 2010 | Oct-10 | 15.00 | 5.00 | 24.00 | 11.30 | 12.70 | 1.07 | 25.00 | 5.40 | 14.00 |
| 2010 | Nov-10 | 15.00 | 5.00 | 24.00 | 11.30 | 12.70 | 1.08 | 25.00 | 5.40 | 14.00 |
| 2010 | Dec-10 | 15.00 | 5.00 | 24.00 | 11.30 | 12.70 | 1.10 | 25.00 | 5.40 | 14.00 |
| 2011 | Jan-11 | 15.00 | 5.00 | 24.00 | 11.30 | 12.70 | 1.12 | 25.00 | 5.60 | 16.00 |
| 2011 | Feb-11 | 15.00 | 5.00 | 24.00 | 11.30 | 12.70 | 1.13 | 25.00 | 5.60 | 16.00 |
| 2011 | Mar-11 | 15.00 | 5.00 | 24.00 | 11.30 | 12.70 | 1.15 | 25.00 | 5.60 | 16.00 |
| 2011 | Apr-11 | 15.00 | 5.00 | 24.40 | 11.70 | 12.70 | 1.16 | 25.00 | 5.70 | 16.00 |

FIG. 6D

| | | | | | | | | | | |
|---|---|---|---|---|---|---|---|---|---|---|
| 2011 | May-11 | 15.00 | 5.00 | 24.40 | 11.70 | 12.70 | 1.18 | 25.00 | 5.70 | 16.00 |
| 2011 | Jun-11 | 15.00 | 5.00 | 24.40 | 11.70 | 12.70 | 1.19 | 25.00 | 5.70 | 16.00 |
| 2011 | Jul-11 | 15.00 | 5.00 | 24.40 | 11.70 | 12.70 | 1.21 | 25.00 | 5.70 | 16.00 |
| 2011 | Aug-11 | 15.00 | 5.00 | 24.40 | 11.70 | 12.70 | 1.22 | 25.00 | 5.70 | 16.00 |
| 2011 | Sep-11 | 15.00 | 5.00 | 24.40 | 11.70 | 12.70 | 1.24 | 25.00 | 5.80 | 16.00 |
| 2011 | Oct-11 | 15.00 | 5.00 | 24.40 | 11.70 | 12.70 | 1.25 | 25.00 | 5.80 | 16.00 |
| 2011 | Nov-11 | 15.00 | 5.00 | 24.40 | 11.70 | 12.70 | 1.27 | 25.00 | 5.80 | 16.00 |
| 2011 | Dec-11 | 15.00 | 5.00 | 24.70 | 11.70 | 13.00 | 1.28 | 25.00 | 5.80 | 16.00 |
| 2012 | Jan-12 | 15.00 | 5.00 | 24.70 | 11.70 | 13.00 | 1.30 | 25.00 | 5.90 | 18.00 |
| 2012 | Feb-12 | 15.00 | 5.00 | 24.70 | 11.70 | 13.00 | 1.31 | 25.00 | 5.90 | 18.00 |
| 2012 | Mar-12 | 15.00 | 5.00 | 24.70 | 11.70 | 13.00 | 1.33 | 25.00 | 5.90 | 18.00 |
| 2012 | Apr-12 | 15.00 | 5.00 | 24.70 | 11.70 | 13.00 | 1.34 | 25.00 | 5.90 | 18.00 |
| 2012 | May-12 | 15.00 | 5.00 | 25.00 | 12.00 | 13.00 | 1.36 | 25.00 | 6.00 | 18.00 |
| 2012 | Jun-12 | 15.00 | 5.00 | 25.00 | 12.00 | 13.00 | 1.37 | 25.00 | 6.00 | 18.00 |
| 2012 | Jul-12 | 15.00 | 5.00 | 25.00 | 12.00 | 13.00 | 1.39 | 25.00 | 6.00 | 18.00 |
| 2012 | Aug-12 | 15.00 | 5.00 | 25.00 | 12.00 | 13.00 | 1.40 | 25.00 | 6.00 | 18.00 |
| 2012 | Sep-12 | 15.00 | 5.00 | 25.00 | 12.00 | 13.00 | 1.42 | 25.00 | 6.10 | 18.00 |
| 2012 | Oct-12 | 15.00 | 5.00 | 25.00 | 12.00 | 13.00 | 1.43 | 25.00 | 6.10 | 18.00 |
| 2012 | Nov-12 | 15.00 | 5.00 | 25.00 | 12.00 | 13.00 | 1.45 | 25.00 | 6.10 | 18.00 |
| 2012 | Dec-12 | 15.00 | 5.00 | 25.00 | 12.00 | 13.00 | 1.46 | 25.00 | 6.10 | 18.00 |
| 2013 | Jan-13 | 15.00 | 5.00 | 25.00 | 12.00 | 13.00 | 1.48 | 25.00 | 6.10 | 20.00 |
| 2013 | Feb-13 | 15.00 | 5.00 | 25.00 | 12.00 | 13.00 | 1.49 | 25.00 | 6.30 | 20.00 |
| 2013 | Mar-13 | 15.00 | 5.00 | 25.00 | 12.00 | 13.00 | 1.51 | 25.00 | 6.30 | 20.00 |
| 2013 | Apr-13 | 15.00 | 5.00 | 25.00 | 12.00 | 13.00 | 1.52 | 25.00 | 6.30 | 20.00 |
| 2013 | May-13 | 15.00 | 5.00 | 25.00 | 12.00 | 13.00 | 1.54 | 25.00 | 6.30 | 20.00 |

FIG. 6E

| | | | | | | | | | |
|---|---|---|---|---|---|---|---|---|---|
| 2013 | Jun-13 | 15.00 | 5.00 | 25.00 | 12.00 | 13.00 | 1.55 | 25.00 | 6.30 | 20.00 |
| 2013 | Jul-13 | 15.00 | 5.00 | 25.00 | 12.00 | 13.00 | 1.57 | 25.00 | 6.30 | 20.00 |
| 2013 | Aug-13 | 15.00 | 5.00 | 25.00 | 12.00 | 13.00 | 1.58 | 25.00 | 6.50 | 20.00 |
| 2013 | Sep-13 | 15.00 | 5.00 | 25.00 | 12.00 | 13.00 | 1.60 | 25.00 | 6.50 | 20.00 |
| 2013 | Oct-13 | 15.00 | 5.00 | 25.00 | 12.00 | 13.00 | 1.62 | 25.00 | 6.80 | 20.00 |
| 2013 | Nov-13 | 15.00 | 5.00 | 25.00 | 12.00 | 13.00 | 1.63 | 25.00 | 6.80 | 20.00 |
| 2013 | Dec-13 | 15.00 | 5.00 | 25.00 | 12.00 | 13.00 | 1.65 | 25.00 | 6.80 | 20.00 |
| 2014 | Jan-14 | 15.00 | 5.00 | 25.00 | 12.00 | 13.00 | 1.66 | 25.00 | 6.80 | 22.00 |
| 2014 | Feb-14 | 15.00 | 5.00 | 25.00 | 12.00 | 13.00 | 1.68 | 25.00 | 7.00 | 22.00 |
| 2014 | Mar-14 | 15.00 | 5.00 | 25.00 | 12.00 | 13.00 | 1.69 | 25.00 | 7.00 | 22.00 |
| 2014 | Apr-14 | 15.00 | 5.00 | 25.00 | 12.00 | 13.00 | 1.71 | 25.00 | 7.00 | 22.00 |
| 2014 | May-14 | 15.00 | 5.00 | 25.00 | 12.00 | 13.00 | 1.72 | 25.00 | 7.40 | 22.00 |
| 2014 | Jun-14 | 15.00 | 5.00 | 25.00 | 12.00 | 13.00 | 1.74 | 25.00 | 7.40 | 22.00 |
| 2014 | Jul-14 | 15.00 | 5.00 | 25.00 | 12.00 | 13.00 | 1.75 | 25.00 | 7.40 | 22.00 |
| 2014 | Aug-14 | 15.00 | 5.00 | 25.00 | 12.00 | 13.00 | 1.77 | 25.00 | 7.40 | 22.00 |
| 2014 | Sep-14 | 15.00 | 5.00 | 25.00 | 12.00 | 13.00 | 1.78 | 25.00 | 7.40 | 22.00 |
| 2014 | Oct-14 | 15.00 | 5.00 | 25.00 | 12.00 | 13.00 | 1.80 | 25.00 | 8.00 | 22.00 |
| 2014 | Nov-14 | 15.00 | 5.00 | 25.00 | 12.00 | 13.00 | 1.81 | 25.00 | 8.00 | 22.00 |
| 2014 | Dec-14 | 15.00 | 5.00 | 25.00 | 12.00 | 13.00 | 1.83 | 25.00 | 8.00 | 22.00 |
| 2015 | Jan-15 | 15.00 | 5.00 | 25.00 | 12.00 | 13.00 | 1.84 | 25.00 | 8.00 | 24.00 |
| 2015 | Feb-15 | 15.00 | 5.00 | 25.00 | 12.00 | 13.00 | 1.86 | 25.00 | 8.00 | 24.00 |
| 2015 | Mar-15 | 15.00 | 5.00 | 25.00 | 12.00 | 13.00 | 1.87 | 25.00 | 8.00 | 24.00 |

FIG. 6F

| | | | | | | | | | | |
|---|---|---|---|---|---|---|---|---|---|---|
| 2015 | Apr-15 | 15.00 | 5.00 | 25.00 | 12.00 | 13.00 | 1.89 | 25.00 | 8.00 | 24.00 |
| 2015 | May-15 | 15.00 | 5.00 | 25.00 | 12.00 | 13.00 | 1.90 | 25.00 | 8.20 | 24.00 |
| 2015 | Jun-15 | 15.00 | 5.00 | 25.00 | 12.00 | 13.00 | 1.92 | 25.00 | 8.20 | 24.00 |
| 2015 | Jul-15 | 15.00 | 5.00 | 25.00 | 12.00 | 13.00 | 1.93 | 25.00 | 8.20 | 24.00 |
| 2015 | Aug-15 | 15.00 | 5.00 | 25.00 | 12.00 | 13.00 | 1.95 | 25.00 | 8.40 | 24.00 |
| 2015 | Sep-15 | 15.00 | 5.00 | 25.00 | 12.00 | 13.00 | 1.96 | 25.00 | 8.40 | 24.00 |
| 2015 | Oct-15 | 15.00 | 5.00 | 25.00 | 12.00 | 13.00 | 1.98 | 25.00 | 8.40 | 24.00 |
| 2015 | Nov-15 | 15.00 | 5.00 | 25.00 | 12.00 | 13.00 | 1.99 | 25.00 | 8.40 | 24.00 |
| 2015 | Dec-15 | 15.00 | 5.00 | 25.00 | 12.00 | 13.00 | 2.01 | 25.00 | 8.60 | 24.00 |
| 2016 | Jan-16 | 15.00 | 5.00 | 25.00 | 12.00 | 13.00 | 2.02 | 25.00 | 8.60 | 26.00 |
| 2016 | Feb-16 | 15.00 | 5.00 | 25.00 | 12.00 | 13.00 | 2.04 | 25.00 | 8.60 | 26.00 |
| 2016 | Mar-16 | 15.00 | 5.00 | 25.00 | 12.00 | 13.00 | 2.05 | 25.00 | 8.60 | 26.00 |
| 2016 | Apr-16 | 15.00 | 5.00 | 25.00 | 12.00 | 13.00 | 2.07 | 25.00 | 9.00 | 26.00 |
| 2016 | May-16 | 15.00 | 5.00 | 25.00 | 12.00 | 13.00 | 2.08 | 25.00 | 9.00 | 26.00 |
| 2016 | Jun-16 | 15.00 | 5.00 | 25.00 | 12.00 | 13.00 | 2.10 | 25.00 | 9.00 | 26.00 |
| 2016 | Jul-16 | 15.00 | 5.00 | 25.00 | 12.00 | 13.00 | 2.12 | 25.00 | 9.00 | 26.00 |
| 2016 | Aug-16 | 15.00 | 5.00 | 25.00 | 12.00 | 13.00 | 2.13 | 25.00 | 9.00 | 26.00 |
| 2016 | Sep-16 | 15.00 | 5.00 | 25.00 | 12.00 | 13.00 | 2.15 | 25.00 | 9.00 | 26.00 |
| 2016 | Oct-16 | 15.00 | 5.00 | 25.00 | 12.00 | 13.00 | 2.16 | 25.00 | 9.00 | 26.00 |
| 2016 | Nov-16 | 15.00 | 5.00 | 25.00 | 12.00 | 13.00 | 2.18 | 25.00 | 9.00 | 26.00 |
| 2016 | Dec-16 | 15.00 | 5.00 | 25.00 | 12.00 | 13.00 | 2.19 | 25.00 | 9.50 | 26.00 |
| 2017 | Jan-17 | 15.00 | 5.00 | 25.00 | 12.00 | 13.00 | 2.21 | 25.00 | 9.50 | 28.00 |
| 2017 | Feb-17 | 15.00 | 5.00 | 25.00 | 12.00 | 13.00 | 2.22 | 25.00 | 9.50 | 28.00 |
| 2017 | Mar-17 | 15.00 | 5.00 | 25.00 | 12.00 | 13.00 | 2.24 | 25.00 | 9.50 | 28.00 |
| 2017 | Apr-17 | 15.00 | 5.00 | 25.00 | 12.00 | 13.00 | 2.25 | 25.00 | 9.80 | 28.00 |
| 2017 | May-17 | 15.00 | 5.00 | 25.00 | 12.00 | 13.00 | 2.27 | 25.00 | 9.80 | 28.00 |

FIG. 6G

| | | | | | | | | | | |
|---|---|---|---|---|---|---|---|---|---|---|
| 2017 | Jun-17 | 15.00 | 5.00 | 25.00 | 12.00 | 13.00 | 2.28 | 25.00 | 9.80 | 28.00 |
| 2017 | Jul-17 | 15.00 | 5.00 | 25.00 | 12.00 | 13.00 | 2.30 | 25.00 | 9.80 | 28.00 |
| 2017 | Aug-17 | 15.00 | 5.00 | 25.00 | 12.00 | 13.00 | 2.31 | 25.00 | 9.80 | 28.00 |
| 2017 | Sep-17 | 15.00 | 5.00 | 25.00 | 12.00 | 13.00 | 2.33 | 25.00 | 10.00 | 28.00 |
| 2017 | Oct-17 | 15.00 | 5.00 | 25.00 | 12.00 | 13.00 | 2.34 | 25.00 | 10.00 | 28.00 |
| 2017 | Nov-17 | 15.00 | 5.00 | 25.00 | 12.00 | 13.00 | 2.36 | 25.00 | 10.00 | 28.00 |
| 2017 | Dec-17 | 15.00 | 5.00 | 25.00 | 12.00 | 13.00 | 2.37 | 25.00 | 10.00 | 28.00 |
| 2018 | Jan-18 | 15.00 | 5.00 | 25.00 | 12.00 | 13.00 | 2.39 | 25.00 | 10.00 | 30.00 |
| 2018 | Feb-18 | 15.00 | 5.00 | 25.00 | 12.00 | 13.00 | 2.40 | 25.00 | 10.00 | 30.00 |
| 2018 | Mar-18 | 15.00 | 5.00 | 25.00 | 12.00 | 13.00 | 2.42 | 25.00 | 10.00 | 30.00 |
| 2018 | Apr-18 | 15.00 | 5.00 | 25.00 | 12.00 | 13.00 | 2.43 | 25.00 | 10.00 | 30.00 |
| 2018 | May-18 | 15.00 | 5.00 | 25.00 | 12.00 | 13.00 | 2.45 | 25.00 | 10.00 | 30.00 |
| 2018 | Jun-18 | 15.00 | 5.00 | 25.00 | 12.00 | 13.00 | 2.46 | 25.00 | 10.00 | 30.00 |
| 2018 | Jul-18 | 15.00 | 5.00 | 25.00 | 12.00 | 13.00 | 2.48 | 25.00 | 10.00 | 30.00 |
| 2018 | Aug-18 | 15.00 | 5.00 | 25.00 | 12.00 | 13.00 | 2.49 | 25.00 | 10.00 | 30.00 |
| 2018 | Sep-18 | 15.00 | 5.00 | 25.00 | 12.00 | 13.00 | 2.51 | 25.00 | 10.00 | 30.00 |
| 2018 | Oct-18 | 15.00 | 5.00 | 25.00 | 12.00 | 13.00 | 2.52 | 25.00 | 10.00 | 30.00 |
| 2018 | Nov-18 | 15.00 | 5.00 | 25.00 | 12.00 | 13.00 | 2.54 | 25.00 | 10.00 | 30.00 |
| 2018 | Dec-18 | 15.00 | 5.00 | 25.00 | 12.00 | 13.00 | 2.55 | 25.00 | 10.00 | 30.00 |
| 2019 | Jan-19 | 15.00 | 5.00 | 25.00 | 12.00 | 13.00 | 2.57 | 25.00 | 10.00 | 32.00 |

FIG. 6H

| | | | | | | | | | |
|---|---|---|---|---|---|---|---|---|---|
| 2019 | Feb-19 | 15.00 | 5.00 | 25.00 | 12.00 | 13.00 | 2.58 | 25.00 | 10.00 | 32.00 |
| 2019 | Mar-19 | 15.00 | 5.00 | 25.00 | 12.00 | 13.00 | 2.60 | 25.00 | 10.00 | 32.00 |
| 2019 | Apr-19 | 15.00 | 5.00 | 25.00 | 12.00 | 13.00 | 2.62 | 25.00 | 10.00 | 32.00 |
| 2019 | May-19 | 15.00 | 5.00 | 25.00 | 12.00 | 13.00 | 2.63 | 25.00 | 10.00 | 32.00 |
| 2019 | Jun-19 | 15.00 | 5.00 | 25.00 | 12.00 | 13.00 | 2.65 | 25.00 | 10.00 | 32.00 |
| 2019 | Jul-19 | 15.00 | 5.00 | 25.00 | 12.00 | 13.00 | 2.66 | 25.00 | 10.00 | 32.00 |
| 2019 | Aug-19 | 15.00 | 5.00 | 25.00 | 12.00 | 13.00 | 2.68 | 25.00 | 10.00 | 32.00 |
| 2019 | Sep-19 | 15.00 | 5.00 | 25.00 | 12.00 | 13.00 | 2.69 | 25.00 | 10.00 | 32.00 |
| 2019 | Oct-19 | 15.00 | 5.00 | 25.00 | 12.00 | 13.00 | 2.71 | 25.00 | 10.00 | 32.00 |
| 2019 | Nov-19 | 15.00 | 5.00 | 25.00 | 12.00 | 13.00 | 2.72 | 25.00 | 10.00 | 32.00 |
| 2019 | Dec-19 | 15.00 | 5.00 | 25.00 | 12.00 | 13.00 | 2.74 | 25.00 | 10.00 | 32.00 |
| 2020 | Jan-20 | 15.00 | 5.00 | 25.00 | 12.00 | 13.00 | 2.75 | 25.00 | 10.00 | 34.00 |
| 2020 | Feb-20 | 15.00 | 5.00 | 25.00 | 12.00 | 13.00 | 2.77 | 25.00 | 10.00 | 34.00 |
| 2020 | Mar-20 | 15.00 | 5.00 | 25.00 | 12.00 | 13.00 | 2.78 | 25.00 | 10.00 | 34.00 |
| 2020 | Apr-20 | 15.00 | 5.00 | 25.00 | 12.00 | 13.00 | 2.80 | 25.00 | 10.00 | 34.00 |
| 2020 | May-20 | 15.00 | 5.00 | 25.00 | 12.00 | 13.00 | 2.81 | 25.00 | 10.00 | 34.00 |
| 2020 | Jun-20 | 15.00 | 5.00 | 25.00 | 12.00 | 13.00 | 2.83 | 25.00 | 10.00 | 34.00 |
| 2020 | Jul-20 | 15.00 | 5.00 | 25.00 | 12.00 | 13.00 | 2.84 | 25.00 | 10.00 | 34.00 |
| 2020 | Aug-20 | 15.00 | 5.00 | 25.00 | 12.00 | 13.00 | 2.86 | 25.00 | 10.00 | 34.00 |
| 2020 | Sep-20 | 15.00 | 5.00 | 25.00 | 12.00 | 13.00 | 2.87 | 25.00 | 10.00 | 34.00 |
| 2020 | Oct-20 | 15.00 | 5.00 | 25.00 | 12.00 | 13.00 | 2.89 | 25.00 | 10.00 | 34.00 |
| 2020 | Nov-20 | 15.00 | 5.00 | 25.00 | 12.00 | 13.00 | 2.90 | 25.00 | 10.00 | 34.00 |
| 2020 | Dec-20 | 15.00 | 5.00 | 25.00 | 12.00 | 13.00 | 2.92 | 25.00 | 10.00 | 34.00 |

Airbus Supply Chain Capacity Contingency Planning

Contingency View

SA: Prog. XYZ41  
A321: Prog. XYZ41-321  
LR: Prog. RW425  
LR Basic: Prog. RW425-B  
LR Strech: Prog. RW425-S A380: Prog. SJ-3R3-B  
A400M: Prog. MM98P  
A350: Blank  
ATR: Prog. OPI496

Simulation Date: 22/08/2008

| Assessment Owner | Department | Supplier Name_Location | Supplier Production Line | Color Weight | Date of First Red | Aug-08 | Sep-08 | Oct-08 | Nov-08 | Dec-08 | Jan-09 | Feb-09 |
|---|---|---|---|---|---|---|---|---|---|---|---|---|
| Emily Watson | TYPQ | Fastener Supplier_Tarbes; France | Bolt PL 2 | 181 | 2008-08-01 | -9% | -9% | -9% | -9% | -9% | -9% | -18% |
| Stefan Altmann | TNPQ, TSPQ, TWPI | CastSupplier_Bruxelles, Belgique | XYZ Production Line | 28 | 2008-08-01 | -11% | -13% | -14% | -14% | -16% | 7% | 5% |
|  | TLPQ | ElecSupplier_Paris, France | Marking 1 | 4 | 2008-08-01 | -1% | -1% | -1% | -1% | -1% | -5% | -5% |
| Claudia Graaf | PCUQ | ResinSupplier_Bucharest; Romania | CCC Mixing | 355 | 2008-08-01 | 0% | -10% | -10% | -10% | -10% | -9% | -8% |
| Claudia Graaf | PCUQ | ResinSupplier_Bucharest; Romania | BBB Mixing | 224 | 2008-08-01 | 16% | 0% | 1% | 2% | 4% | 0% | -3% |
| Tom Brown | PCAQ | Cabin System Supplier_Tokyo; Japan | Seating 2 Production Line | 224 | 2008-08-01 | -19% | -19% | -20% | -20% | -21% | -21% | -22% |
| Emily Watson | PCUQ | Fastener Supplier_Tarbes; France | Screw PL 1 | 96 | 2008-09-01 | 13% | 0% | 0% | -1% | -2% | -2% | -1% |
| Tom Brown | PCAQ | Cabin System Supplier_Tokyo; Japan | Vacuum Products | 50 | 2009-01-01 | 7% | 6% | 6% | 6% | 5% | 0% | -1% |
| Emily Watson | PCUQ | Fastener Supplier_Tarbes; France | Bolt PL 1 | 41 | 2008-08-01 | -7% | -5% | -7% | -8% | -9% | -4% | 0% |
|  |  | DetailParts Supplier_Tunis; Tunisia | Production Line 7 | 26 | 2008-08-01 | -5% | -5% | -5% | -11% | 2% | 7% | 7% |
| Aline Robin | PCUQ | Equipment & Systems_Chicago (USA) | RAZ Production Line | 21 | 2008-09-01 | 1% | 0% | 0% | 0% | 0% | 0% | -1% |

FIG. 7A

| Assessment Owner | Department | Supplier Name_Location | Supplier Production Line | Color Weight | Date of First Red | Aug-08 | Sep-08 | Oct-08 | Nov-08 | Dec-08 | Jan-09 | Feb-09 |
|---|---|---|---|---|---|---|---|---|---|---|---|---|
| Antonio Garcia | PCUQ | ElecSupplier_Paris; France | Wiring | 16 | 2008-08-01 | -8% | -8% | 13% | 7% | 7% | 6% | 6% |
| Thomas Lepoutre | TNPQ | CarbonSupplier_Montreal; Canada | Carbon Prepreg - Line 2 | 12 | 2008-09-01 | 17% | -6% | -6% | 49% | 60% | 60% | 60% |
| | PCUQ | AluSupplier_Velizy; France | Sheet PL 2 | 11 | 2008-08-01 | -6% | -5% | 1% | 1% | 1% | 0% | -1% |
| | TLPQ | ElecSupplier_Paris; France | Overbraiding 30 | 10 | 2009-01-01 | 6% | 6% | 8% | 8% | 8% | 0% | 0% |
| | TLPQ | DetailParts Supplier_Tunis; Tunisia | Production Line 5 | 9 | 2008-08-01 | -1% | -1% | -1% | -1% | 6% | -1% | -1% |
| Thomas Lepoutre | PCUQ | AluSupplier_Velizy; France | Plate PL 1 | 7 | 2008-08-01 | -3% | -4% | 11% | 11% | 10% | 10% | 10% |
| Thomas Lepoutre | PCUQ | AluSupplier_Velizy; France | Plate PL 2 | 6 | 2008-08-01 | -3% | -3% | 2% | 2% | 2% | 6% | 6% |
| Stefan Altmann | TNPQ | CastSupplier_Bruxelles, Belgique | Stiffener Production Line | 6 | 2008-08-01 | -3% | -3% | 3% | 3% | 3% | 19% | 13% |
| Scott Reid | TLPQ | ElecSupplier_Toulouse; France | Wiring T | 5 | 2008-10-01 | 6% | 6% | -1% | -1% | -1% | -1% | -1% |
| Mike Thomson | TWPQ | AluSupplier_Velizy; France | Plate PL 5 | 2 | 2008-10-01 | 2% | 2% | -1% | -1% | 21% | 21% | 20% |
| Claudia Graaf | PCUQ | ResinSupplier_Bucharest; Romania | DDD Mixing | 0 | 2011-02-01 | 16% | 4% | 4% | 3% | 3% | 3% | 3% |
| | | DetailParts Supplier_Tunis; Tunisia | Production Line 8 | 1 | 2008-11-01 | 3% | 3% | 3% | -1% | 6% | 6% | 6% |
| Mike Thomson | TNPQ, TSPQ, TWPI | LandingSyst Supplier_Turino - Italy | Landing Products 2 | 11 | | 10% | 10% | 13% | 13% | 12% | 12% | 11% |
| Tom Brown | PCAQ | Cabin System Supplier_Tokyo; Japan | Seating 1 Production Line | 7 | | 12% | 12% | 11% | 11% | 7% | 6% | 6% |
| Thomas Lepoutre | PCUQ | AluSupplier_Velizy; France | Sheet PL 1 | 0 | | 6% | 5% | 5% | 5% | 5% | 5% | 5% |
| Claudia Graaf | PCUQ | ResinSupplier_Bucharest; Romania | ABC Mixing | 0 | | 13% | 5% | 14% | 23% | 32% | 28% | 21% |
| | TLPQ | DetailParts Supplier_Tunis; Tunisia | Production Line 3 | 0 | | 5% | 5% | 5% | 14% | 14% | 8% | 8% |
| | TLPQ | DetailParts Supplier_Tunis; Tunisia | Production Line 6 | 0 | | 6% | 5% | 13% | 13% | 13% | 13% | 13% |
| | PCAQ | CarbonSupplier_Montreal; Canada | Bidirectional Products | 0 | | 5% | 5% | 15% | 14% | 14% | 10% | 9% |
| Tom Brown | TRPQ, TSPQ | Cabin System Supplier_Tokyo; Japan | Water Products | 0 | | 21% | 20% | 20% | 20% | 20% | 19% | 17% |
| Tom Brown | PCAQ | Cabin System Supplier_Tokyo; Japan | Compactors Assembly | 0 | | 18% | 18% | 17% | 16% | 16% | 15% | 14% |
| Maria Sanchez | PMDQ | LandingSyst Supplier_Roma - Italy | Landing Products 1 | 0 | | 7% | 7% | 7% | 7% | 7% | 16% | 16% |
| Maria Sanchez | PMDQ | LandingSyst Supplier_Roma - Italy | Brakes PL 1 | 0 | | 13% | 12% | 12% | 12% | 11% | 14% | 13% |
| Maria Sanchez | PMDQ | LandingSyst Supplier_Roma - Italy | Wheels PL | 0 | | 14% | 14% | 14% | 13% | 13% | 16% | 15% |
| Maria Sanchez | PMDQ | LandingSyst Supplier_Roma - Italy | Control Products 1 | 0 | | 16% | 16% | 16% | 16% | 15% | 20% | 19% |
| Susan Murray | PCDQ | PaintSupplier_New York / USA | Red Mixing | 0 | | 26% | 26% | 26% | 26% | 26% | 26% | 26% |

| | Mar-09 | Apr-09 | May-09 | Jun-09 | Jul-09 | Aug-09 | Sep-09 | Oct-09 | Nov-09 | Dec-09 | Jan-10 | Feb-10 | Mar-10 | Apr-10 | May-10 | Jun-10 | Jul-10 | Aug-10 | Sep-10 | Oct-10 | Nov-10 | Dec-10 | Jan-11 | Feb-11 | Mar-11 | Apr-11 | May-11 | Jun-11 | Jul-11 | SA | A321 | LR | LR Basic | LR Stretch | A380 | A400M | A350 | ATR |
|---|---|---|---|---|---|---|---|---|---|---|---|---|---|---|---|---|---|---|---|---|---|---|---|---|---|---|---|---|---|---|---|---|---|---|---|---|---|---|
| 1 | -18% | -18% | -3% | -1% | -1% | -4% | -4% | -4% | -4% | -4% | -8% | -8% | -5% | -8% | -5% | -5% | -5% | -5% | -5% | -5% | -5% | -5% | -5% | -5% | -5% | -5% | -5% | -5% | -5% | X | | | | | | | | |
| 2 | 5% | 4% | 3% | 2% | 2% | 0% | 0% | -1% | -2% | -2% | -3% | -4% | -4% | -5% | -5% | -7% | -8% | -8% | -9% | -9% | -9% | -10% | -10% | -11% | -11% | -11% | -12% | -12% | -13% | X | | X | | | X | X | | |
| 3 | 11% | 11% | 11% | 8% | 8% | 8% | 8% | 8% | 8% | 8% | 8% | 8% | 8% | 8% | 8% | 8% | 8% | 8% | 8% | 8% | 8% | 8% | 8% | 8% | 8% | 8% | 8% | 8% | 8% | X | | | | | | | | |
| 4 | -7% | -8% | -5% | -5% | -8% | -9% | -9% | -9% | -9% | -9% | -9% | -10% | -10% | -10% | -10% | -11% | -11% | -11% | -11% | -11% | -12% | -12% | -12% | -12% | -12% | -12% | -13% | -13% | -13% | X | | X | | | X | | | |
| 5 | -8% | -4% | -2% | 0% | 5% | 9% | 14% | 8% | -1% | -3% | -9% | -9% | -10% | -10% | -10% | -10% | -10% | -10% | -10% | -10% | -11% | -11% | -11% | -13% | -11% | -11% | -11% | -13% | -12% | X | | X | | | X | X | | |
| 6 | -27% | -27% | -28% | 22% | 22% | 22% | 20% | 20% | 20% | 20% | 20% | 19% | 19% | 18% | 18% | 18% | 18% | 18% | 18% | 18% | 18% | 18% | 18% | 18% | 18% | 18% | 18% | 18% | 18% | X | | X | | | | | | |
| 7 | -1% | -1% | -2% | -2% | -2% | -2% | -2% | -2% | -2% | -2% | -3% | -3% | -3% | -3% | -3% | -3% | -3% | -3% | -4% | -4% | -4% | -4% | -4% | -4% | -4% | -5% | -5% | -5% | -5% | X | | X | | | X | | | |
| 8 | -2% | -3% | -3% | -3% | -6% | -6% | -5% | -5% | 5% | 2% | 2% | 2% | 1% | 1% | 1% | 0% | 0% | 0% | -1% | -1% | -1% | -2% | -2% | -2% | -3% | -3% | -3% | -4% | -4% | X | | X | | | X | X | | |
| 9 | 5% | 5% | 5% | 5% | 5% | 5% | 4% | 4% | 4% | 4% | 4% | 4% | 4% | 4% | 3% | 3% | 3% | 3% | 3% | 3% | 3% | 3% | 2% | 2% | 2% | 2% | 3% | 4% | 4% | X | | X | | | X | | | |
| 10 | 7% | 7% | 9% | 9% | 9% | 5% | 6% | 6% | 5% | 6% | 6% | 6% | 6% | 6% | 6% | 6% | 5% | 5% | 5% | 5% | 5% | 5% | 5% | 4% | 5% | 5% | 5% | 5% | 5% | X | | | | | X | | | |
| 11 | -1% | -1% | -1% | -1% | -2% | -2% | -2% | -2% | -2% | -3% | 3% | 6% | 6% | 6% | 10% | 6% | 5% | 5% | 5% | 5% | 5% | 5% | 4% | 4% | 4% | 4% | 4% | 3% | 3% | X | | | | | X | | | |
| 12 | 6% | 18% | 16% | 15% | 15% | 15% | 15% | 12% | 12% | 12% | 11% | 11% | 9% | 9% | 10% | 10% | 9% | 9% | 9% | 9% | 8% | 8% | 8% | 8% | 7% | 7% | 7% | 6% | 6% | X | | | X | X | X | | | |
| 13 | 49% | 38% | 23% | 28% | 28% | 28% | 10% | 9% | 10% | 9% | 9% | 8% | 8% | 9% | 9% | 10% | 9% | 9% | 9% | 9% | 9% | 9% | 9% | 9% | 9% | 9% | 9% | 9% | 9% | X | X | | | | | | | |
| 14 | 12% | 11% | 11% | 11% | 10% | 10% | 10% | 20% | 20% | 19% | 19% | 19% | 18% | 19% | 19% | 19% | 19% | 19% | 19% | 19% | 19% | 19% | 19% | 19% | 19% | 19% | 19% | 19% | 19% | X | | | | | X | | | |
| 15 | -1% | -1% | 1% | 0% | -5% | -5% | 6% | 6% | 6% | 6% | 6% | 8% | 6% | 6% | 6% | 6% | 6% | 6% | 6% | 6% | 6% | 6% | 6% | 6% | 6% | 6% | 6% | 6% | 6% | X | | | | | | | | |

Airbus Supply Chain Capacity Contingency Planning
Overall Action List

SA : Prog. XYZ41  
A321 : Prog. XYZ41-321  
LR : Prog. RW425  
LR Basic : Prog. RW425-B  
LR Stretch : Prog. RW425-S A380 : Prog. 9U-3R3-B  
A400M : Prog. MM98P  
A350 : Blank  
ATR : Prog. OPI496

Simulation Date 22/08/2008

| Assessment Owner | Department | Supplier Name_Location | Supplier Production Line | Constraint | Action | LT | Cust. Capex | Start date | Status | SA | A321 | LR | LR Basic | LR Stretch | A380 | A400M | A350 | ATR |
|---|---|---|---|---|---|---|---|---|---|---|---|---|---|---|---|---|---|---|
| Emily Watson | PCUQ | Fastener Supplier_Tarbe Bolt PL 1 | | CVD | Two New CVD's added (CVD 24 & 25) Project began 05 | 24 | | Nov-05 | Scheduled | | | X | | | | | | |
| Emily Watson | TNPQ, TYPQ | Fastener Supplier_Tarbe Screw PL 2 | | Autoclaves | Investment in a 5th autoclave | 18 | | Mar-07 | Scheduled | | | | X | X | X | | | |
| Emily Watson | TNPQ, TTPQ, T | Fastener Supplier_Tarbe Bolt PL 3 | | 5 axis machin | Purchase 2nd 5 axis machine (identical) and come back to 5 | 12 | | May-07 | Scheduled | X | | | | X | X | | | |
| Emily Watson | PCUQ | Fastener Supplier_Tarbe Bolt PL 1 | | CVD | CPFII Implementation/improved operational efficiency) | 12 | | Jun-07 | Scheduled | | | X | | | X | | | |
| Stefan Altmann | TNPQ, TSPQ, T | CastSupplier_Bruxelles, WvT Production Line | | Tooling (SA, A | New tooling set ordered from AUK, final decision pending (1 | 6 | 150000 | Jun-07 | Scheduled | X | | X | | | X | X | | |
| Tom Brown | PCCQ | CarbonSupplier_Montrea | Carbon Prepreg - Line 1 | Lack of worke | To hire additional workers / to reinforce test capacity | 3 | n.a. | Aug-07 | Scheduled | | | | | | X | | | |
| Tom Brown | PCAQ | Cabin System Supplier_Vacuum Products | | Manpower | Efficiency increase to 70% | 1 | | Sep-07 | Scheduled | X | | X | | | X | X | | |
| Tom Brown | PCAQ | Cabin System Supplier_1 | Seating 1 Production Line | Manpower | Efficiency increase to 70% | 4 | | Sep-07 | Scheduled | X | | X | | | X | X | | |
| Maria Sanchez | PMDQ | LandingSyst Supplier_R | Landing Products 1 | ARC furnace r | 16 shifts WE with 8 operators | 4 | | Sep-07 | Scheduled | X | | X | | | X | X | | |
| Maria Sanchez | PMDQ | LandingSyst Supplier_R | Landing Products 1 | ARC furnace r | Fiabilisation+productivity+quality | 4 | | Sep-07 | Scheduled | X | | X | | | X | X | | |
| Maria Sanchez | PMDQ | LandingSyst Supplier_R | Landing Products 1 | ARC furnace r | 16 shifts WE with 22 operators | 16 | | Sep-07 | Scheduled | X | | X | | | X | X | | |
| Maria Sanchez | PMDQ | LandingSyst Supplier_R | Brakes PL 1 | ARC furnace r | Fiabilisation | 4 | | Sep-07 | Scheduled | X | | X | | | X | X | | |
| Maria Sanchez | PMDQ | LandingSyst Supplier_R | Brakes PL 1 | ESR furnace r | Available time increased to 48.5 week / year | 4 | | Sep-07 | Scheduled | X | | X | | | X | X | | |
| Maria Sanchez | PMDQ | LandingSyst Supplier_R | Brakes PL 1 | ESR furnace r | OEE 67% | 16 | | Sep-07 | Scheduled | X | | X | | | X | X | | |
| Maria Sanchez | PMDQ | LandingSyst Supplier_R | Wheels PL | ESR furnace r | OEE 70% | 4 | | Sep-07 | Scheduled | X | | X | | | X | X | | |
| Maria Sanchez | PMDQ | LandingSyst Supplier_R | Wheels PL | VAR Furnace | Inputry 46.5week/year | 4 | | Sep-07 | Scheduled | X | | X | | | X | X | | |
| Maria Sanchez | PMDQ | LandingSyst Supplier_R | Wheels PL | VAR Furnace | OEE 82% | 4 | | Sep-07 | Scheduled | X | | X | | | X | X | | |
| Maria Sanchez | PMDQ | LandingSyst Supplier_R | Wheels PL | VAR Furnace | Subcontracting WVZ Italy | 4 | | Sep-07 | Scheduled | X | | X | | | X | X | | |
| Maria Sanchez | PMDQ | LandingSyst Supplier_R | Wheels PL | VAR Furnace | OEE 85% | 16 | | Sep-07 | Scheduled | X | | X | | | X | X | | |
| Maria Sanchez | PMDQ | LandingSyst Supplier_R | Control Products 1 | VIM furnace r | Productivity improvement by reduction of processing time ar | 16 | | Sep-07 | Scheduled | X | | X | | | X | X | | |
| Emily Watson | TNPQ, TTPQ, T | Fastener Supplier_Tarbe Bolt PL 3 | | 5 axis machin | Productivity improvement by reduction of processing time ar | 12 | | Sep-07 | Scheduled | X | | X | | X | X | X | | |

*FIG. 9A*

| Assessment Owner | Department | Supplier Name_Location | Supplier Production Line | Constraint | Action | LT | Cust. Capex | Start date | Status | VS | A321 | LR | LR Basic | LR Stretch | A380 | A400M | A350 | ATR |
|---|---|---|---|---|---|---|---|---|---|---|---|---|---|---|---|---|---|---|
| Aline Robin | PCUQ | Equipment & Systems_CA2A Production Line | | out sourcing | sub contracting of load | | | Sep-07 | Scheduled | | | | | | X | | | |
| Antonio Garcia | TNPQ | CarbonSupplier_Montreal Carbon Prepreg - Line 2 | | Manpower | Resources increase and training in progress | 4 | | Sep-07 | Scheduled | | X | | | | | | | |
| Tom Brown | TRPQ, TSPQ | Cabin System Supplier_Water Products | | Molding Lines | Switch the current Development line (line 6) to Airbus series | 1 | | Oct-07 | Scheduled | X | | | | | | | | |
| Claudia Graaf | PCUQ | ResinSupplier_Bucrares AAA Mixing | | Manpower | Increase overtime for 8 people first shift by working till 2 add | | | Oct-07 | Scheduled | | | X | | | X | | | |
| Claudia Graaf | PCUQ | ResinSupplier_Bucrares BBB Mixing | | Manpower | 3 open requisitions in GE approval process: finish, cylinder, | 5 | | Oct-07 | Scheduled | | | X | | | X | | | |
| Claudia Graaf | PCUQ | ResinSupplier_Bucrares CCC Mixing | | Labor | HCS/Lean Implementation | 6 | | Oct-07 | Scheduled | | | X | | | X | | | |
| Claudia Graaf | PCUQ | ResinSupplier_Bucrares DDD Mixing | | Penetrant Inst | add labor resource | 5 | | Oct-07 | Scheduled | | | X | | | X | | | |
| Claudia Graaf | PCUQ | ResinSupplier_Bucrares DDD Mixing | | Post Process | HCS Lean Deployment | 6 | | Oct-07 | Scheduled | | | X | | | X | | | |
| Emily Watson | PCUQ | Fastener Supplier_Tarbe Screw PL 1 | | Machining | Add new Wheel Machine Cell | 5 | | Oct-07 | Scheduled | | | X | | | X | | | |
| Emily Watson | PCUQ | Fastener Supplier_Tarbe Screw PL 1 | | Machining | HCS Lean Deployment | 6 | | Oct-07 | Scheduled | | | X | | | X | | | |
| Aline Robin | PCUQ | Equipment & Systems_CRA2 Production Line | | human resou | hining, or moving and train 1 additional operator | 2 | | Oct-07 | Scheduled | X | | | | | X | | | |
| | TLPQ | ElecSupplier_Paris Fran Overbraiding 30 | | Test Equipme | Transfer Eurocopter workload (36 hours per month) | 4 | | Oct-07 | Scheduled | X | | | | | | | | |
| | PCDQ | CarbonSupplier_Montreal Carbon Prepreg - Line 1 | | Quality | To decrease scrap rate | 2 | n.a. | Oct-07 | Scheduled | | | | | | X | | | |
| Antonio Garcia | TNPQ | CarbonSupplier_Montreal Carbon Prepreg - Line 2 | | Jigs dupl.; C | aJigs Duplication Plan including Top Assy Pax Floor Jig on A | 14 | | Oct-07 | Scheduled | | X | | | | | | | |
| Stefan Altmann | TLPQ | Equipment & Systems_P564 Production Line | | Transfer | Transfer overbraided harnesses to CUU plant | 8 | | Oct-07 | Scheduled | | | | | | X | | | |
| Scott Reid | TLPQ | LandingSyst Supplier_R Control Products 3 | | Efficiency | Serial organization (1st bout/ routing/ 2nd bout/ fixed sched. | 6 | | Oct-07 | Scheduled | X | | | | | X | | | |
| Scott Reid | TLPQ | LandingSyst Supplier_R Control Products 3 | | Efficiency | Serial organization (1st bout/ routing/ 2nd bout/ fixed sched. | 12 | | Oct-07 | Scheduled | | | | | | X | | | |
| Susan Murray | PCDQ | PaintSupplier_New York Green Mixing | | Manpower | 1 person will be added going to 2 persons working 1 shift | 1 | | Nov-07 | Scheduled | X | | | | | | | | |
| Claudia Graaf | PCDQ | ResinSupplier_Bucrares AAA Mixing | | Machine | Purchase new mill/num machine to replace the down one. | 6 | | Nov-07 | Scheduled | | | X | | | X | | | |
| Xavier Lambot | TNPQ, TSPQ, T | CoreSupplier_Berlin (Alle Metallic PL | | NC-machine | New NC-machine acquisition under progress. New machine | 4 | | Nov-07 | Scheduled | X | | X | | | X | X | | |
| Xavier Lambot | TNPQ, TSPQ, T | CoreSupplier_Berlin (Alle Glass-Fiber PL | | SA MLGF print | SA MLGF surface material change: ION sent to AJK 19.6.20 | 2 | | Nov-07 | Scheduled | X | | X | | | | X | | |
| Xavier Lambot | TNPQ, TSPQ, T | CoreSupplier_Berlin (Alle Glass-Fiber PL | | Manpower | Change from 2 shifts to 3 shift working to ensure owen capa | 4 | | Nov-07 | Scheduled | X | | X | | | X | X | | |
| Aline Robin | PCUQ | Equipment & Systems_CA2A Production Line | | machine | Gear Hobbing and Shaping machine | 8 | yes | Nov-07 | Scheduled | | | | | | X | | | |
| | PCDQ | CarbonSupplier_Montreal Unidirectional Products | | Man hours | recruiting of 5 machinists | 1 | | Nov-07 | Scheduled | X | | X | | | X | X | | |
| Xavier Lambot | PCDQ | CoreSupplier_Berlin (Alle Aramid PL | | Man hours | recruiting of 7 assemblers testers | 2 | | Nov-07 | Scheduled | X | | X | | | X | X | | |

*FIG. 9B*

| | | | | | | | | | | | | |
|---|---|---|---|---|---|---|---|---|---|---|---|---|
| Mike Thomson | TMPQ | AluSupplier_Velizy; Fran Plate PL 4 | Installation | Install a new paint shop on site | 6 | 200 k€ | Nov-07 | Scheduled | x | | x | |
| Mike Thomson | TNPQ, TSPQ, TLandingSyst Supplier_Tu Landing Products 2 | | Autoclave loca | New support device in order to load 2 NH panels instead of | 1 | | Nov-07 | Scheduled | x | x | x | x |
| Stefan Altmann | TLPQ | ElecSupplier_Paris; Fran Testing 3 | | Working Time 2 Shifts implementation | 3 | | Nov-07 | Scheduled | | | x | x |
| Emily Watson | TNPQ, TTPQ, TFastener Supplier_Tarbe Bolt PL 3 | | | 5 axis machin | Increase opening time to 24h over 6 days by bringing in ope | 1 | | Dec-07 | Scheduled | x | x | x | x |
| Stefan Altmann | TNPQ, TSPQ, TCastSupplier_Bruxelles; Box Production Line | | Manpower | Training 10 fitters | 5 | | Dec-07 | Scheduled | x | x | x | x |
| Stefan Altmann | TNPQ, TSPQ, TCastSupplier_Bruxelles; WVT Production Line | | Manpower | Training 10 new lamination workers. Start date 3/12/2007 | 5 | | Dec-07 | Scheduled | x | x | x | x |
| Xavier Lamblot | TNPQ, TSPQ, TCoreSupplier_Berlin (A) le Kevlar PL | | Manpower | Training 1 more operator. | 4 | | Dec-07 | Scheduled | x | x | x | x |
| Xavier Lamblot | TNPQ, TSPQ, TCoreSupplier_Berlin (A) le GlassFiber PL | | Quality of part | Decreasing defects on parts before paint shop. (Continues i | 3 | | Dec-07 | Scheduled | x | x | x | x |
| | PCAQ | CarbonSupplier_Montrea Bidirectional Products | | MAN + TOOL | HIRE THREE PEOPLE PLUS TOOLS PLUS 3% PRODUCT | | 120 | Dec-07 | Scheduled | x | x | x | |
| Stefan Altmann | TLPQ | ElecSupplier_Paris; Fran Overbraiding 40 | | Test Equipme | ECF test to be transferred to A380 test machine | 1 | | Dec-07 | Scheduled | x | | | |
| Stefan Altmann | TNPQ | CastSupplier_Bruxelles; Stiffener Production Line | | Molding tools | Existing tools (have done around 2100 A/C) need to be rene | 3 | 30K€ (ROI | Jan-08 | Scheduled | x | | x | x |
| Stefan Altmann | TNPQ, TSPQ, TCastSupplier_Bruxelles; WVT Production Line | | Lectra Cutter | More sHifts required for prepreg cutter | 6 | | Jan-08 | Scheduled | x | x | x | x |
| | PCAQ | DetailParts Supplier_Tur Production Line 1 | | Primary Asser | Convert from Batch to Standard Work Flow | 3 | | Jan-08 | Scheduled | x | x | | |
| | TLPQ | DetailParts Supplier_Tur Production Line 3 | | Manpower | Rate from 34.5 to 38.7 by hiring and training wiring operator | 2 | | Jan-08 | Scheduled | | x | x | x |
| | PCAQ | CarbonSupplier_Montreal Multiaxial PL 1 | | Assembly lear | Lean and six sigma kaizen events | 4 | | Jan-08 | Scheduled | | x | x | |
| | PCAQ | CarbonSupplier_Montreal Multiaxial PL 2 | | Test equipmer | Purchase new fixtures and install new hydraulic test pumps. | 5 | | Jan-08 | Scheduled | | x | x | x |
| | PCDQ | CarbonSupplier_Montreal Carbon Prepreg - Line 1 | | shift | To establish additional shift | 6 | n.a. | Jan-08 | Scheduled | x | | x | |
| Mike Thomson | TNPQ, TSPQ, TLandingSyst Supplier_Tu Landing Products 2 | | Curing cycle ti | Design change request for prepreg material to Airbus UK, flir | 9 | N/A | Jan-08 | Scheduled | x | x | x | x |
| Antonio Garcia | TLPQ | CarbonSupplier_Montreal Glass Fiber Prepreg Line | | People | Hire 60 new people | 3 | | Jan-08 | Scheduled | x | x | x | x |
| Antonio Garcia | TLPQ | CarbonSupplier_Montreal Kevlar Prepreg Line | | Efficiency | Measurement of Efficiency on Test Table | 1 | | Jan-08 | Scheduled | x | x | | |
| Antonio Garcia | TLPQ | LandingSyst Supplier_Ro Brakes PL 2 | | Efficiency | Measurement of Efficiency on Test Table. | 1 | | Jan-08 | Scheduled | x | | | |
| Stefan Altmann | TLPQ | Equipment & Systems_PB3B Production Line | | Hours | Increase from 21 to 26 operators | 3 | | Jan-08 | Scheduled | x | x | x | x |
| Stefan Altmann | TLPQ | Equipment & Systems_P|9| Production Line | | Hours | Increase from 21 to 26 operators | 1 | | Jan-08 | Scheduled | x | x | x | x |
| Xavier Lamblot | TNPQ, TSPQ, TCoreSupplier_Berlin (A) le Kevlar PL | | flexibility | working in 2 shifts if required | 2 | | Feb-08 | Scheduled | | x | x | x |
| | TLPQ | DetailParts Supplier_Tur Production Line 4 | | Machine | New priming machine (from 8 to 9) + hiring and training oper | 10 | | Feb-08 | Scheduled | x | x | x | x |
| | TLPQ | DetailParts Supplier_Montreal Class Fiber Prepreg Line 5 | | Manpower | Rate 36.2 to 39 - Efficiency improvement (10% in leaning cu | 10 | | Feb-08 | Scheduled | | x | | |
| | PCAQ | CarbonSupplier_Montreal Multiaxial PL 1 | | Manpower | Hire 3 more assemcer/testers to support the 2nd shift | 3 | | Feb-08 | Scheduled | x | x | x | x |
| | PCAQ | CarbonSupplier_Montreal Multiaxial PL 2 | | Manpower | Hire 3 more assemcer/testers to support the 2nd shift | 3 | | Mar-08 | Scheduled | x | x | x | x |
| | PCAQ | DetailParts Supplier_Tur Production Line 1 | | ATP Test Cell | Add an additional test oven #5 | | | Apr-08 | Scheduled | x | x | x | |
| | TLPQ | DetailParts Supplier_Tur Production Line 2 | | Manpower | Rate from 8.5 to 9.3 by hiring and training of wiring employe | 3 | | Apr-08 | Scheduled | | x | x | x |
| | TLPQ | DetailParts Supplier_Tur Production Line 6 | | Manpower | Rate from 8.5 to 9.3 by hiring and training of wiring employe | 6 | | Apr-08 | Scheduled | | x | x | |

FIG. 9C

| Name | Code | Supplier/Location | Category | Description | Qty | Date | Status | | | | |
|---|---|---|---|---|---|---|---|---|---|---|---|
| Antonio Garcia | TLPQ | CarbonSupplier_Montrea Glass Fiber Prepreg Line | People | Hire 40 new people | 3 | Apr-08 | Scheduled | x | x | x | |
| Claudia Graaf | PCUQ | ResinSupplier_Bucharea BBB Mixing | Manpower | Working overtime till 12% agreed by the 1 shift employees a | | May-08 | Scheduled | x | | x | |
| | PCAQ | DetailParts Supplier_Tun Production Line 1 | ATP Test Cell | Add an additional test oven #6 | 3 | May-08 | Scheduled | | x | x | |
| Antonio Garcia | TLPQ | CarbonSupplier_Montrea Carbon Prepreg - Line 4 | Efficiency | Measurement of Efficiency on Test Table | 1 | May-08 | Scheduled | | | x | |
| Antonio Garcia | TLPQ | CarbonSupplier_Montrea Kevlar Prepreg Line | Jig board /spa digs | Work in a 2nd shift using the existing stations OR incr | 3 | May-08 | Scheduled | x | x | | |
| Stefan Altmann | TNPQ | CastSupplier_Bruxelles_Stiffener Production Line | Manpower | Increase workforce from 12 to 15p and rearange working pa | 4 | Jun-08 | Scheduled | x | | | |
| Aline Robin | PCUQ | Equipment & Systems_C TBU Production Line | staffing | hire 1 additional shift = 1 employee | 1 | Jun-08 | Scheduled | | | x | |
| | TLPQ | ElecSupplier_Paris; Fran Overbraiding 30 | Test Equipme | Transfer LR workload (13 hours per month) to Ain Atiq (Mort | 9 | Jun-08 | Scheduled | x | | x | |
| Antonio Garcia | TLPQ | CarbonSupplier_Montrea Glass Fiber Prepreg Line | People | Hire 40 new people | 3 | Jun-08 | Scheduled | x | x | x | |
| Antonio Garcia | TLPQ | CarbonSupplier_Montrea Carbon Prepreg - Line 4 | Jig board /spa | increase set of jigboards (increasing capacity from rate 1.8 | 3 | Jun-08 | Scheduled | x | | x | |
| | PCAQ | CarbonSupplier_Montrea Carbon BiDirectional Products | MAN + TOOL | HIRE THREE PEOPLE PLUS TOOLS PLUS 8% PRODUCT | 3 | Jul-08 | Scheduled | x | x | x | |
| Antonio Garcia | TLPQ | LandingSyst Supplier_R Brakes PL 2 | Routing statio | Jigs: Work in a 2nd shift using the existing stations OR incre | 110 | Jul-08 | Scheduled | x | | | |
| Maria Sanchez | PMDQ | LandingSyst Supplier_R Wheels PL | VAR Furnace | New VAR Furnace | 28 | Jul-08 | Scheduled | x | x | x | |
| Antonio Garcia | TLPQ | CarbonSupplier_Montrea Carbon Prepreg - Line 4 | Jig board /spa | increase set of jigboards (increasing capacity from rate 2.2 | 3 | Aug-08 | Scheduled | x | | x | |
| Scott Reid | TLPQ | ElecSupplier_Toulouse; Assembling T | People | Take decision: Hire temporary people (40) or transfer | 9 | Aug-08 | Scheduled | x | x | x | |
| | TLPQ | ElecSupplier_Paris; Fran Marking 1 | 120 VU-80VU | Buy Production: / Transportation Jigs N.52 to 56 80VU - N43 | 6 | Sep-08 | Sched. by system | | | x | |
| | | DetailParts Supplier_Tun Production Line 7 | human resso | add 1 operator in the line | 3 | Sep-08 | Sched. by system | x | x | | |
| | PCUQ | ElecSupplier_Paris; Fran Wiring | Machine usag | Add permanent Sunday shifts (6/7hrs) | 1 | Sep-08 | Sched. by system | x | x | | |
| Tom Brown | PCAQ | Cabin System Supplier_1 Vacuum Products | Machine | Increase of the capacity of the bench (10 => 20 BMTU) | 6 | Sep-08 | ASAP | | x | x | |
| Tom Brown | PCAQ | Cabin System Supplier_Sealing 1 Production Line | Manpower | Recruit and train 1 person | 12 | Sep-08 | ASAP | x | x | x | x |
| Tom Brown | PCAQ | Cabin System Supplier_Sealing 2 Production Line | Manpower | Recruit and train 1 person | 12 | Sep-08 | ASAP | x | x | x | x |
| Thomas Lepoutre | PCUQ | AluSupplier_Velizy; Fran Sheet PL 1 | manpower | Recruit and train additional shift (one person) | 9 | Sep-08 | ASAP | x | x | | x |
| Thomas Lepoutre | PCUQ | AluSupplier_Velizy; Fran Sheet PL 1 | Manpower | 1 Operator transferred to another service to return | 6 | Sep-08 | ASAP | | x | x | |
| Thomas Lepoutre | PCUQ | AluSupplier_Velizy; Fran Plate PL 1 | Manpower | Extra Hours | 1 | Sep-08 | ASAP | x | x | x | |
| Thomas Lepoutre | PCUQ | AluSupplier_Velizy; Fran Sheet PL 2 | Manpower | Outsourcing of the assembly of the rotors and stators (opera | 6 | Sep-08 | ASAP | x | x | x | |
| Thomas Lepoutre | PCUQ | AluSupplier_Velizy; Fran Plate PL 2 | Manpower | Extra hours | 1 | Sep-08 | ASAP | x | x | x | |
| Thomas Lepoutre | PCUQ | AluSupplier_Velizy; Fran Plate PL 2 | Manpower | local subcontracting for the wiring of the boards. (other prog | 4 | Sep-08 | ASAP | x | x | x | |
| Emily Watson | TYPQ | Fastener Supplier_Tarthe Bolt PL 2 | APF Assembl | Invest in 1 additional set of RSS assy jigs + re-layout (move | 8 | Sep-08 | ASAP | x | | | |
| Stefan Altmann | TNPQ | CastSupplier_Bruxelles_Stiffener Production Line | Manpower | Increase workforce from 15 to 17p to work 3 shifts from Mon | 4 | Sep-08 | ASAP | x | x | | x |
| Stefan Altmann | TNPQ, TSPQ, 1 | CastSupplier_Bruxelles_XYZ Production Line | Manpower | Training 1 more inspector | 4 | Sep-08 | ASAP | x | | | x |
| | TLPQ | DetailParts Supplier_Tun Production Line 3 | Manpower | Rate from 38.7 to 43 by hiring and training wiring operators | 2 | Sep-08 | ASAP | x | x | x | |

*FIG. 9D*

| | | | | | | | | | | | |
|---|---|---|---|---|---|---|---|---|---|---|---|
| | TLPQ | EleoSupplier_Paris: Fran Overbraiding 30 | Test Equipme | Buy a new Test Bay (4000 extremities) to allow 80VU testing | 12 | Sep-08 | ASAP | X | | | |
| | TLPQ | EleoSupplier_Paris: Fran Marking 1 | 120 VU-90VU | Buy Production / Transportation Jigs N-48 to 51 80VU -N36 | 6 | Sep-08 | ASAP | X | | | X |
| | | DetailParts Supplier_Tun Production Line 7 | human resou | add 1 operator in the line | 3 | Sep-08 | ASAP | X | X | X | X |
| | | DetailParts Supplier_Tun Production Line 8 | human resou | add 1 operator with 1 operator added in first shift increase TRS from 0.64 to | 3 | Sep-08 | ASAP | X | X | X | |
| | PCUQ | EleoSupplier_Paris: Fran Wiring | Machine useq | Add permanent Saturday morning shifts (3 hrs) | 1 | Sep-08 | ASAP | X | X | | |
| Mike Thomson | TW/PQ | AluSupplier_Velizy, Fran Plate PL 5 | Sub-contractir | Existing sub-contractors; no special action needed | 3 | Sep-08 | ASAP | X | X | X | |
| Scott Reid | TLPQ | EleoSupplier_Toulouse; Wiring T | 120 VU-90VU | Buy Production / Transportation Jigs N-48 to 51 80VU -N36 | 6 | Sep-08 | ASAP | X | | | X |
| Maria Sanchez | PMDQ | LandingSyst Supplier_R Landing Products 1 | ARC furnace | External supply Firminy | 28 | Sep-08 | Scheduled | X | X | X | X |
| | PCAQ | DetailParts Supplier_Tun Production Line 1 | Manpower | Increase second shift staff | 6 | Oct-08 | Scheduled | X | X | X | |
| | TLPQ | DetailParts Supplier_Tun Production Line 6 | Manpower | Rate from 9.3 to 10.2 by Hiring and training of wiring employee | 6 | Oct-08 | Scheduled | | X | | |
| Antonio Garcia | TLPQ | EleoSupplier_Toulouse; IA380 Integration | overbraided m | buy a 4th machine | 6 | Oct-08 | Scheduled | X | X | X | X |
| | | DetailParts Supplier_Tun Production Line 7 | human resou | add 1 operator in the line | 3 | Oct-08 | Sched. by system | X | X | | X |
| Scott Reid | TLPQ | EleoSupplier_Toulouse; Wiring T | 120 VU-90VU | Buy Production / Transportation Jigs N-52 to 55 80VU -N43 | 6 | Oct-08 | Sched. by system | X | | | |
| Antonio Garcia | TLPQ | EleoSupplier_Toulouse; IA380 Integration | overbraided m | dedicate 50% of 49 fuses machine as a 24 fuses configura | 1 | Nov-08 | Scheduled | | X | X | |
| Stefan Altmann | TNPQ, TSPQ, TCastSupplier_Bruxelles; XYZ Production Line | concessions | Quality improvement project started 08/2007 to deminish an | 2 | Nov-08 | Sched. by system | X | X | X | |
| | TLPQ | DetailParts Supplier_Tun Production Line 4 | Machine | New printing machine (from 9 to 10) + hiring and training co | 10 | Nov-08 | Sched. by system | X | X | X | |
| | PCUQ | EleoSupplier_Paris: Fran Overbraiding 10 | Manpower | Overtime -4 hrs Sat & Sun am | 1 | Nov-08 | Sched. by system | X | | X | |
| Mike Thomson | TW/PQ | AluSupplier_Velizy, Fran Plate PL 3 | Manpower | Extra shift (150hrs) | 2 | Nov-08 | Sched. by system | X | | X | |
| | TLPQ | DetailParts Supplier_Tun Production Line 5 | Sub-contractir | Existing sub-contractors; no special action needed | 3 | Nov-08 | Sched. by system | X | | | |
| | TLPQ | DetailParts Supplier_Tun Production Line 5 | Manpower | Rate 39 to 42 - Efficiency improvement (10% in leaning curv | 6 | Dec-08 | Scheduled | X | | | |
| Antonio Garcia | TLPQ | CarbonSupplier_Montreal Glass-Fiber-Prepreg Line | People | Hire 20 new people | 3 | Dec-08 | Scheduled | X | X | X | |

*FIG. 9E*

| | | | | | | | | | |
|---|---|---|---|---|---|---|---|---|---|
| Antonio Garcia | TLPQ | CarbonSupplier_Montreal Carbon Prepreg - Line 4 | It'bout routing | Increase 1 station for routing 1 for 1er bout 1 for 2nd BOUT | 3 | | Dec-08 | Scheduled | | | |
| Stefan Altmann | TLPQ | Equipment & Systems_PE B3B Production Line | Hours | Increase number of machines from 7 to 8 [] Increase space | 6 | | Dec-08 | Scheduled | X | | X |
| Stefan Altmann | TLPQ | Equipment & Systems_P19I Production Line | Hours | Increase number of machines from 7 to 8 [] Increase space | 6 | | Dec-08 | Scheduled | X | X | X |
| | | DetailParts Supplier_Tun Production Line 8 | human ressou | with 1 operator added in second shift increase TRS from 0.6 | 3 | | Dec-08 | Sched. by system | X | X | X |
| Mikke Thomson | TWPQ | AluSupplier_Velizy_Fran Plate PL 4 | Installation | Automate current paintshop | 6 | 1,3 M€ | Jan-09 | Scheduled | X | X | |
| | PCAQ | CarbonSupplier_Montreal Bidirectional Products | MAN + TOOL | HIRE 2 AND HALF PEOPLE PLUS TOOLS PLUS 7.5% PR | 3 | 100 | Feb-09 | Scheduled | X | X | X |
| | | DetailParts Supplier_Tun Production Line 7 | human ressou | add 1 operator in the line | 3 | | Feb-09 | Sched. by system | X | X | X |
| Emily Watson | TYPQ | Fastener Supplier_Tathe Bolt PL 2 | Manpower | Hire 2 additional operators | 2 | | Mar-09 | Sched. by system | X | | |
| | PCUQ | ElecSupplier_Paris; Fran Wiring | Machine use | A320 valves to be made from solid (80hrs) | 1 | | Mar-09 | Sched. by system | X | X | X |
| | TLPQ | DetailParts Supplier_Tun Production Line 3 | Manpower | Rate from 42.9 to 47.2 by hiring and training wiring operator | 2 | | May-09 | Sched. by system | X | | |
| | TLPQ | DetailParts Supplier_Tun Production Line 5 | Manpower | Rate 4.2 to 4.3.5 by hiring and training hiring operators (from | 2 | | May-09 | Sched. by system | X | | |
| | PCUQ | ElecSupplier_Paris; Fran Overbraiding 10 | Test Rig | Utilise second test rig (current dev rig available in 9 months) | 9 | | Jul-09 | Sched. by system | | | X |
| Mikke Thomson | TNPQ, TSPQ, LandingSyst Supplier_Tu Landing Products 2 | Tooling (SA | New tooling set investment submitted to Airbus UK, final dec | 4 | 150000 | Jul-09 | Sched. by system | X | X | X |
| | TLPQ | ElecSupplier_Paris; Fran Overbraiding 20 | People | Hire temporary people (50 = 10%) | 9 | | Aug-09 | Scheduled | X | X | X |
| | TLPQ | DetailParts Supplier_Tun Production Line 5 | Manpower | Rate 4.3.5 to 4.5 by hiring and training hiring operators (from | 2 | | Oct-09 | Sched. by system | X | | |
| Aline Rodin | PCUQ | Equipment & Systems_CRAZ Production Line | human ressou | Hiring moving and train 1 additional operator or Change orga | 2 | | Dec-09 | Scheduled | | | |
| | | DetailParts Supplier_Tun Production Line 8 | human ressou | with 1 operator added in third shift increase TRS from 0.74 t | 3 | | Feb-10 | Sched. by system | X | X | X |
| Stefan Altmann | TLPQ | ElecSupplier_Paris; Fran Overbraiding 50 | People | 2nd shift implementation - hire and train new people | 3 | | Aug-10 | Sched. by system | X | | X |
| Thomas Lepoutre | PCUQ | AluSupplier_Velizy_Fran Plate PL 1 | Manpower | Extra hours | 1 | | Dec-10 | Sched. by system | X | X X | |
| | TLPQ | ElecSupplier_Paris; Fran Testing 1 | laser machine | WE shift implementation (1 people) | 1 | | Jan-11 | Sched. by system | X | | X |
| | TLPQ | DetailParts Supplier_Tun Production Line 2 | Mechanicals | Rate from 9.3 to 14 with four more jigs bought for doubles sh | 4 | | Mar-11 | Sched. by system | | X | |

*FIG. 9F*

COMPUTER-IMPLEMENTED METHOD AND COMPUTER PROGRAM TO ASSIST IN MANAGING SUPPLIER CAPACITY

CROSS-REFERENCE

The present application claims priority to U.S. Provisional Patent Application No. 61/091,321 filed on Aug. 22, 2008, the entirety of which is incorporated herein by reference.

FIELD OF THE INVENTION

The present invention relates to the management of supplier capacity in a supply chain.

BACKGROUND OF THE INVENTION

In many industries, original equipment manufacturers ("OEM's") do not themselves manufacture some (or even any) of the parts of which their products are made. In some such cases, the OEM's rely on various suppliers to supply them with the parts, etc. that they need to complete the final assembly of the product. In other such cases, even the final assembly of the product is completed by a supplier (who may provide the OEM with the final product for distribution or may even directly distribute the final product through distribution networks or to final consumers).

The suppliers themselves will likely rely on sub-suppliers to provide them with certain parts, such that the entire supply chain can be quite complex and can include many different suppliers at many different levels (the term "suppliers" being used hereinafter to refer to both ultimate supplier(s) and any sub-supplier at any level in the supply chain). The OEM which is selling the final product may not know (unless it specifically enquires thereinto) the intricacies of their own supply chain, which may include hundreds or thousands of suppliers and sub-suppliers.

The relationship between an OEM and its suppliers (or between a supplier and its sub-suppliers) is rarely a one part relationship. Typically, a supplier will supply an OEM with many parts (be they related or unrelated) for more than one (and, in some cases, many) products. Furthermore, the supplier may also be supplying some (or all) of the same parts to other entities (including competitors of the OEM), for a variety of reasons.

Globalization adds another layer of complexity to supply chains, since the OEM's and their suppliers supplying parts, etc. for a final product, are rarely both in the same geographic region of the world (or even in the same country or continent). In many instances an OEM cannot simply drop in on one of its suppliers (let alone its sub-suppliers) whenever it decides that it needs to do so. A similar observation can be made with respect to the relationship between the suppliers and the sub-suppliers.

Finally, the increasing technological complexity of products only adds to this problem as it increases the number of suppliers and the depth of the supply chain.

Nonetheless, despite all of this, OEM's ideally need to try to ensure, at a minimum, adequate timely supply of required parts. This can be quite a challenge in the manufacturing context previously described.

Presently, perhaps somewhat surprisingly to those unfamiliar with the situation, there is simply no effective system to do this. What typically occurs is that an OEM will examine and approve a supplier (in terms of quality and quantity of production) at the start of their relationship with the supplier, and will periodically (for example every few years or so) audit and re-approve the supplier. In the interim, the OEM will place orders with the supplier and trust that the supplier can timely fulfill them, notwithstanding the changing needs of the OEM (and the other persons that the supplier supplies). Assuming the supplier does timely fill the OEM's orders, there is generally likely nothing to suggest to the OEM that the supplier will not be able to do so in the future. In some cases, however, notwithstanding the goodwill of the supplier and its past history with an OEM, the supplier will be unable to meet the changing future needs of the OEM. This obviously will create a problem for the OEM, yet conventionally the OEM has no vision into this problem and when and where it will occur.

To illustrate this point, a concrete example may be taken from the aircraft manufacturing industry. The assignee of the present application manufactures and sells various aircraft in association with the trademark AIRBUS (the present assignee hereinafter referred to as "OEM A"). For the purposes of the present patent application, some of these aircraft may be grouped into different programs of related aircraft, such as the "single aisle" (SA) aircraft program (those aircraft sold in association with the trademarks A318, A319, A320, and A321), the "long range" (LR) aircraft program (those aircraft sold in association with the trademarks A330 and A340), the "double deck" (DD) aircraft program (that aircraft sold in association with the trademark A380), the A400M aircraft program (that aircraft sold in association with the trademark A400M), the A350 aircraft program (that aircraft sold in association with the trademark A350) and the ATR aircraft program (those aircraft sold in association with the trademarks ATR42 and ATR72).

It will be appreciated that for any one individual part, there are several possibilities with respect to that part's use. A first possibility is that a part is used in the manufacture of every aircraft series in each of the aforementioned aircraft programs of OEM A (i.e. the A318, A319, A320, A321, A330, A340, A350, A380, A400M, ATR42 and ATR72). A second possibility is that a part is used only in the manufacture of some, but not all, aircraft series (be they all part of the same program or otherwise) by OEM A. A third possibility is that a part is used only in the manufacture of a single aircraft series by OEM A. The part may also be used by other aircraft OEM's (either with or without the knowledge of OEM A).

An aircraft is composed of thousands of parts. OEM A does not manufacture itself each and every one of these parts. It relies on a complex supply chain, the precise details of which are not relevant to the present application. However, solely for the purpose of illustrating some of the problems with conventional supply chains, it will be assumed (although it is clearly not the case) that each of those parts is supplied by a supplier which itself manufactures the part in question and does not rely on any sub-supplier.

Assuming that a part in question used by OEM A is an aircraft fuselage window, called Window Type A. Window Type A is used both for the single aisle program and for the double deck program. Window Type A is supplied to OEM A primarily by Supplier #1, but also to a limited extent by Supplier #2. Supplier number #1 also supplies OEM A with Window Type B, which OEM A uses for the long range program. Supplier #1 also supplies other OEM's, as well as individual airlines (for use as replacement parts for example), with both Window Type A and Window Type B. Supplier #1 was approved as a supplier to OEM A and in the past has been able to supply OEM A with the windows that it required.

However, in the current year, based on OEM A's current order book, it is forecast that the number of aircraft of each of the aircraft programs will increase on a yearly basis, although not by the same amount per program, nor the same amount year over year. Nor are these increases continuous or constant. Therefore, the number of windows of each type that the supplier will need to supply to OEM A will increase over the next few years, but not at a constant rate and not at the same rate for each type of window supplied. The other OEM's that Supplier #1 supplies may also increase their purchase of windows as well, although OEM A is unaware of the timing and quantity of such increases. OEM A obviously wants to ensure that its supply of windows can keep up with its production rates. While this may appear complex although reasonably achievable, this is but one product in an oversimplified example. The true issue is much greater than this, as OEM A wants to simultaneously ensure that its supply of all of the parts of which all of its products are made can keep up as well.

Conventionally, there is no effective way for OEM A to do this, i.e. to determine where and when (if any) there will be bottlenecks in its supply chain given its current forecast for its increased future needs. Presently, OEM A can simply alert all its suppliers of its forecast increased needs (both in quantity and timing) and trust that the suppliers will be able to comply. This, obviously, may have mixed results. In some cases the suppliers themselves do not understand the effect of OEM A's and others' increased needs on their own business and they will not make adequate preparations to meet the increased demand. Or, they may fail to meet increased demand for a variety of other reasons. In any event, OEM A has no vision in which suppliers will have a problem in advance of the problem itself, so it cannot take steps in advance to avoid the problem from occurring or to mitigate the effects of any problems that will occur. This is an undesirable situation.

Therefore, there is a need in the art for an improved method to assist in managing supplier capacity to meet changing (and particularly increasing and discontinuously variably increasing) demand in a supply chain.

SUMMARY OF THE INVENTION

It is an object of the present invention to ameliorate at least some of the inconveniences present in the prior art.

It is also an object of the present invention to provide an improved method to assist in managing supplier capacity to meet changing (and particularly increasing and discontinuously variably increasing) demand in a supply chain.

Therefore, in one aspect, the invention provides a computer-implemented method to assist in managing supplier capacity to supply a supplied unit to at least a first user of the supplied unit by at least one supplier, for a series of periods, based on data as of a reference date, the series of periods being in the future relative to the reference date, the method comprising:

(a) accessing data related to a supplier reference-date load for the supplied unit for each of the periods;
(b) accessing data related to a supplier reference-date available capacity for the supplied unit for each of the periods;
(c) accessing data related to a first-user supplied-unit requirement for the supplied unit for each of periods;
(d) calculating a supplier future load for the supplied unit for each of the periods, the supplier future load being based on the supplier reference-date load for that period and the first-user supplied-unit requirement for that period;
(e) calculating a supplier capacity contingency for each period, the supplier capacity contingency for each period being defined as a difference between the supplier future load for that period and the supplier reference-date available capacity for that period; and
(f) calculating a supplier capacity contingency ratio for each period, the supplier capacity contingency ratio for each period being a ratio between the supplier capacity contingency for that period and the supplier reference-date available capacity for that period.

It is highly preferred that when the supplied unit is one of a group of different supplied units that each of (a)-(f) is repeated for each one of the group of different supplied units, to determine a supplier capacity contingency ratio for each one of the group of different supplied units for each period.

It is also highly preferred that when the supplied unit is further supplied by the supplier to at least one additional user, the data related to the supplier reference-date load for the supplied unit for each period includes data related to at least a total of each additional-user load for that period.

The present invention arose from the observation of several characteristics of a supplier-client relationship (which is not to imply that any or all of these characteristics must be present in any particular relationship in order for the present invention to be of utility).

Given the size and complexity of supply chains of global companies, the conventional method of oversight through periodic audits is inefficient, and moreover, is insufficient to ensure that suppliers in a supply chain will be able to meet increased future demand. In its most basic form therefore, the invention provides a metric against which the supply capacity of the various suppliers in a supply chain can be measured, to determine where and when the problems (i.e. bottlenecks) in the chain are likely to occur. In order to evaluate a supplier against this metric, the invention standardizes the type of information collected from each supplier and the method by which that information is processed. This standardization yields a result from each supplier that is meaningful across basically the entire supply chain, allowing a comparison of all the different suppliers in the chain with the metric. This result is referred to herein as the "supplier capacity contingency ratio" and is described in further detail herein below.

In the context of the present invention, a "supplied unit" is not limited to the final output from the supplier received by its client. A "supplied unit" may be the output of any production entity (i.e. a machine, a group of machines, a production line, or a particular plant), the production entity selected being the "supplier" in the present context. Hence, the term "supplier" is not limited to the conventional definition of the term. Therefore, the output of the production entity may (and in many instances, will) be an interim output and serve as the input for another production entity (typically in the same plant); this second production entity being a "user" in the present context. While the "supplied unit" must be discretely measurable (so as to yield a quantifiable total per period), it needs not be an actual unit (of course it may be). The supplied unit may thus, for example, be measured in hours, units, tons, meters, square meters, etc., whatever the appropriate unit of measure is for the output of the particular production entity selected.

The choice of what exactly the "supplied unit" and the production entities are (i.e. how deep does one drill down into the supply chain) depends on the level of detail at which the parties (particularly the ultimate OEM) decide that the particular supply process in question needs to be managed in order to provide a desired level of confidence in the supply capability of the supplier to the client. This choice may be based on past experience of the client, the comfort level of the client, the relative bargaining power of the parties, the nature of the part supplied, the criticality to the client of the part to be supplied, or any other criteria related to the organizations and parts involved. What is important is that less detailed "supplied-unit" choices be representative of the more detailed "supplied-unit" possible choices of which they are comprised, such that meaningful results are obtained.

Notwithstanding the foregoing, and solely for the purpose of ease of explanation and not intending to be limiting, the following discussion will use the term "supplier" in the conventional sense (i.e. an entity that supplies a complete part to another entity), that complete part will be the "supplied unit", and the "first user" of the supplied unit will be the OEM whose supply chain is being managed.

For present purposes, time is broken down into various "periods" of more or less even length. For example, a "period" may be a month, a week, a bi-week, 10 days, or any other repeating measurable unit or group of units of time. Months are the preferred period in most contexts, since this is the unit of time by which many production schedules are measured. The present invention is concerned with a series of these periods, with the length of the series being at the determination of the parties (or one of them), again at a length that provides a desired management horizon, depending on the parties and the business concerned. Three (3) years (i.e. 36 months) is the preferred length of the series of periods.

On a particular date or dates, (collectively as the case may be) the "reference date" in the present context, the "supplier reference-date load" for the supplied unit for each of the periods is provided. (The "reference date" is simply the date as of which the data is up-to-date to. Ideally it would be up-to-date to the date of the assessment and thus would be current. But it may be somewhat (although insignificantly) older). The "load" is the total number of supplied units that the supplier must supply during a period regardless of the supplied units' destination or ultimate use. Thus, the "supplier reference-date load" may be the load (on a per period basis) that, as of the reference-date, is known. In most contexts, however, the actual reference-date load for each period is not used in calculations, but rather it is preferred (although not required) to use the average of all such actual reference-date loads for the periods for each period. (I.e. each period is assigned the average load of all the periods.) Using an average load is one way to take into account that the loads are simply forecasts and that they may change (depending on how far they are in the future) as time progresses and the future period approaches. It also takes into account that periods may always be exactly the same amount of time (e.g. not all months have the same number of days nor holidays/working days). As another alternative, the average actual user demand over a selected interval of time prior to the reference data—e.g. 1 year—on a per period basis may be used. The data related to the supplier reference-date load is typically provided by the supplier, as in most cases the supplier will be supplying entities other than the OEM, and thus only the supplier will have information related to the total load (and not just the load related to the OEM). The data provided by the supplier may or may not include the load related to the OEM (obviously the OEM has this information), it should simply be clear as to whether or not it includes this information so the load related to the OEM is not counted more than once. With respect to loads related to entities other than OEM's, it is not necessary that the data provided contain anything other than the total "other entity" load, a breakdown by particular entity (or even more detailed) is not necessary. (In many instances, a supplier will be legally unable or unwilling to provide such a breakdown in any event.) The data should incorporate as much information regarding changes to the "other entity" load over time (available on a period by period basis) as possible, in order to provide the most accurate information. The expression "load split" refers to how the supplier load breaks down between various clients (e.g. the various OEM's) and, optionally, between the clients' uses as well (e.g. the various OEM programs).

Similarly, on a particular date or dates, (collectively as the case may be with the previously referred to dates the "reference date"), the supplier reference-date available capacity for the supplied unit for each of the periods is provided. The available capacity is preferably the actual demonstrated capacity over a selected interval of time prior to the reference date—e.g. 1 year—(on a per period basis) to supply the supplied unit under normal operating conditions (e.g. normal employee shift pattern, no overtime, no tactical subcontracting, etc.). The actual demonstrated capacity is preferred to be used, not some theoretical capacity or a demonstrated capacity under abnormal operating conditions, in order to provide a more realistic result. (Although in some situations a theoretical or other demonstrated capacity may be used.)

Data related to the OEM supplied-unit "requirement" for the supplied unit for each of periods is also required. The "requirement" is the total number of supplied units that the OEM will require during a particular period (for each of the periods—although the number may be zero). If the supplier reference-date load contains only up-to-date (i.e. of the date of the assessment) data related to this requirement, then for the present purposes (depending on the circumstances), that can be sufficient. What is more likely to be the case is that the data related to the supplier reference-date load will contain some data related to the OEM supplied-unit requirement, but not all. That is to say the OEM may be changing its forecasts for its future requirements from the information that is provided in the supplier reference-date load data. This might be the case either because of an actual change in its needs or because the OEM could be running a theoretical simulation to see what would happen in its supply chain should certain changes in the demand for its products occur. Thus, the data related to the OEM supplied-unit requirement may be separated by OEM use.

The data related to the supplier reference-date load, the supplier reference-date available capacity, and the OEM supplied-unit requirement may be provided in any form and/or format whatsoever, either physical or electronic. However, it is much preferred that the data be provided in electronic form in a standard format directly usable by a computer program (an example of which is described below) designed to implement the method of the present invention. In such cases, the data in electronic form may be provided as an electronic file or files on a computer-readable information storage device (e.g. a USB "key"), via electronic-mail, over a network, or the internet. The exact means by which the electronic file(s) is (are) provided is only important in so far as it (they) must be compatible with or be able to be made compatible with the aforementioned computer program. If the data (or any portion thereof) is provided in physical format (e.g. on paper), it will, at some point, have to be converted to an electronic format, by any number of conventional means, including optical character recognition or human data entry.

Once data related to the supplier reference-date load and to the OEM supplied-unit requirement has been accessed, a supplier future load for the supplied unit for each of the periods is calculated. The supplier future load is based on both the supplier reference-date load and the OEM supplied-unit requirement for a particular period, and is the combination of the "others" load and the OEM load for the period. Depending on in what format the data is stored, this may be the result of addition of two numbers or the result of a more complex mathematical formula. No particular mathematical formula is dictated by the present invention. What is important is that that total load (from all sources) is calculated. This total load is termed the "supplier future load".

Next, the "capacity contingency" for each period is calculated. The capacity contingency for a period is the difference between the supplier future load for the period and the supplier available capacity for the period. FIG. 1 shows graphically (among other things) the relationship of load, available capacity and capacity contingency.

Thereafter, a "supplier capacity contingency ratio" for each period is calculated. The supplier capacity contingency ratio for each period is a ratio between the supplier capacity contingency for that period and the supplier available capacity for that period. The ratio is easier to understand if expressed as a percentage, rather than as a fraction. The ratio is unit-less, and as was previously mentioned, provides a standardized result that is meaningful no matter who the supplier or what the supplied product, allowing a comparison of basically all the different suppliers in the chain with the metric.

To illustrate this, FIG. 2 shows graphically a simplified example of what may happen over time if the OEM load (being the total of the shown DD, LR, and SA loads—from the previous example) on a particular supplier increases. In this simple case (as it is assumed that the "others" load and the supplier available capacity remain constant) at some point in the future, as the OEM load on the supplier increases, the capacity contingency decreases, and the supplier will at some point no longer be able to furnish enough supplied units to meet the OEM demand.

As was previously noted, however, conventionally, the OEM does not know to which supplier(s) this will occur (if any) and when. The supplier contingency capacity ratio assists in that it can be calculated at any given time for a multitude (or even) all of the suppliers to an OEM. Table 1 below illustrates this.

a supplier reference-date available capacity for the supplied unit for each of the periods includes data related to each of the plurality of suppliers. In other words, it is preferred that the multiple suppliers be treated as a single supplier factoring in each supplier's relative load and available capacity. In such cases, altering the relative proportion supplied between the suppliers may be an action that can be undertaken to increase the available capacity. Alternatively, it is possible, to treat the suppliers as separate suppliers despite the fact that they supply the same part.

Where the supplied unit is required by the OEM for a plurality of uses, it is highly preferred that the data related to the OEM supplied-unit requirement for the supplied unit for each of the periods includes data related to a per OEM use basis. In this manner, the invention allows the OEM to be more granular in its approach with respect to its products where the supplier is supplying the same supplied unit for a number of different OEM products. In this respect the OEM load on the supplier is split by OEM product or group of product (as the case may be). Referring to FIGS. 1 & 2, for example, the OEM load does not appear as a single block (as does the "others" load), but rather is broken down by program (SA for Single Aisle, DD for Double Decker, and LR for Long Range—from the previous example). In this way, the OEM can run even more detailed "what-if" scenarios that do not treat all of its products as monolithic block.

It is highly preferred to compare the supplier capacity contingency ratio for each period with a threshold value indicative of an insufficiency in the supplier capacity contingency, to determine any periods having insufficient supplier capacity contingency. (This is the metric to which reference was previously made that allows a comparison of disparate suppliers.) Proceeding in this manner may help to focus the attention of the OEM on those suppliers having too great a risk (or even an almost certainty) of being unable to meet the

TABLE 1

Scenario X Contingency Simulation

| Supplier | Production line | January 2007 | February 2007 | March 2007 | April 2007 | May 2007 | June 2007 | July 2007 | August 2007 | September 2007 | October 2007 | November 2007 | December 2007 | January 2008 |
|---|---|---|---|---|---|---|---|---|---|---|---|---|---|---|
| Alpha | Assembly | 12% | 14% | 14% | 12% | 8% | 7% | 3% | −2% | 2% | 6% | 12% | 12% | 14% |
| Beta | Panel Riveting | 16% | 14% | 11% | 13% | 12% | 9% | 4% | 5% | 1% | 4% | 6% | 11% | 13% |
| Alpha | Machining | 9% | 6% | 4% | 2% | 4% | 7% | 10% | 11% | 11% | 12% | 14% | 16% | 15% |
| Gamma | Paint Shop | 5% | 3% | 3% | 4% | 4% | 6% | 5% | 6% | 7% | 5% | 6% | 8% | 7% |

In Table 1, the supplier capacity contingency ratio for 3 suppliers supplying 4 supplied units (i.e. unnamed output of the production line indicated) of over one-month periods of time beginning in January 2007 and going until January 2008. The actual load changes are not important in this example; what is important to note is that the load changes drive changes in the capacity contingency ratio. The larger the number, the more contingency for supply the supplier has. The smaller the number, the less contingency for supply the supplier has.

Moreover, the calculations leading to the supplier contingency ratio can be re-run as often as is desired using different OEM supply requirements, allowing for "what-if" scenarios to be run to determine the effect on the supply chain of various different OEM supply requirements.

In situations where there is more than one supplier supplying an OEM with the same supplied unit, it is highly preferred that the data related to the supplier reference-date load for the supplied unit for each of the periods includes data related to each of the plurality of suppliers; and that the data related to OEM's requirements. The threshold value selected can depend on many factors including the nature of the product and the supplied unit and the risk tolerance of the OEM. Referring back to Table 1, the threshold value selected is 5%, thus every period in which a supplier's capacity contingency ratio is 5% or less has been highlighted, with particular highlight being given to the August 2007 period for the supplier Alpha in which the ratio is negative (−2%) (indicating a very high likelihood that the supplier will be unable to meet the OEM requirement for that period). It is also possible, as is shown in the Table to have multiple threshold values indicating different risk profiles. In this respect, supplier capacity contingency ratios greater than 5% but less than or equal to 10% have also been indicated in Table 1.

In most circumstances, the supplier available capacity can be increased over a certain period of time. For example, to name but a few ways: more workers can be hired, more raw material can be purchased, more machinery can be purchased, additional production lines may be added, the process may be optimized to increase efficiency, etc. Each of these remedial actions will have the effect of increasing output, although not all may be available in any given situation. Further, they will not all likely have the same effect on the supplier's available capacity, nor can they all be implemented within the same period of time. Each will have its own lead time, i.e. the minimum interval of time required for its implementation (which is rarely zero). FIG. 3 illustrates an example of this principle in graphical form. In this example the available capacity increases over time as each of the various ways to increase capacity is implemented.

In view of this, it is highly preferred that each supplier provide data related (in advance) to each action that can be undertaken to change that supplier's reference-date available capacity for the supplied unit and the lead time required in order to implement those actions. (The format and form of this data being as described herein above in relation to other data.) In this manner, when desired (for example, when the supplier capacity contingency threshold is exceeded), a computer program implementing a method of the present invention will determine at least one action (and preferably more) that can be undertaken to change the supplier reference-date available capacity for a given period in time having insufficient supplier contingency. Further, based on the date of the given period in question, the program will determine, for each action, a latest action implementation date by which that action must be undertaken in order to change the reference-date available capacity in time for the given period based on the lead time for that action.

In this manner, when data related to a multitude of suppliers is rendered accessible and the OEM can input various different (or only one—depending on its goal) supplied unit requirements and can obtain a list of what actions need to be taken at which supplier and by when they must be started, in various scenarios (as desired). Assuming the data is complete (i.e. has all information pertaining to all suppliers), the OEM now has a good vision into what problems may be created in its supply chain in view of its increasing requirements, where they will be created, what actions need be taken to resolve those problems, and by when those actions must be started. The OEM can then focus on those actions with those suppliers and be less concerned with the others. While this approach may not prevent any supply chain issues from occurring, it will lessen the number of them (all other things being equal).

Preferably, along with each remedial action possible, a revised supplier capacity contingency ratio for the given period in time is calculated, taking into account the effects of that action. In this way, the cumulative effects of several actions will be known, and, where there are more than one of them, the OEM and the supplier will be able to take this into account when making a decision as to which action to implement (or how to otherwise proceed).

It is also preferred to re-compare the revised supplier capacity contingency ratio for each period with the threshold value indicative of an insufficiency in the supplier capacity contingency, to determine any periods still having insufficient supplier capacity contingency.

Optionally, for at least one of the periods having an insufficient supplier capacity contingency, a difference between a supplier reference-date maximum capacity and the supplier projected future load for that period can be calculated. This difference is referred to as the "surge capacity" and is shown in FIG. 1. The supplier reference-date maximum capacity is the capacity that can be triggered quickly (e.g. within a week) under difficult conditions and can only be sustained for a short period of time (e.g. a few months). In this manner, it may be known whether it would be possible to implement a short term solution to a supply issue that might function until a permanent increase in available capacity can be brought on line.

The present invention is not merely the computer implementation of a previously-known method, as the method was not previously known. Moreover, the present invention requires a computer in order to be carried out, given the volume of calculations that are required. It would not be possible to do so by hand.

No particular computer (hardware or software) is required. It is within the knowledge and skill of a skilled computer programmer to select appropriate hardware and software and to program and implement a method of the present invention depending on those choices. It is preferred to use a standard PC running the Microsoft™ Windows XP™ operating system and Microsoft Office™. The method is preferably implemented using Microsoft Excel™ and programmed using macros and Visual Basic™.

In an additional aspect, the present invention provides a computer-readable information storage device (e.g. a hard drive, a USB-key, computer memory, a network drive, an internet website, etc.) containing computer-executable instructions (e.g. a computer file) to enable a method of the present invention to be executed by a computer.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 5A-5U are a print-out of a MS Excel Worksheet showing sample supplier data for the present invention;

FIGS. 6A-6H are a print-out of a MS Excel Worksheet showing sample first-user data for the present invention;

FIGS. 7A-7D are a print-out of a MS Excel Worksheet showing a first sample output of the present invention;

FIGS. 8A-8D are a print-out of a MS Excel Worksheet showing a second sample output of the present invention; and FIGS. 9A-9F are a print-out of a MS Excel Worksheet showing a third sample output of the present invention.

DETAILED DESCRIPTION OF THE PREFERRED EMBODIMENTS

Figure 1:
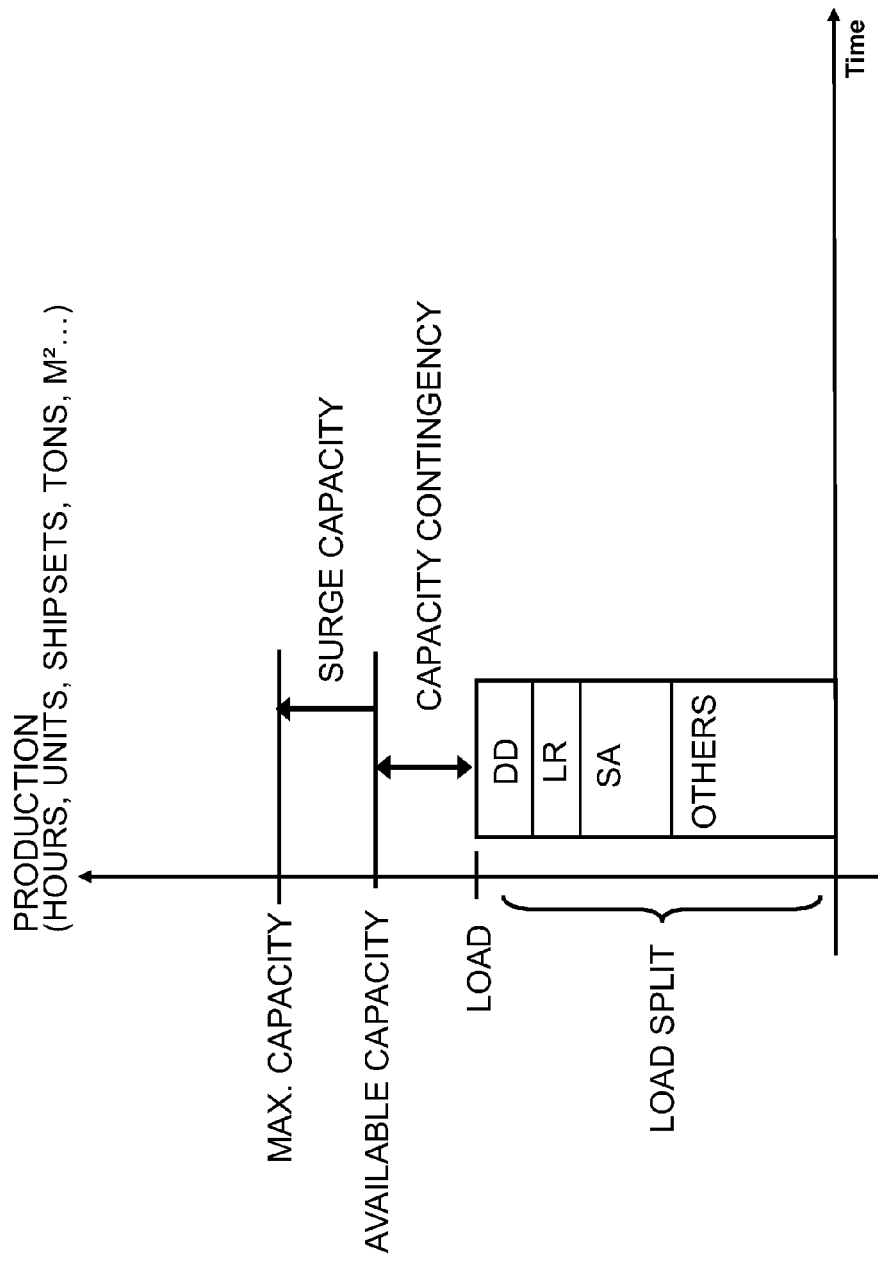
FIG. 1 shows graphically the relationship of load, available capacity and capacity contingency.
Figure 2:
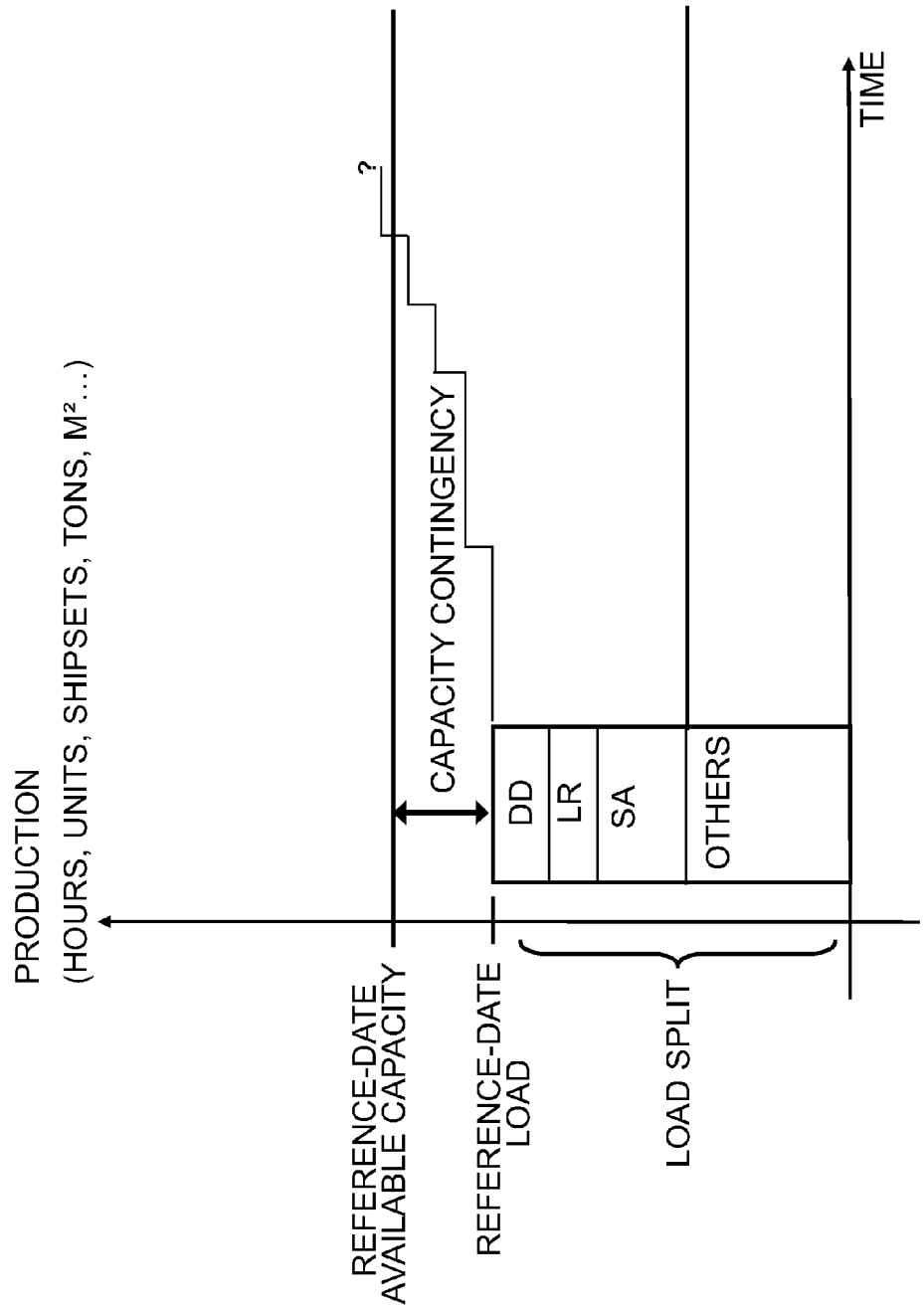
FIG. 2 shows graphically a simplified example of what may happen over time if the OEM load on a particular supplier increases.
Figure 3:
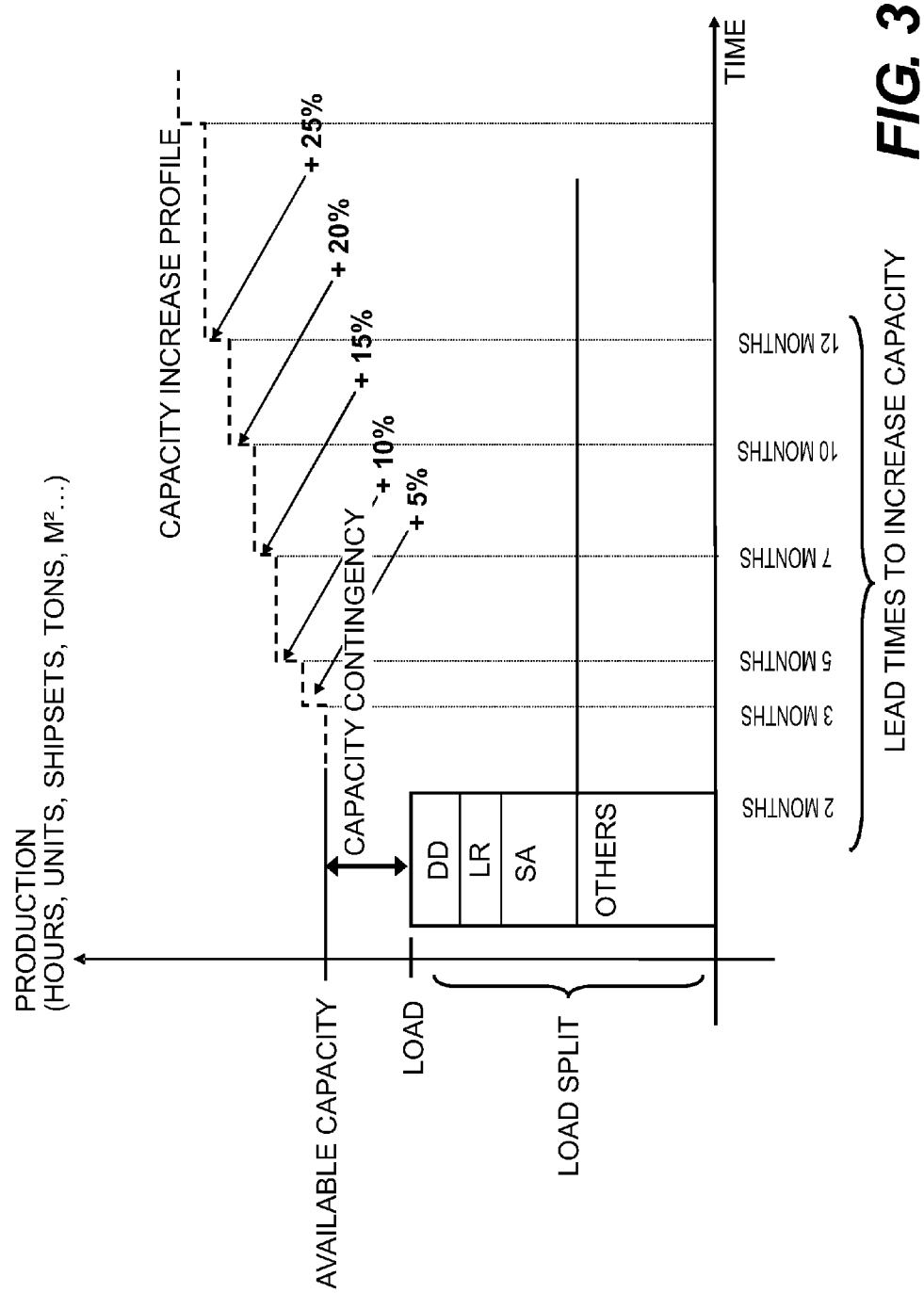
FIG. 3 shows graphically an example of remedial actions to increase supplier capacity and their lead time for implementation.
Figure 4:
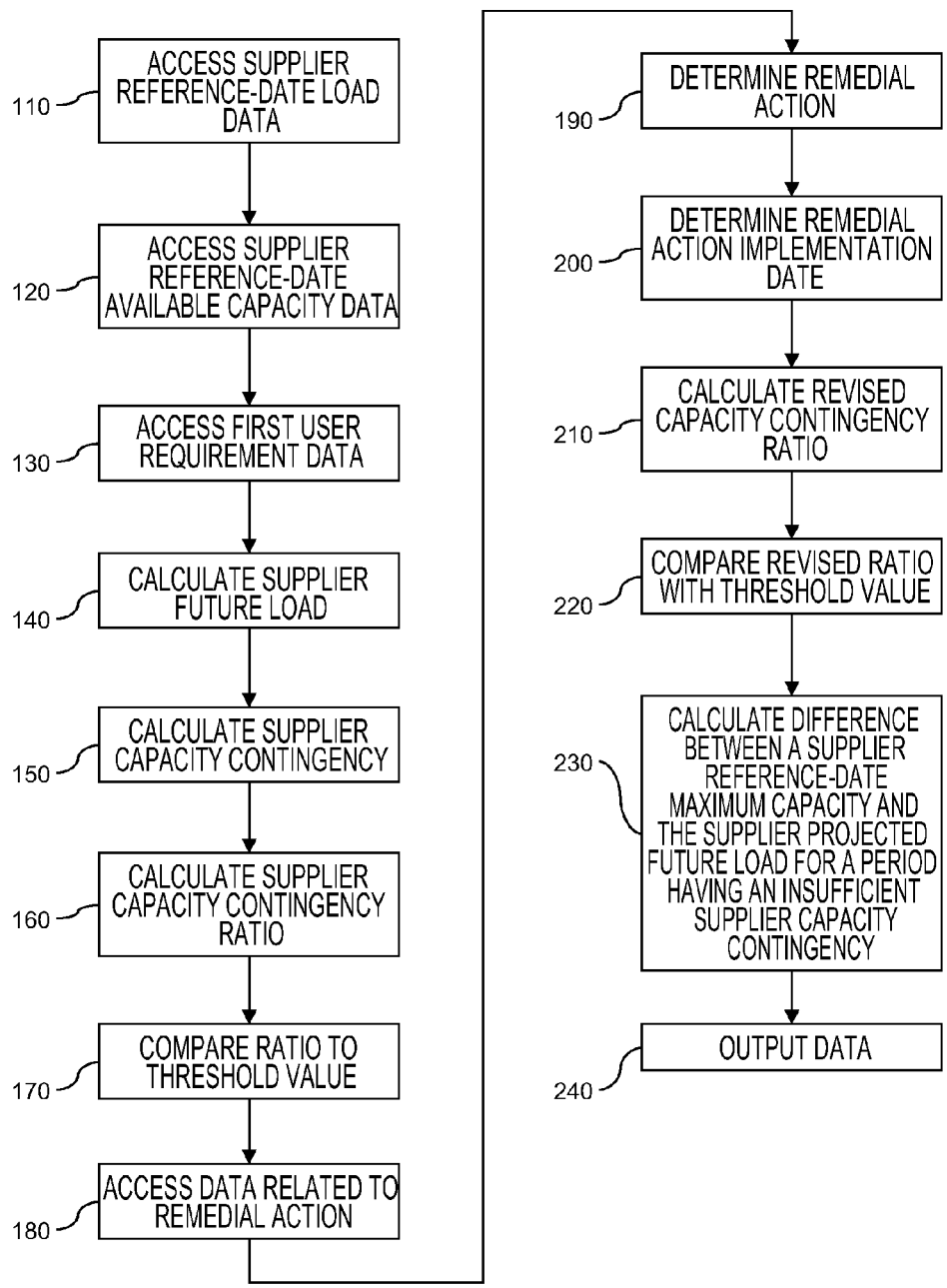
FIG. 4 is a flow chart illustrating the steps of a preferred embodiment of the present invention.

Referring to FIG. 4, there is shown a flow chart illustrating the various steps of a preferred embodiment of the present invention. In step 110, data related to the supplier reference-date load for the supplied unit for each of the periods is accessed. In step 120, data related to the supplier reference-date available capacity for the supplied unit for each of the periods is accessed. These steps are carried out on a personal computer running Microsoft Windows XP™ and Microsoft Excel™ by opening a file containing the requisite data that has been previously prepared in a format that is readable by MS Excel. A sample worksheet from such a file is shown in FIG. 5. This worksheet (and thus file) contains both the data of step 100 and the data of step 110 (and thus the steps are carried out simultaneously by the opening of the file). (It should be noted that the data shown in FIG. 5 is not real-life actual data, it is fictitious data that has been created solely for the purpose of illustration.) MS Excel has been selected given that it is relatively easy to use and is generally accessible to most PC users.

Specifically, FIG. 5 contains data associated with a number of suppliers and supplied units, including optional data not required by the present invention. Most importantly, the data provided includes the name of the supplier and the supplied unit (production line), an indication of the reference date of the data (assessment date), the total reference-date load (current load), a load-split by AIRBUS aircraft program (and in some cases aircraft series), other entity load (other customers load), reference-date available capacity (current available capacity), maximum available capacity (current max capacity), load splits by period (M+2 though M+36), and data related to various remedial actions that can be taken to increase capacity (action, new expected capacity, start date, etc.).

In step 130, data related to an AIRBUS supplied-unit requirement for the supplied unit for each of the periods is accessed. This step is also carried out by opening a file containing the requisite data that has been previously prepared in a format that is readable by MS Excel. A sample worksheet from such a file is shown in FIG. 6. (It should be noted that the data shown in FIG. 6 is not real-life actual data, it is fictitious data that has been created solely for the purpose of illustration). In FIG. 6, the data related to the AIRBUS supplied-unit requirement is in the form of the number of aircraft that AIRBUS will manufacture in a given month (a month being the period in the present embodiment) for the months of June 2006 to December 2020. Further, as can also be seen in FIG. 6, the data related to the AIRBUS supplied-unit requirement includes data related to (previously described) AIRBUS aircraft programs. For example, the AIRBUS A321 is part of the AIRBUS Single Aisle Program. Thus, for instance, for the month of January 2006, the 0.5 A321 aircraft are included in the 8.0 Single Aisle aircraft that will be produced in that month.

As can be seen by examining each of the columns in FIG. 6, the quantity of aircraft of each program being produced per month is generally increasing over time. This indicates that the number of parts required from suppliers to produce these aircraft will also increase over time. It will be noted that the increases are not consistent month over month, nor between aircraft programs, nor in between particular aircraft series within a program (and thus would be extremely difficult to mathematically model).

Referring back to FIG. 4, in step 140, a supplier future load for the supplied unit for each of the periods is calculated, the supplier future load being based on the supplier reference-date load for that period and the AIRBUS supplied-unit requirement for that period. In step 150, a supplier capacity contingency for each period, the supplier capacity contingency for each period being defined as a difference between the supplier future load for that period and the supplier reference-date available capacity for that period, is calculated. In step 160, a supplier capacity contingency ratio for each period is calculated, the supplier capacity contingency ratio for each period being a ratio between the supplier capacity contingency for that period and the supplier reference-date available capacity for that period. In step 170, the supplier capacity contingency ratio for each period is compared with a threshold value indicative of an insufficiency in the supplier capacity contingency, to determine any periods having insufficient supplier capacity contingency. In the present case there are two such threshold values, 10% and 5%. Each period (for each supplied unit) is assigned a colour based on the comparison of its supplier capacity contingency with the threshold values. Most importantly, ratios less than 5% have been termed "reds" (and are coloured red or black), and indicate periods where there is an insufficient supplier capacity contingency.

Still referring to FIG. 4, in step 180, data related to actions that can be undertaken to change the supplier reference-date available capacity for the supplied unit and to a lead time required in order to implement the actions is accessed. In step 190, at least one action that can be undertaken to change the supplier reference-date available capacity for the supplied unit for a first period in time having insufficient supplier contingency is determined. In step 200, for the at least one action that can be undertaken to change the supplier reference-date available capacity for the supplied unit for the first period in time having insufficient supplier contingency, a latest action implementation date by which that action must be undertaken in order to change the reference-date available capacity for the supplied unit in time for the first period in time having insufficient supplier contingency based on the lead time for that action is determined.

Still referring to FIG. 4, in step 210, a revised supplier capacity contingency ratio for the first period in time having insufficient supplier contingency and for periods thereafter is determined, based on the supplier projected future load, the supplier reference-date available capacity for that period, and the actions that can be undertaken to change the supplier reference-date available capacity for that period. In step 220, the revised supplier capacity contingency ratio for each period is compared with the threshold value indicative of an insufficiency in the supplier capacity contingency, to determine any periods still having insufficient supplier capacity contingency. In step 230, for at least one of the periods having an insufficient supplier capacity contingency, a difference between a supplier reference-date maximum capacity and the supplier projected future load for that period is calculated.

Finally, still referring to FIG. 4, in step 240 data related to the supplier capacity contingency ratio for each period is output.

Figure 7D:
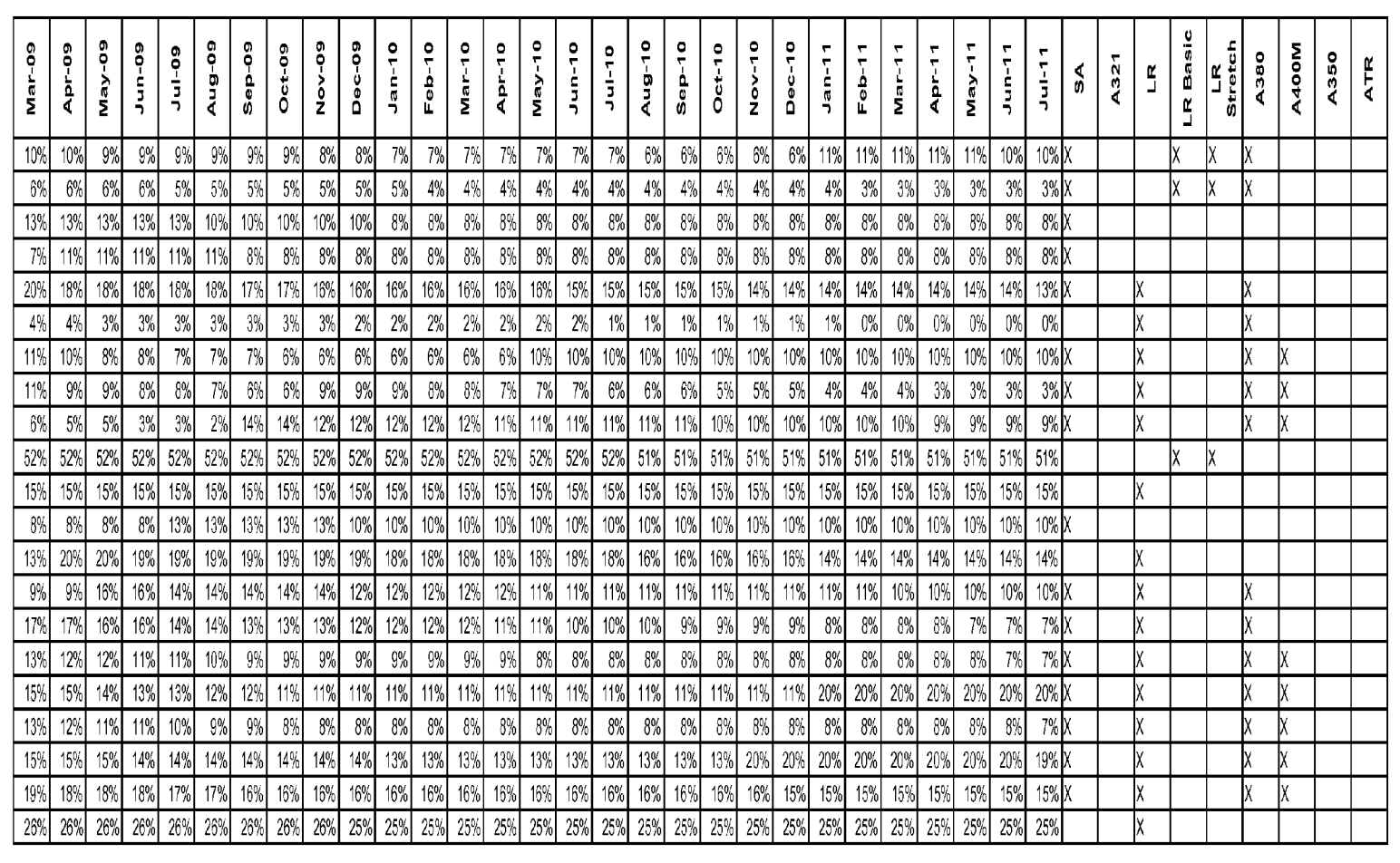

Each of the aforementioned steps are carried out through various operations by appropriate MS Excel macros. FIG. 7 shows the example of such an output in the form of an MS Excel worksheet. As can be seen in FIG. 7, there is a column for the supplier name and the name of the supplier production line (in this embodiment the supplied unit of the present invention). There are also columns for each of the periods in question (the series of periods being 36 months long, starting at August 2008 and extending to July 2011). Each period is assigned a colour based on its comparison with the threshold values. The date a supplied contingency ratio first turns "red" is also provided. Also indicated are the programs (i.e the uses) to which the parts will be put in the columns to the right of the columns for each period.

Figure 8A:
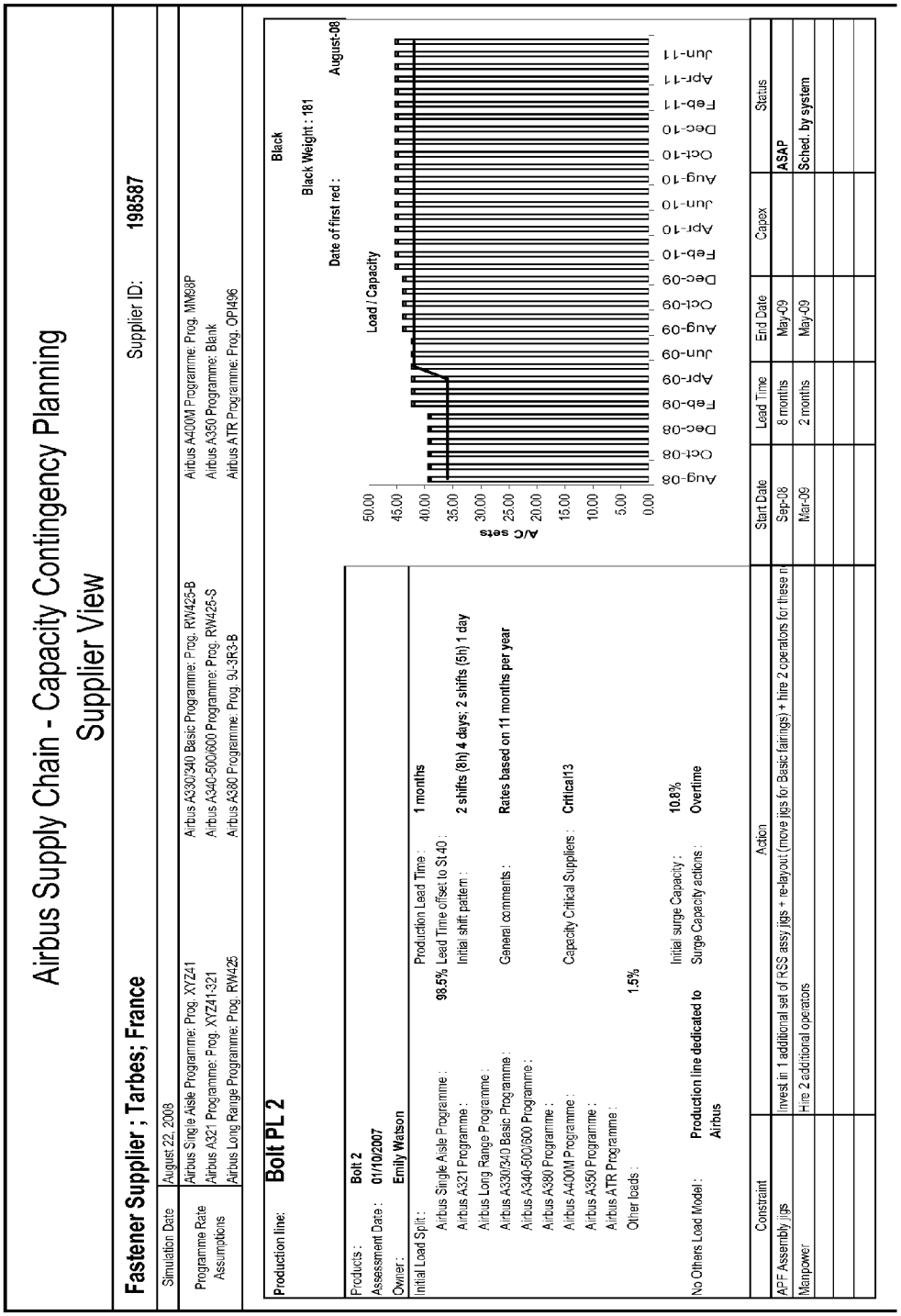
Figure 8B:
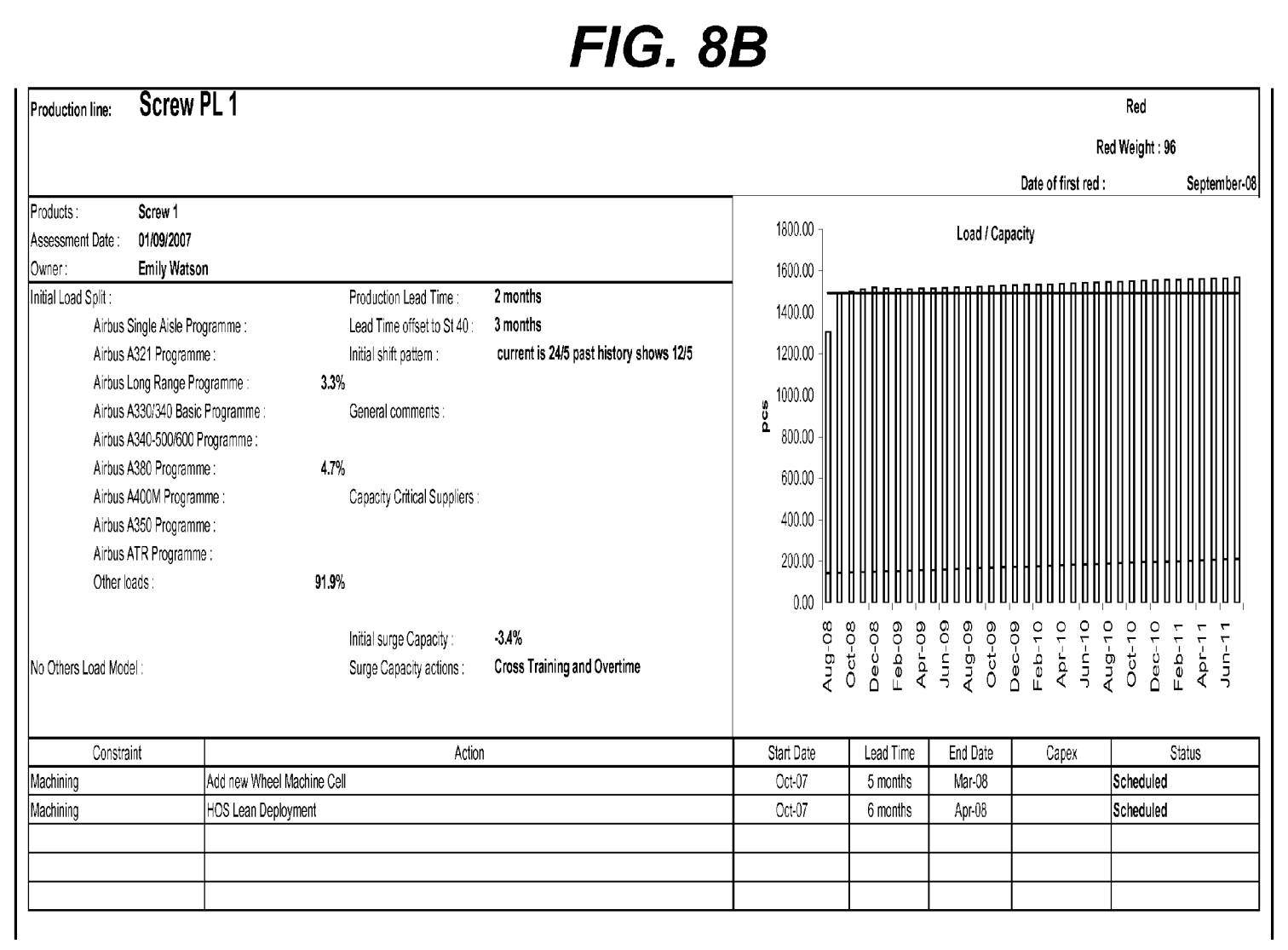
Figure 8C:
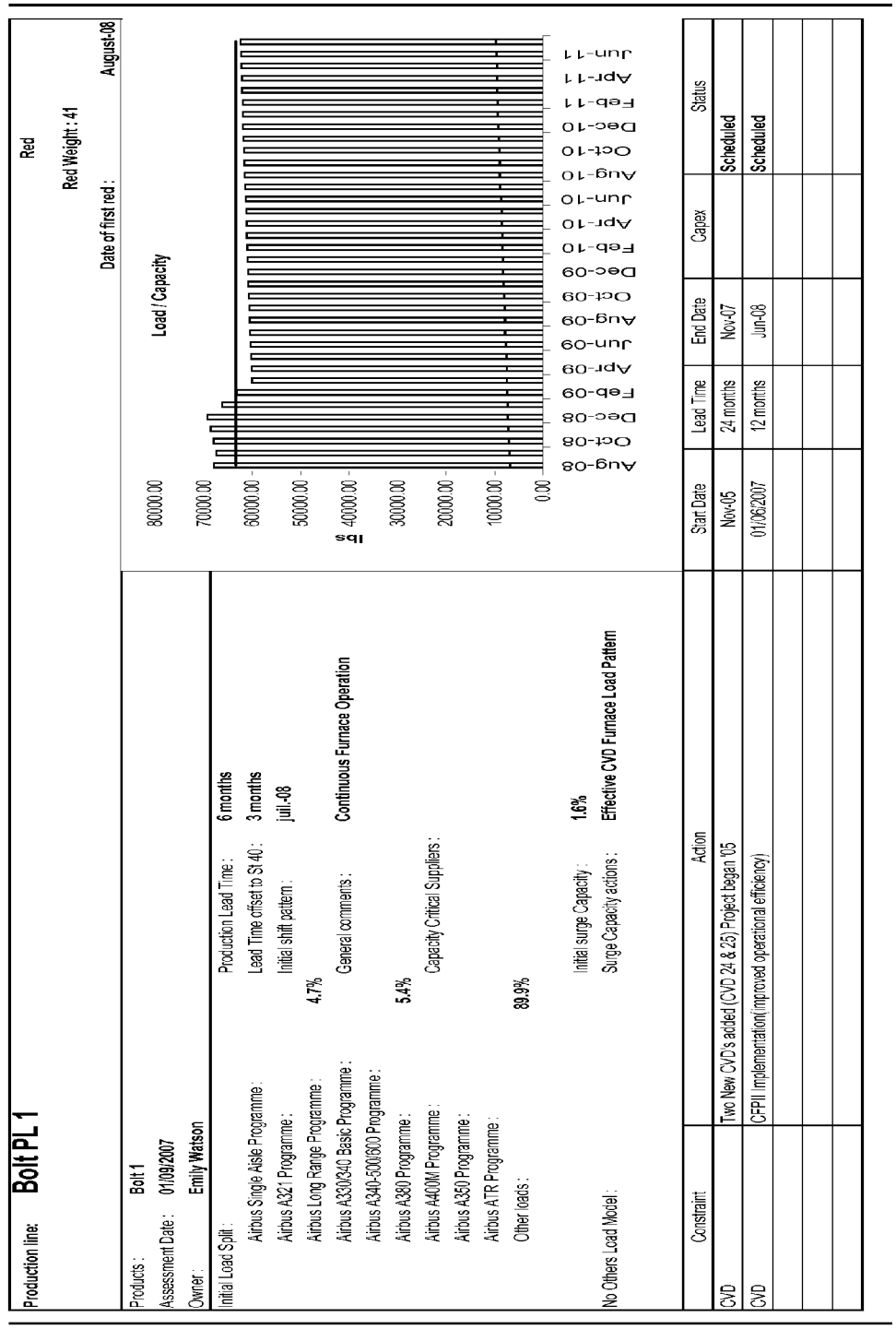
Figure 8D:
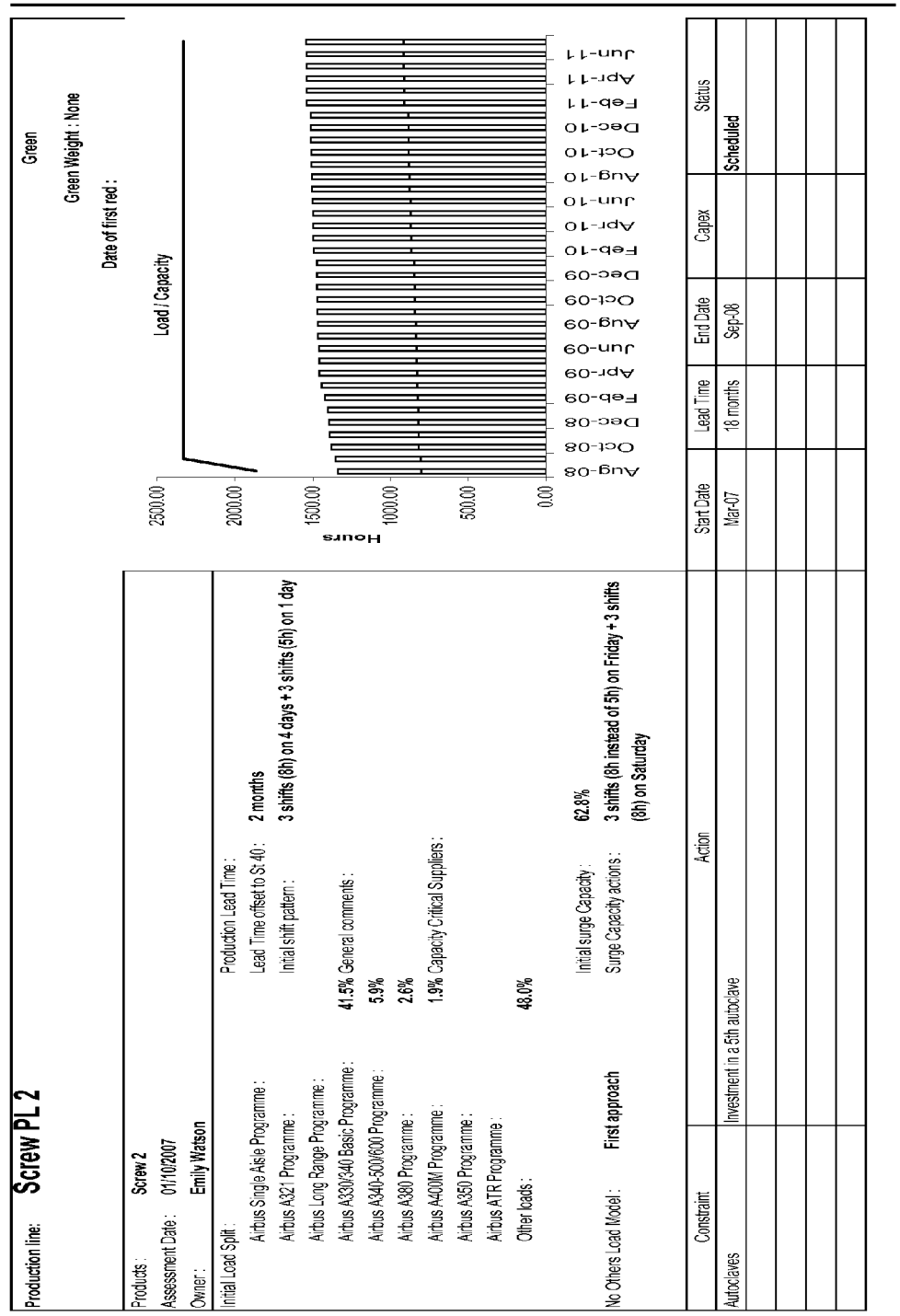

FIG. 8 provides another possible output, again prepared with appropriate MS Excel Macros. Specifically, FIG. 8 is an output on the basis of a single supplier "Fastener Supplier" in Tarbes, France and is split amongst the various supplied units that this supplier supplies: "Bolt PL 2", "Screw PL 1", etc. For each supplied unit, there is a graph showing on a periodic basis the load (the bar) vs. the capacity (the line). Taking Bolt PL 2 as an example, the load exceeds the capacity for most of the periods. Below the graph, there are identified two actions that the supplier may take to increase its capacity, the lead time that the action requires, and based on the lead time, the start date and the end date for the action. Similar information is available for each of the other supplied units supplied by that supplier.

FIG. 9 provides yet another output, again prepared with appropriate MS Excel Macros. Specifically, FIG. 9 is an output on the basis of all of the suppliers supplying units to AIRBUS requiring remedial actions to be taken to increase their supply capacity in view of the fact that their supply capacity contingency ratio is below an acceptable threshold. As can be seen in FIG. 9, the action list indicates the supplier name, supplier production line (supplier unit), the remedial action to be taken, the date by which the action must be taken in order to timely increase capacity, and the AIRBUS affected aircraft programs and series.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A computer-implemented method to assist in managing supplier capacity to supply a supplied unit to at least a first user of the supplied unit by at least one supplier, for a series of periods, based on data as of a reference date, the series of periods being in the future relative to the reference date, the method comprising:
   (a) accessing data in at least one database related to a supplier reference-date load for the supplied unit for each of the periods;
   (b) accessing data in the at least one database related to a supplier reference-date available capacity for the supplied unit for each of the periods;
   (c) accessing data in the at least one database related to a first-user supplied-unit requirement for the supplied unit for each of the periods;
   (d) calculating via at least one computer processor a supplier future load for the supplied unit for each of the periods, the supplier future load being based on the supplier reference-date load for that period and the first-user supplied-unit requirement for that period;
   (e) calculating via the at least one computer processor a supplier capacity contingency for each period, the supplier capacity contingency for each period being defined as a difference between the supplier future load for that period and the supplier reference-date available capacity for that period; and
   (f) calculating via the at least one computer processor a supplier capacity contingency ratio for each period, the supplier capacity contingency ratio for each period being a ratio between the supplier capacity contingency for that period and the supplier reference-date available capacity for that period;
   (g) comparing via the at least one computer processor the supplier capacity contingency ratio for each period with a threshold value indicative of an insufficiency in the supplier capacity contingency, to determine any periods having insufficient supplier capacity contingency;
   (h) accessing data in the at least one database related to actions that can be undertaken to change the supplier reference-date available capacity for the supplied unit and to a lead time required in order to implement the actions;
   (i) determining via the at least one computer processor at least one action that can be undertaken to change the supplier reference-date available capacity for the supplied unit for a first period in time having insufficient supplier contingency; and
   (j) determining via the at least one computer processor, for the at least one action that can be undertaken to change the supplier reference-date available capacity for the supplied unit for the first period in time having insufficient supplier contingency, a latest action implementation date by which that action must be undertaken in order to change the reference-date available capacity for the supplied unit in time for the first period in time having insufficient supplier contingency based on the lead time for that action.

2. The computer-implemented method of claim 1, wherein
   (i) the supplied unit is required by the first user for a plurality of uses; and
   (ii) the data related to the first-user supplied-unit requirement for the supplied unit for each of the periods related to the first user includes data related to a per first-user use basis.

3. The computer-implemented method of claim 2, wherein the supplied unit is further supplied by the supplier to at least one additional user, and the data related to the supplier reference-date load for the supplied unit for each period includes data related to a total of each additional-user load for that period.

4. The computer-implemented method of claim 1, further comprising:
   (k) calculating via the at least one computer processor a revised supplier capacity contingency ratio for the first period in time having insufficient supplier contingency and for periods thereafter, based on the supplier projected future load, the supplier reference-date available capacity for that period, and the actions that can be undertaken to change the supplier reference-date available capacity for that period.

5. The computer-implemented method of claim 4, further comprising:
   (l) comparing via the at least one computer processor the revised supplier capacity contingency ratio for each period with the threshold value indicative of an insufficiency in the supplier capacity contingency, to determine any periods still having insufficient supplier capacity contingency.

6. The computer-implemented method of claim 1, further comprising:
   (m) calculating via the at least one computer processor, for at least one of the periods having an insufficient supplier capacity contingency, a difference between a supplier reference-date maximum capacity and the supplier projected future load for that period.

7. The computer-implemented method of claim 1, wherein:
   (i) the at least one supplier is a plurality of suppliers;
   (ii) the data related to the supplier reference-date load for the supplied unit for each of the periods includes data related to each of the plurality of suppliers; and (iii) the data related to the supplier reference-date available capacity for the supplied unit for each of the periods includes data related to each of the plurality of suppliers.

8. The computer-implemented method of claim 1, wherein:
   (i) the supplied unit is one of a group of different supplied units; and
   (ii) each of (a)-(f) is repeated for each one of the group of different supplied units, to determine a supplier capacity contingency ratio for each one of the group of different supplied units for each period.

9. The computer-implemented method of claim 8, wherein the group of different supplied units consists essentially of the different supplied units supplied by the at least one supplier.

10. The computer-implemented method of claim 8, wherein the group of different supplied units consists essentially of the different supplied units supplied to the at least first user.

11. The computer-implemented method of claim 1, wherein:
    (i) the supplied unit is one of a group of different supplied units; and
    (ii) each of (a)-(g) is repeated for each one of the group of different supplied units, to determine a supplier capacity contingency ratio for each one of the group of different supplied units for each period.

12. The computer-implemented method of claim 11, wherein the group of different supplied units consists essentially of the different supplied units supplied by the at least one supplier for a particular first-user use.

13. The computer-implemented method of claim 11, wherein the group of different supplied units consists essentially of the different supplied units supplied to the at least first user for a particular first-user use.

14. The computer implemented method of claim 1, further comprising:
    (o) outputting via at least one display device data related to the supplier capacity contingency ratio for each period.

15. A non-transitory computer-readable information storage device containing computer-executable instructions to assist in managing a supplier capacity of a supplied unit for supply to at least a first user of the supplied unit by at least one supplier, for a series of periods, based on data as of a reference date, the series of periods being in the future relative to the reference date, the instructions comprising:
    (a) instructions to access data related to a supplier reference-date load for the supplied unit for each of the periods;
    (b) instructions to access data related to a supplier reference-date available capacity for the supplied unit for each of the periods;
    (c) instructions to access data related to a first-user supplied-unit requirement for the supplied unit for each of the periods;
    (d) instructions to calculate a supplier future load for the supplied unit for each of the periods based on the supplier reference-date load for that period and the first-user supplied-unit requirement for that period; and
    (e) instructions to calculate the supplier capacity contingency for each period, the supplier capacity contingency for each period being defined as a difference between the supplier future load for that period and the supplier reference-date available capacity for that period; and
    (f) instructions to calculate a supplier capacity contingency ratio for each period, the supplier capacity contingency ratio for each period being a ratio between the supplier capacity contingency for that period and the supplier reference-date available capacity for that period;
    (g) instructions to compare the supplier capacity contingency ratio for each period with a threshold value indicative of an insufficiency in the supplier capacity contingency, to determine any periods having insufficient supplier capacity contingency;
    (h) instructions to determine at least one action that can be undertaken to change the supplier reference-date available capacity for the supplied unit for a first period in time having insufficient supplier contingency; and
    (i) instructions to determine, for each action that can be undertaken to change the supplier reference-date available capacity for the supplied unit for the first period in time having insufficient supplier contingency, a latest action implementation date by which that action must be undertaken in order to change the reference-date available capacity for the supplied unit for the first period in time having insufficient supplier contingency.

16. The computer-readable information storage device of claim 15, wherein:
    (i) the supplied unit is required by the first user for a plurality of uses;
    (ii) the data related to the supplier reference-date load for the supplied unit for each of the periods related to the first user includes data related to a per first-user use basis;
    (iii) the data related to the supplied-unit requirement first-user for the supplied unit for each of the periods related to the first user includes data related to a per first-user use basis;
    (iv) the supplied unit is further supplied by the supplier to at least one additional user, and the data related to the supplier reference-date load for the supplied unit for each period includes data related to a total of each additional user load for that period.

17. The computer-readable information storage device of claim 16, wherein the supplied unit is one of a group of different supplied units, and the instructions further comprising:
    (j) instructions to repeat the instructions of (a)-(f) for each one of the group of different supplied units, to determine a supplier capacity contingency ratio for each one of the group of different supplied units for each period.

18. A computer system to assist in managing a supplier capacity of a supplied unit for supply to at least a first user of the supplied unit by at least one supplier, for a series of periods, based on data as of a reference date, the series of periods being in the future relative to the reference date, the system comprising:
    a processor;
    a computer-readable information storage device having computer-executable instructions stored thereon and operable with the processor, the instructions comprising:
    (a) a first data access component to access data related to a supplier reference-date load for the supplied unit for each of the periods;
    (b) a second data access component to access data related to a supplier reference-date available capacity for the supplied unit for each of the periods;
    (c) a third data access component to access data related to a first-user supplied-unit requirement for the supplied unit for each of the periods;
    (d) a first calculation component to calculate a supplier future load for the supplied unit for each of the periods based on the supplier reference-date load for that period and the first-user supplied-unit requirement for that period;

(e) a second calculation component to calculate the supplier capacity contingency for each period, the supplier capacity contingency for each period being defined as a difference between the supplier future load for that period and the supplier reference-date available capacity for that period;

(f) a third calculation component to calculate a supplier capacity contingency ratio for each period, the supplier capacity contingency ratio for each period being a ratio between the supplier capacity contingency for that period and the supplier reference-date available capacity for that period;

(g) a first comparator component to compare the supplier capacity contingency ratio for each period with a threshold value indicative of an insufficiency in the supplier capacity contingency, to determine any periods having insufficient capacity contingency;

(h) a first determination component to determine at least one action that can be undertaken to change the supplier reference-date available capacity for the supplied unit for a first period in time having insufficient supplier contingency; and (i) a second determination component to determine, for each action that can be undertaken to change the supplier reference-date available capacity for the supplied unit for the first period in time having insufficient supplier contingency, a latest action implementation date by which that action must be undertaken in order to change the reference-date available capacity for the supplied unit for the first period in time having insufficient supplier contingency.

19. The computer system of claim 18, wherein:
(i) the supplied unit is required by the first user for a plurality of uses;
(ii) the data related to the supplier reference-date load for the supplied unit for each of the periods related to the first user includes data related to a per first-user use basis;
(iii) the data related to the supplied-unit requirement first-user for the supplied unit for each of the periods related to the first user includes data related to a per first-user use basis;
(iv) the supplied unit is further supplied by the supplier to at least one additional user, and the data related to the supplier reference-date load for the supplied unit for each period includes data related to a total of each additional user load for that period.

20. The computer system of claim 19, wherein the supplied unit is one of a group of different supplied units, a supplier capacity contingency ratio for each one of the group of different supplied units for each period being determined.

* * * * *